(12) United States Patent  (10) Patent No.: US 8,388,908 B2
Blaga et al.  (45) Date of Patent: Mar. 5, 2013

(54) FLUIDIC DEVICES WITH DIAPHRAGM VALVES

(75) Inventors: Iuliu I. Blaga, Fremont, CA (US);
Stevan B. Jovanovich, Livermore, CA (US); Boris Kobrin, Dublin, CA (US);
Ezra Van Gelder, Palo Alto, CA (US)

(73) Assignee: IntegenX Inc., Pleasanton, CA (US)

( * ) Notice: Subject to any disclaimer, the term of this patent is extended or adjusted under 35 U.S.C. 154(b) by 46 days.

(21) Appl. No.: 12/789,186

(22) Filed: May 27, 2010

(65) Prior Publication Data

US 2010/0303687 A1 Dec. 2, 2010

Related U.S. Application Data

(60) Provisional application No. 61/183,468, filed on Jun. 2, 2009, provisional application No. 61/227,186, filed on Jul. 21, 2009.

(51) Int. Cl.
*G01N 15/06* (2006.01)
*G01N 33/00* (2006.01)
*G01N 33/48* (2006.01)

(52) U.S. Cl. ....... 422/503; 422/68.1; 422/502; 422/504; 422/509; 436/43; 436/180

(58) Field of Classification Search .................. 422/68.1, 422/502, 503, 504, 509; 436/43, 180
See application file for complete search history.

(56) References Cited

U.S. PATENT DOCUMENTS

| 3,190,310 | A | 6/1965 | Honsinger |
|---|---|---|---|
| 3,352,643 | A | 11/1967 | Ando et al. |
| 3,433,257 | A | 3/1969 | Jensen |
| 3,568,692 | A | 3/1971 | Metzger et al. |
| 3,610,274 | A | 10/1971 | Levesque et al. |
| 4,113,665 | A | 9/1978 | Law et al. |
| 4,558,845 | A | 12/1985 | Hunkapiller |
| 4,703,913 | A | 11/1987 | Hunkapiller |
| 4,847,120 | A | 7/1989 | Gent |
| 4,963,498 | A | 10/1990 | Hillman et al. |
| 5,085,757 | A | 2/1992 | Karger et al. |
| 5,275,645 | A | 1/1994 | Ternoir et al. |
| 5,364,759 | A | 11/1994 | Caskey et al. |
| 5,376,252 | A | 12/1994 | Ekström et al. |
| 5,387,505 | A | 2/1995 | Wu |
| 5,453,163 | A | 9/1995 | Yan |
| 5,482,836 | A | 1/1996 | Cantor et al. |

(Continued)

FOREIGN PATENT DOCUMENTS

CA 2433145 A1 5/2002
EP 0459241 B1 12/1991

(Continued)

OTHER PUBLICATIONS

Datasheet Cycle Sequencing, Retrieved from the internet, URL:http//answers.com/topic/cycle sequencing. Printed Sep. 3, 2010, pp. 1-2.

(Continued)

*Primary Examiner* — Brian J Sines

(57) ABSTRACT

This invention provides fluidic devices, in particular microfluidic devices, with diaphragm valves having low failure rates. Low failure rates are achieved by inhibiting sticking of the diaphragm to functional surfaces such as valve seats, valve chamber and fluidic channels and conduits. One way to implement this is to provide exposed surfaces facing the diaphragm, particularly valve seats, with a low energy material, such as a noble metal, a perfluorinated polymer, a self-assembled monolayer, hard diamond, diamond-like carbon or a metal oxide. In other embodiments, the valves are provided with ridges and the diaphragm is adhered to the fluidic or actuation layer with an adhesive material.

34 Claims, 21 Drawing Sheets

U.S. PATENT DOCUMENTS

| | | |
|---|---|---|
| 5,523,231 A | 6/1996 | Reeve |
| 5,571,410 A | 11/1996 | Swedberg et al. |
| 5,587,128 A | 12/1996 | Wilding et al. |
| 5,635,358 A | 6/1997 | Wilding et al. |
| 5,639,428 A | 6/1997 | Cottingham |
| 5,681,946 A | 10/1997 | Reeve |
| 5,705,628 A | 1/1998 | Hawkins |
| 5,705,813 A | 1/1998 | Apffel et al. |
| 5,726,026 A | 3/1998 | Wilding et al. |
| 5,741,462 A | 4/1998 | Nova et al. |
| 5,750,015 A | 5/1998 | Soane et al. |
| 5,770,029 A | 6/1998 | Nelson et al. |
| 5,775,371 A | 7/1998 | Pan et al. |
| 5,776,748 A | 7/1998 | Singhvi et al. |
| 5,830,662 A | 11/1998 | Soares et al. |
| 5,842,787 A | 12/1998 | Kopf-sill et al. |
| 5,856,174 A | 1/1999 | Lipshutz et al. |
| 5,863,502 A | 1/1999 | Southgate et al. |
| 5,872,010 A | 2/1999 | Karger et al. |
| 5,885,470 A | 3/1999 | Parce et al. |
| 5,898,071 A | 4/1999 | Hawkins |
| 5,900,130 A | 5/1999 | Benvegnu |
| 5,908,552 A | 6/1999 | Zimmerman et al. |
| 5,922,591 A | 7/1999 | Anderson et al. |
| 5,942,443 A | 8/1999 | Parce et al. |
| 5,948,684 A | 9/1999 | Weigl et al. |
| 5,971,158 A | 10/1999 | Yager et al. |
| 5,994,064 A | 11/1999 | Staub et al. |
| 5,998,549 A | 12/1999 | Milbourn et al. |
| 6,001,229 A | 12/1999 | Ramsey |
| 6,007,690 A | 12/1999 | Nelson et al. |
| 6,007,775 A | 12/1999 | Yager |
| 6,010,607 A | 1/2000 | Ramsey |
| 6,048,100 A | 4/2000 | Thrall et al. |
| 6,056,860 A | 5/2000 | Amigo et al. |
| 6,073,482 A | 6/2000 | Moles |
| 6,074,827 A | 6/2000 | Nelson et al. |
| 6,103,199 A | 8/2000 | Bjornson et al. |
| 6,110,343 A | 8/2000 | Ramsey et al. |
| 6,120,184 A | 9/2000 | Laurence et al. |
| 6,136,212 A | 10/2000 | Mastrangelo et al. |
| 6,168,948 B1 | 1/2001 | Anderson et al. |
| 6,176,962 B1 | 1/2001 | Soane et al. |
| 6,190,616 B1 | 2/2001 | Jovanovich et al. |
| 6,197,595 B1 | 3/2001 | Anderson et al. |
| 6,207,031 B1 | 3/2001 | Adourian et al. |
| 6,235,471 B1 | 5/2001 | Knapp et al. |
| 6,238,538 B1 | 5/2001 | Parce et al. |
| 6,251,343 B1 | 6/2001 | Dubrow et al. |
| 6,280,589 B1 | 8/2001 | Manz et al. |
| 6,319,476 B1 | 11/2001 | Victor, Jr. et al. |
| 6,321,791 B1 | 11/2001 | Chow |
| 6,322,683 B1 | 11/2001 | Wolk et al. |
| 6,342,142 B1 | 1/2002 | Ramsey |
| 6,348,318 B1 | 2/2002 | Valkirs |
| 6,379,929 B1 | 4/2002 | Burns et al. |
| 6,387,234 B1 | 5/2002 | Yeung et al. |
| 6,387,707 B1 | 5/2002 | Seul et al. |
| 6,403,338 B1 | 6/2002 | Knapp et al. |
| 6,408,878 B2 | 6/2002 | Unger et al. |
| 6,423,536 B1 | 7/2002 | Jovanovich et al. |
| 6,429,025 B1 | 8/2002 | Parce et al. |
| 6,432,191 B2 | 8/2002 | Schutt |
| 6,432,290 B1 | 8/2002 | Harrison et al. |
| 6,454,924 B2 | 9/2002 | Jedrzejewski et al. |
| 6,489,112 B1 | 12/2002 | Hadd et al. |
| 6,521,188 B1 | 2/2003 | Webster |
| 6,524,456 B1 | 2/2003 | Ramsey et al. |
| 6,527,003 B1 | 3/2003 | Webster |
| 6,531,041 B1 | 3/2003 | Cong et al. |
| 6,531,282 B1 | 3/2003 | Dau et al. |
| 6,532,997 B1 | 3/2003 | Bedingham et al. |
| 6,533,914 B1 | 3/2003 | Liu |
| 6,534,262 B1 | 3/2003 | Mckernan et al. |
| 6,537,757 B1 | 3/2003 | Langmore et al. |
| 6,544,734 B1 | 4/2003 | Briscoe et al. |
| 6,551,839 B2 | 4/2003 | Jovanovich et al. |
| 6,581,441 B1 | 6/2003 | Paul |
| 6,581,899 B2 | 6/2003 | Williams |
| 6,605,454 B2 | 8/2003 | Barenburg et al. |
| 6,613,525 B2 | 9/2003 | Nelson et al. |
| 6,614,228 B2 | 9/2003 | Hofmann et al. |
| 6,618,679 B2 | 9/2003 | Loehrlein |
| 6,623,613 B1 | 9/2003 | Mathies et al. |
| 6,627,446 B1 | 9/2003 | Roach et al. |
| 6,629,820 B2 | 10/2003 | Kornelsen |
| 6,632,619 B1 | 10/2003 | Harrison et al. |
| 6,632,655 B1 | 10/2003 | Mehta et al. |
| 6,663,833 B1 | 12/2003 | Stave et al. |
| 6,685,442 B2 | 2/2004 | Chinn et al. |
| 6,685,809 B1 | 2/2004 | Jacobson et al. |
| 6,705,345 B1 | 3/2004 | Bifano |
| 6,752,922 B2 | 6/2004 | Huang et al. |
| 6,764,648 B1 | 7/2004 | Roach et al. |
| 6,782,746 B1 | 8/2004 | Hasselbrink et al. |
| 6,786,708 B2 | 9/2004 | Brown et al. |
| 6,787,111 B2 | 9/2004 | Roach et al. |
| 6,793,753 B2 | 9/2004 | Unger et al. |
| 6,802,342 B2 | 10/2004 | Fernandes et al. |
| 6,803,019 B1 | 10/2004 | Bjornson et al. |
| 6,807,490 B1 | 10/2004 | Perlin |
| 6,824,663 B1 | 11/2004 | Boone |
| 6,829,753 B2 | 12/2004 | Lee et al. |
| 6,833,246 B2 | 12/2004 | Balasubramanian |
| 6,852,287 B2 | 2/2005 | Ganesan |
| 6,870,185 B2 | 3/2005 | Roach et al. |
| 6,885,982 B2 | 4/2005 | Harris et al. |
| 6,899,137 B2 | 5/2005 | Unger et al. |
| 6,923,907 B2 | 8/2005 | Hobbs et al. |
| 6,929,030 B2 | 8/2005 | Unger et al. |
| 6,951,632 B2 | 10/2005 | Unger et al. |
| 6,953,058 B2 | 10/2005 | Fernandes et al. |
| 6,960,437 B2 | 11/2005 | Enzelberger et al. |
| 6,994,986 B2 | 2/2006 | Swartz et al. |
| 7,005,292 B2 | 2/2006 | Wilding et al. |
| 7,005,493 B2 | 2/2006 | Huang et al. |
| 7,015,030 B1 | 3/2006 | Fouillet et al. |
| 7,046,357 B2 | 5/2006 | Weinberger et al. |
| 7,049,558 B2 | 5/2006 | Baer et al. |
| 7,063,304 B2 | 6/2006 | Leys |
| 7,087,380 B2 | 8/2006 | Griffiths et al. |
| 7,097,809 B2 | 8/2006 | Van Dam et al. |
| 7,118,910 B2 | 10/2006 | Unger et al. |
| 7,157,228 B2 | 1/2007 | Hashmi et al. |
| 7,169,557 B2 | 1/2007 | Rosenblum et al. |
| 7,198,759 B2 | 4/2007 | Bryning et al. |
| 7,211,388 B2 | 5/2007 | Cash et al |
| 7,232,656 B2 | 6/2007 | Balasubramanian et al. |
| 7,244,961 B2 | 7/2007 | Jovanovich et al. |
| 7,258,774 B2 | 8/2007 | Chou et al. |
| 7,279,146 B2 | 10/2007 | Nassef et al. |
| 7,282,361 B2 | 10/2007 | Hodge |
| 7,312,085 B2 | 12/2007 | Chou et al. |
| 7,312,611 B1 | 12/2007 | Harrison et al. |
| 7,323,305 B2 | 1/2008 | Leamon et al. |
| 7,361,471 B2 | 4/2008 | Gerdes et al. |
| 7,377,483 B2 | 5/2008 | Iwabuchi et al. |
| 7,416,165 B2 | 8/2008 | Ohmi et al. |
| 7,438,856 B2 | 10/2008 | Jedrzejewski et al. |
| 7,445,926 B2 | 11/2008 | Mathies et al. |
| 7,488,603 B2 | 2/2009 | Gjerde et al. |
| 7,501,237 B2 | 3/2009 | Solus et al. |
| 7,526,741 B2 | 4/2009 | Lee et al. |
| 7,537,886 B1 | 5/2009 | Nazarenko et al. |
| 7,575,865 B2 | 8/2009 | Leamon et al. |
| 7,645,580 B2 | 1/2010 | Barber et al. |
| 7,691,614 B2 | 4/2010 | Senapathy |
| 7,745,207 B2 | 6/2010 | Jovanovich et al. |
| 7,763,453 B2 | 7/2010 | Clemmens et al. |
| 7,766,033 B2 | 8/2010 | Mathies et al. |
| 7,799,553 B2 | 9/2010 | Mathies et al. |
| 7,803,281 B2 | 9/2010 | Davies |
| 7,817,273 B2 | 10/2010 | Bahatt et al. |
| 7,832,429 B2 | 11/2010 | Young et al. |
| 7,863,357 B2 | 1/2011 | Madabhushi et al. |
| 7,867,713 B2 | 1/2011 | Nasarabadi |
| 7,885,770 B2 | 2/2011 | Gill et al. |

| | | |
|---|---|---|
| 7,892,856 B2 | 2/2011 | Grate et al. |
| 7,942,160 B2 | 5/2011 | Jeon et al. |
| 7,943,305 B2 | 5/2011 | Korlach et al. |
| 7,959,875 B2 | 6/2011 | Zhou et al. |
| 7,972,561 B2 | 7/2011 | Viovy et al. |
| 7,976,789 B2 | 7/2011 | Kenis et al. |
| 7,976,795 B2 | 7/2011 | Zhou et al. |
| 8,007,746 B2 | 8/2011 | Unger et al. |
| 8,018,593 B2 | 9/2011 | Tan et al. |
| 8,037,903 B2 * | 10/2011 | Wang et al. ............ 137/828 |
| 8,053,192 B2 | 11/2011 | Bignell et al. |
| 2001/0041357 A1 | 11/2001 | Fouillet et al. |
| 2002/0022587 A1 | 2/2002 | Ferguson et al. |
| 2002/0025529 A1 | 2/2002 | Quake et al. |
| 2002/0025576 A1 | 2/2002 | Northrup et al. |
| 2002/0047003 A1 | 4/2002 | Bedingham et al. |
| 2002/0048536 A1 | 4/2002 | Bergh et al. |
| 2002/0051992 A1 | 5/2002 | Bridgham et al. |
| 2002/0058332 A1 | 5/2002 | Quake et al. |
| 2002/0068357 A1 | 6/2002 | Mathies et al. |
| 2002/0098097 A1 | 7/2002 | Singh |
| 2002/0110900 A1 | 8/2002 | Jovanovich et al. |
| 2002/0119480 A1 | 8/2002 | Weir et al. |
| 2002/0119482 A1 | 8/2002 | Nelson et al. |
| 2002/0127736 A1 | 9/2002 | Chou et al. |
| 2002/0139084 A1 | 10/2002 | Tobolka |
| 2002/0144738 A1 | 10/2002 | Unger et al. |
| 2002/0148992 A1 | 10/2002 | Hayenga et al. |
| 2002/0150792 A1 * | 10/2002 | Kolb et al. ............ 428/694 BS |
| 2002/0157951 A1 | 10/2002 | Foret et al. |
| 2002/0160361 A1 | 10/2002 | Loehrlein et al. |
| 2003/0008308 A1 | 1/2003 | Enzelberger et al. |
| 2003/0021734 A1 | 1/2003 | Vann et al. |
| 2003/0029724 A1 | 2/2003 | Derand et al. |
| 2003/0070677 A1 | 4/2003 | Handique et al. |
| 2003/0077839 A1 | 4/2003 | Takei |
| 2003/0095897 A1 | 5/2003 | Grate et al. |
| 2003/0217923 A1 | 11/2003 | Harrison et al. |
| 2004/0003997 A1 | 1/2004 | Anazawa et al. |
| 2004/0013536 A1 | 1/2004 | Hower et al. |
| 2004/0014091 A1 | 1/2004 | Duck et al. |
| 2004/0018611 A1 | 1/2004 | Ward et al. |
| 2004/0021068 A1 | 2/2004 | Staats |
| 2004/0037739 A1 | 2/2004 | Mcneely et al. |
| 2004/0038385 A1 | 2/2004 | Langlois et al. |
| 2004/0053290 A1 | 3/2004 | Terbrueggen et al. |
| 2004/0063217 A1 | 4/2004 | Webster et al. |
| 2004/0072278 A1 | 4/2004 | Chou et al. |
| 2004/0086870 A1 | 5/2004 | Tyvoll et al. |
| 2004/0086872 A1 | 5/2004 | Childers et al. |
| 2004/0132170 A1 | 7/2004 | Storek et al. |
| 2004/0151629 A1 | 8/2004 | Pease et al. |
| 2004/0185484 A1 | 9/2004 | Costa et al. |
| 2004/0197845 A1 | 10/2004 | Hassibi et al. |
| 2004/0200724 A1 | 10/2004 | Fujii et al. |
| 2004/0209354 A1 | 10/2004 | Mathies et al. |
| 2004/0224380 A1 | 11/2004 | Chou et al. |
| 2005/0026300 A1 | 2/2005 | Samper et al. |
| 2005/0047967 A1 | 3/2005 | Chuang et al. |
| 2005/0053952 A1 | 3/2005 | Hong et al. |
| 2005/0142663 A1 | 6/2005 | Parthasarathy et al. |
| 2005/0161326 A1 | 7/2005 | Morita et al. |
| 2005/0161669 A1 | 7/2005 | Jovanovich et al. |
| 2005/0224134 A1 | 10/2005 | Yin et al. |
| 2005/0224352 A1 | 10/2005 | Harrison et al. |
| 2005/0241941 A1 | 11/2005 | Parce et al. |
| 2005/0255000 A1 | 11/2005 | Yamamoto et al. |
| 2005/0255003 A1 | 11/2005 | Summersgill et al. |
| 2005/0255007 A1 | 11/2005 | Yamada et al. |
| 2005/0266582 A1 | 12/2005 | Modlin et al. |
| 2005/0287572 A1 | 12/2005 | Mathies et al. |
| 2006/0027456 A1 | 2/2006 | Harrison et al. |
| 2006/0057209 A1 | 3/2006 | Chapman et al. |
| 2006/0073484 A1 | 4/2006 | Mathies et al. |
| 2006/0076068 A1 | 4/2006 | Young et al. |
| 2006/0140051 A1 | 6/2006 | Kim et al. |
| 2006/0163143 A1 | 7/2006 | Chirica et al. |
| 2006/0186043 A1 | 8/2006 | Covey et al. |
| 2006/0260941 A1 | 11/2006 | Tan et al. |
| 2006/0263789 A1 | 11/2006 | Kincaid |
| 2006/0266645 A1 | 11/2006 | Chen et al. |
| 2006/0292032 A1 | 12/2006 | Hataoka et al. |
| 2007/0015179 A1 | 1/2007 | Klapperich et al. |
| 2007/0017812 A1 | 1/2007 | Bousse |
| 2007/0031865 A1 | 2/2007 | Willoughby |
| 2007/0034025 A1 | 2/2007 | Pant et al. |
| 2007/0105163 A1 | 5/2007 | Grate et al. |
| 2007/0113908 A1 | 5/2007 | Lee et al. |
| 2007/0122819 A1 | 5/2007 | Wu et al. |
| 2007/0175756 A1 | 8/2007 | Nguyen et al. |
| 2007/0184463 A1 | 8/2007 | Molho et al. |
| 2007/0202531 A1 | 8/2007 | Grover |
| 2007/0237686 A1 | 10/2007 | Mathies et al. |
| 2007/0238109 A1 | 10/2007 | Min et al. |
| 2007/0248958 A1 | 10/2007 | Jovanovich et al. |
| 2007/0289941 A1 | 12/2007 | Davies |
| 2007/0297947 A1 | 12/2007 | Sommers et al. |
| 2008/0014576 A1 | 1/2008 | Jovanovich et al. |
| 2008/0014589 A1 | 1/2008 | Link et al. |
| 2008/0047836 A1 | 2/2008 | Strand et al. |
| 2008/0064610 A1 | 3/2008 | Lipovsek et al. |
| 2008/0124723 A1 | 5/2008 | Dale et al. |
| 2008/0138809 A1 | 6/2008 | Kapur et al. |
| 2008/0164155 A1 | 7/2008 | Pease et al. |
| 2008/0179255 A1 | 7/2008 | Jung et al. |
| 2008/0179555 A1 | 7/2008 | Landers et al. |
| 2008/0237146 A1 | 10/2008 | Harrison et al. |
| 2008/0242560 A1 | 10/2008 | Gunderson et al. |
| 2008/0257437 A1 | 10/2008 | Fernandes et al. |
| 2008/0281090 A1 | 11/2008 | Lee et al. |
| 2008/0302732 A1 | 12/2008 | Soh et al. |
| 2008/0311585 A1 | 12/2008 | Gao et al. |
| 2009/0004494 A1 | 1/2009 | Blenke et al. |
| 2009/0011959 A1 | 1/2009 | Costa et al. |
| 2009/0023603 A1 | 1/2009 | Selden et al. |
| 2009/0035770 A1 | 2/2009 | Mathies et al. |
| 2009/0053799 A1 | 2/2009 | Chang-yen et al. |
| 2009/0056822 A1 | 3/2009 | Young et al. |
| 2009/0060797 A1 | 3/2009 | Mathies et al. |
| 2009/0084679 A1 | 4/2009 | Harrison et al. |
| 2009/0092970 A1 | 4/2009 | Williams |
| 2009/0134069 A1 | 5/2009 | Handique |
| 2009/0137413 A1 | 5/2009 | Mehta et al. |
| 2009/0148933 A1 | 6/2009 | Battrell et al. |
| 2009/0178934 A1 | 7/2009 | Jarvius et al. |
| 2009/0181411 A1 | 7/2009 | Battrell et al. |
| 2009/0253181 A1 | 10/2009 | Vangbo et al. |
| 2009/0269504 A1 | 10/2009 | Liao |
| 2009/0286327 A1 | 11/2009 | Cho et al. |
| 2009/0311804 A1 | 12/2009 | Mcbrady et al. |
| 2009/0314972 A1 | 12/2009 | Mcavoy et al. |
| 2009/0325277 A1 | 12/2009 | Shigeura et al. |
| 2010/0068723 A1 | 3/2010 | Jovanovich et al. |
| 2010/0111770 A1 | 5/2010 | Hwang et al. |
| 2010/0129810 A1 | 5/2010 | Greiner et al. |
| 2010/0165784 A1 * | 7/2010 | Jovanovich et al. ........ 366/163.2 |
| 2010/0172898 A1 | 7/2010 | Doyle et al. |
| 2010/0173398 A1 | 7/2010 | Peterman |
| 2010/0197507 A1 | 8/2010 | Rothberg et al. |
| 2010/0210008 A1 | 8/2010 | Strand et al. |
| 2010/0221726 A1 | 9/2010 | Zenhausern et al. |
| 2010/0224255 A1 | 9/2010 | Mathies et al. |
| 2010/0228513 A1 | 9/2010 | Roth et al. |
| 2010/0233696 A1 | 9/2010 | Joseph et al. |
| 2010/0243916 A1 | 9/2010 | Maurer et al. |
| 2010/0252123 A1 | 10/2010 | Mathies et al. |
| 2010/0266432 A1 | 10/2010 | Pirk et al. |
| 2010/0285578 A1 | 11/2010 | Selden et al. |
| 2010/0285606 A1 | 11/2010 | Philips et al. |
| 2010/0285975 A1 | 11/2010 | Mathies et al. |
| 2010/0291666 A1 | 11/2010 | Collier et al. |
| 2010/0304355 A1 | 12/2010 | Shuler et al. |
| 2010/0326826 A1 | 12/2010 | Harrison et al. |
| 2011/0003301 A1 | 1/2011 | Raymond et al. |
| 2011/0005932 A1 | 1/2011 | Jovanovich et al. |
| 2011/0008813 A1 | 1/2011 | Dilleen et al. |
| 2011/0020920 A1 | 1/2011 | Mathies et al. |
| 2011/0027913 A1 | 2/2011 | Bau et al. |

| | | | |
|---|---|---|---|
| 2011/0038758 A1 | 2/2011 | Akaba et al. | |
| 2011/0045505 A1 | 2/2011 | Warthoe et al. | |
| 2011/0053784 A1 | 3/2011 | Unger et al. | |
| 2011/0070578 A1 | 3/2011 | Bell et al. | |
| 2011/0124049 A1 | 5/2011 | Li et al. | |
| 2011/0126910 A1 | 6/2011 | May | |
| 2011/0127222 A1 | 6/2011 | Chang-yen et al. | |
| 2011/0136179 A1 | 6/2011 | Bin/lee et al. | |
| 2011/0137018 A1 | 6/2011 | Chang-yen et al. | |
| 2011/0171086 A1 | 7/2011 | Prins et al. | |
| 2011/0172403 A1 | 7/2011 | Harrold et al. | |
| 2011/0189678 A1 | 8/2011 | Mcbride et al. | |
| 2011/0206576 A1 | 8/2011 | Woudenberg et al. | |
| 2011/0212440 A1 | 9/2011 | Viovy et al. | |
| 2011/0212446 A1 | 9/2011 | Wang et al. | |
| 2011/0223605 A1 | 9/2011 | Bienvenue et al. | |

FOREIGN PATENT DOCUMENTS

| | | | |
|---|---|---|---|
| EP | 0637999 A1 | 2/1995 | |
| EP | 0527905 B1 | 11/1995 | |
| EP | 1065378 B1 | 4/2002 | |
| EP | 1411340 A2 | 4/2004 | |
| EP | 1411340 A3 | 5/2004 | |
| EP | 1345697 B1 | 6/2007 | |
| EP | 1658890 B1 | 5/2008 | |
| EP | 1345551 B1 | 4/2009 | |
| EP | 2345739 A2 | 7/2011 | |
| JP | 2007-506430 A | 7/1995 | |
| JP | 408327594 A | 12/1996 | |
| JP | 2001-500966 A | 1/2001 | |
| JP | 2001-521818 A | 11/2001 | |
| JP | 2002-370200 A | 12/2002 | |
| JP | 2003-536058 A | 12/2003 | |
| JP | 2004-025159 A | 1/2004 | |
| JP | 2004-108285 A | 4/2004 | |
| JP | 2004-180594 A | 7/2004 | |
| JP | 2005-323519 A | 11/2005 | |
| JP | 2005-337415 | 12/2005 | |
| JP | 2005-345463 A | 12/2005 | |
| JP | 2007-155491 A | 6/2007 | |
| JP | 2008-513022 A | 5/2008 | |
| WO | WO 93/22053 A1 | 4/1993 | |
| WO | WO 96/04547 A1 | 2/1996 | |
| WO | WO 96/14934 A1 | 5/1996 | |
| WO | WO 98/10277 A1 | 7/1997 | |
| WO | WO 99/22868 A1 | 10/1998 | |
| WO | WO 98/52691 A1 | 11/1998 | |
| WO | WO 98/53300 A2 | 11/1998 | |
| WO | WO 98/53300 A3 | 2/1999 | |
| WO | WO 99/36766 A1 | 7/1999 | |
| WO | WO 99/40174 A1 | 8/1999 | |
| WO | WO 00/40712 A1 | 7/2000 | |
| WO | WO 00/60362 A1 | 10/2000 | |
| WO | WO 00/61198 A1 | 10/2000 | |
| WO | WO 01/32930 A1 | 5/2001 | |
| WO | WO 01/38865 A1 | 5/2001 | |
| WO | WO 01/85341 A1 | 11/2001 | |
| WO | WO 02/41995 A1 | 5/2002 | |
| WO | WO 02/043615 A2 | 6/2002 | |
| WO | WO 02/43864 A2 | 6/2002 | |
| WO | WO 02/043864 A3 | 8/2002 | |
| WO | WO 02/043615 A3 | 3/2003 | |
| WO | WO 03/044528 A2 | 5/2003 | |
| WO | WO 03/085379 A2 | 10/2003 | |
| WO | WO 2004/038363 A2 | 5/2004 | |
| WO | WO 03/044528 A3 | 6/2004 | |
| WO | WO 2004/061085 A2 | 7/2004 | |
| WO | WO 2004/061085 A3 | 10/2004 | |
| WO | WO 2004/098757 A2 | 11/2004 | |
| WO | WO 2004/038363 A3 | 12/2004 | |
| WO | WO 2005/075081 A1 | 8/2005 | |
| WO | 2005/091820 A2 | 10/2005 | |
| WO | WO 2005/108620 A2 | 11/2005 | |
| WO | WO 2005/118867 A2 | 12/2005 | |
| WO | WO 2005/121308 A1 | 12/2005 | |
| WO | WO 2006/032044 A2 | 3/2006 | |
| WO | WO 2005/108620 A3 | 4/2006 | |
| WO | WO 2004/098757 A3 | 5/2006 | |
| WO | WO 2006/032044 A3 | 1/2007 | |
| WO | WO 2007/002579 A2 | 1/2007 | |
| WO | WO 2007/064635 A1 | 6/2007 | |
| WO | WO 2007/082480 A1 | 7/2007 | |
| WO | WO 2007/109375 A2 | 9/2007 | |
| WO | WO 2005/118867 A3 | 12/2007 | |
| WO | WO 2008/012104 A2 | 1/2008 | |
| WO | WO 2008/024319 A2 | 2/2008 | |
| WO | WO 2008/024319 A3 | 4/2008 | |
| WO | WO 2008/039875 A1 | 4/2008 | |
| WO | WO 2008/012104 A3 | 5/2008 | |
| WO | WO 2008/115626 A2 | 9/2008 | |
| WO | WO 2007/109375 A3 | 10/2008 | |
| WO | WO 2008/115626 A3 | 11/2008 | |
| WO | WO 2009/008236 A1 | 1/2009 | |
| WO | WO 2009/015296 A1 | 1/2009 | |
| WO | WO 2007/002579 A3 | 9/2009 | |
| WO | WO 2009/108260 A2 | 9/2009 | |
| WO | WO 2009/129415 A1 | 10/2009 | |
| WO | WO 2009/108260 A3 | 12/2009 | |
| WO | WO 2010/041174 A1 | 4/2010 | |
| WO | WO 2010/041231 A2 | 4/2010 | |
| WO | WO 2010/042784 A2 | 4/2010 | |
| WO | WO 2010/042784 A3 | 7/2010 | |
| WO | WO 2010/041231 A3 | 9/2010 | |
| WO | WO 2010/109392 A1 | 9/2010 | |
| WO | WO 2010/130762 A2 | 11/2010 | |
| WO | WO 2010/141921 A1 | 12/2010 | |
| WO | WO 2011/003941 A1 | 1/2011 | |
| WO | WO 2010/130762 A3 | 2/2011 | |
| WO | WO 2011/012621 A1 | 2/2011 | |
| WO | WO 2011/034621 A2 | 3/2011 | |
| WO | WO 2011/084703 A2 | 7/2011 | |
| WO | WO 2011/034621 A3 | 11/2011 | |

OTHER PUBLICATIONS

European search report dated Sep. 1, 2010 for Application No. 5804847.1.

International search report dated Oct. 6, 2010 for PCT Application No. US10/37545.

International search report dated Aug. 18, 2009 for PCT Application No. US09/00419.

International search report dated Sep. 25, 2007 for PCT Application No. US2007/02721.

U.S. Appl. No. 13/202,877, filed Aug. 23, 2011, Vangbo et al.

U.S. Appl. No. 13/202,884, filed Aug. 23, 2011, Jovanovich et al.

Bennett, et al. Toward the 1,000 dollars human genome. Pharmacogenomics, 6 (4) 373-382. (Jun. 2005).

Chinese office action dated Jan. 31, 2011 for CN 200580035911.7. (In Chinese with English translation).

Erratum for Margulies, et al. Genome sequencing in microfabricated high-density picolitre reactors. Nature. 2005;437(7057):376-80.: Margulies, et al. Nature. 441(7089):120. (May 4, 2006).

International search report dated Sep. 1, 2010 for PCT/US2010/040490.

International search report and written opinion dated Mar. 24, 2011 for PCT Application No. US2010/058227.

International search report and written opinion dated Sep. 1, 2010 for PCT Application No. US2010/040490.

U.S. Appl. No. 13/075,165, filed Mar. 29, 2011, Eberhart et al.

U.S. Appl. No. 13/113,968, filed May 23, 2011, Majlof et al.

Armani, et al. Re-configurable fluid circuits by PDMS elastomer micromachining. Proceedings of IEEE Micro Electro Mechanical Systems: MEMS. 1999; 222-227.

European search report and search opinion dated Jun. 6, 2011 for Application No. 10011511.2.

International search report and written opinion dated Jun. 9, 2011 for PCT Application No. US2011/30973.

Notice of allowance dated Jun. 9, 2011 for U.S. Appl. No. 12/831,949.

U.S. Appl. No. 90/011,453, filed Jan. 21, 2011, Mathias et al.

European search report and search opinion dated Aug. 17, 2011 for Application No. 08799648.4.

Notice of allowance dated Sep. 8, 2011 for U.S. Appl. No. 12/820,390.

U.S. Appl. No. 12/026,510, filed Feb. 5, 2008, Jovanovich et al.

U.S. Appl. No. 12/526,015, filed Nov. 3, 2010, Jovanovich et al.
U.S. Appl. No. 12/815,685, filed Jun. 15, 2010, Jovanovich et al.
U.S. Appl. No. 12/820,390, filed Jun. 22, 2010, Harrison et al.
U.S. Appl. No. 12/845,650, filed Jul. 28, 2010, Jovanovich et al.
U.S. Appl. No. 12/852,370, filed Aug. 6, 2010, Harrison et al.
U.S. Appl. No. 12/949,623, filed Nov. 18, 2010, Kobrin et al.
Japanese Office Action dated Apr. 27, 2010 for Application No. JP2001-540363 (in Japanese with English translation).
Japanese Office Action dated Dec. 21, 2010 for Application No. JP2001-540363 (in Japanese with English translation).
MillGat pump user manual, version 2.12, published 2005, pp. 1-28.
U.S. Appl. No. 13/287,398, filed Nov. 2, 2011, Jovanovich et al.
Chinese office action dated Jul. 8, 2011 for CN 200580035911.7. (In Chinese with English translation).
International search report and written opinion dated Jan. 5, 2012 for PCT Application No. US2011/048527.
International search report and written opinion dated Oct. 26, 2011 for PCT Application No. US11/38180.
International written opinion dated Oct. 6, 2010 for PCT Application No. US10/37545.
International written opinion report dated Jul. 30, 2010 for PCT Application No. US2010/36464.
Japanese office action dated May 27, 2011 for Application No. 2007-532553 (in Japanese with English translation).
Japanese office action dated Jul. 28, 2011 for Application No. 2008-553535 (in Japanese with English translation).
Amendment and Request for Correction of Inventorship mailed Jan. 10, 2008 in U.S. Appl. No. 10/750,533.
Anderson, et al. A miniature integrated device for automated multistep genetic assays. Nucleic Acids Research. 2000;28:e60.
Bings, et al. Microfluidic Devices Connected to Fused-Silica Capillaries with Minimal Dead Dead Volume. Analytical Chemistry. 1999;71(15):3292-3296.
Blazej, et al. Microfabricated bioprocessor for integrated nanoliter-scale Sanger DNA sequencing. Proc. Natl. Acad. Sci. USA 2006;103:7240-7245.
Blazej, et al. Polymorphism Ratio Sequencing: A New Approach for Single Nucleotide Polymorphism Discovery and Genotyping. Genome Research. 2003;13:287-293.
Brenner, et al. Gene expression analysis by massively parallel signature sequencing (MPSS) on microbead arrays. Nature Biotechnology. 2000;18(6):630-634.
Buchholz, et al. The use of light scattering for precise characterization of polymers for DNA sequencing by capillary electrophoresis. Electrophoresis. 2001;22:4118-4128.
CAPLUS abstract of Krohkin et al. Modified silica as a stationary phase for ion chromatography. Journal of Chromatography A. 1995;706:93-8.
Chan, et al. Microfabricated Polymer Devices for Automated Sample Delivery of Peptides for Analysis by Electrospray Ionization Tandem Mass Spectrometry. Analytical Chemistry. 1999;71(20):4437-4444.
Chiem, et al. Microchip systems for immunoassay:, an integrated inunnoreactor with electrophoretic separation for serum theophylline determination. Clinical Chemistry.1998;44(3):591-598.
Chiem, et al. Room temperature bonding of micromachined glass devices for capillary electrophoresis. Sensors and Actuators. 2000;B63(3):147-152.
Coleman, et al. A sequential injection microfluidic mixing strategy. Microfluidics and Nanofluidics. 2005;319-327.
Curcio, et al. Continuous Segmented-Flow Polymerase Chain Reaction for High-Throughput Miniaturized DNA Amplification. Analytical Chemistry. 2003;75(1):1-7.
Diehl, et al. BEAMing: single-molecule PCR on microparticles in water-in-oil emulsions. Nature Methods. 2006;3(7):551-9.
Doherty, et al. Sparsely Cross-linked "Nanogel" Matrices as Fluid, Mechanically Stablized Polymer Networks for High-Throughput Microchannel DNA Sequencing. Analytical Chemistry. 2004;76:5249-5256.
Doherty, et al. Sparsely cross-linked "nanogels" for microchannel DNA sequencing. Electrophoresis. 2003;24(24):4170-4180.
Dorfman, et al. Contamination-Free Continuous Flow Microfluidic Polymerase Chain Reaction for Quantitative and Clinical Applications. Analytical Chemistry. 2005;77(11):3700-3704.

Doyle, et al. Self-Assembled Magnetic Matrices for DNA Separation Chips. Science. 2000;295:2237.
Dressman, et al. Transforming single DNA molecules into fluorescent magnetic particles for detection and enumeration of genetic variations. Proc Natl Acad Sci USA. 2003;100(15):8817-8822.
Emrich, et al. Microfabricated 384-Lane Capillary Array Electrophoresis Bioanalyzer for Ultrahigh-Throughput Genetic Analysis. Analytical Chemistry. 2002;74(19):5076-5083.
Ericson, et al. Electroosmosis- and Pressure-Driven Chromatography in Chips Using Continuous Beds. Analytical Chemistry. 2000;72(1):81-87.
European search report dated Dec. 18, 2009 for Application No. 03808583.3.
Ewing, et al. Base-Calling of Automated Sequencer Traces Using Phred. I. Accuracy Assessment. Genome Research. 1998;8:175-185.
Ewing, et al. Base-Calling of Automated Sequencer Traces Using Phred. II. Error probabilities. Genome Research. 1998;8:186-194.
Figeys, et al. A Microfabricated Device for Rapid Protein Identification by Microelectrospray Ion Trap Mass Spectrometry. Analytical Chemistry. 1997;69(16):3153-3160.
Figeys, et al. An Integrated Microfluidics-Tandem Mass Spectrometry System for Automated Protein Analysis. Analytical Chemistry. 1998;70(18):3728-3734.
Figeys, et al. Microfabricated Device Coupled with an Electrospray Ionization Quadrupole Time-of-Flight Mass Spectrometer: Protein Identifications Based on Enhanced-Resolution Mass Spectrometry and Tandem Mass Spectrometry Data. Rapid Communications in Mass Spectrometry. 1998;12:1435-1444.
Figeys, et al. Nanoflow Solvent Gradient Delivery from a Microfabricated Device for Protein Identifications by Electrospray Ionization Mass Spectrometry. Analytical Chemistry. 1998;70(18):3721-3727.
Francis, et al. Flow analysis based on a pulsed flow of solution: theory, instrumentation and applications. Talanta. 2002;58(6):1029-1042.
Ghadessy, et al. Directed evolution of polymerase function by compartmentalized self-replication. Proc Natl Acad Sci USA. 2001;98:4552-4557.
Giddings, et al. A software system for data analysis in automated DNA sequencing. Genome Research. 1998;8:644-665.
Goll, et al. Microvalves with bistable buckled polymer diaphragms. Journal of Micromechanics and Microengineering. 1996;6:77-79.
Grover, et al. An integrated microfluidic processor for single nucleotide polymorphism-based DNA computing. Lab on a Chip. 2005;5(10):1033-1040.
Grover, et al. Development and multiplexed control of latching pneumatic valves using microfluidic logical structures. Lab on a chip. 2006;6:623-631.
Grover, et al. Monolithic membrane valves and diaphragm pumps for practical large-scale integration into glass microfluidic devices. Sensors and Actuators. 2003;B89:315-323.
Grover, et al. Practical Valves and Pumps for Large-Scale Integration into Microfludic Analysis Devices. Micro Total Analysis Systems. 2002;1:136-138.
Hansen, et al. A robust and scalable microfluidic metering method that allows protein crystal growth by free interface diffusion. Proc Natl Acad Sci USA. 2002;99(26):16531-16536.
Harrison, et al. Micromachining a Miniaturized Capillary Electrophoresis-Based Chemical Analysis System on a Chip. Science. 1993;261(5123):895-897.
Hayes, et al. Edge: A Centralized Resource for the Comparison, Analysis, and Distribution of Toxicogenomic Information. Molecular Pharmacology. 2005;67(4):1360-1368.
Hultman, et al. Bidirectional Solid-Phase Sequencing of In Vitro-Amplified Plasmid DNA. BioTechniques. 1991;10(1):84-93.
International Preliminary Report for corresponding PCT Application No. PCT/CA2000/01421 dated Feb. 14, 2002.
International Preliminary Report for corresponding PCT Application No. PCT/U52005/018678 dated Nov. 13, 2007.
International Preliminary Report for corresponding PCT Application No. PCT/US2005/033347 dated Mar. 20, 2007.
International Preliminary Report for corresponding PCT Application No. PCT/US2007/007381 dated Sep. 23, 2008.

International Preliminary Report for corresponding PCT Application No. PCT/US2007/02721 dated Aug. 5, 2008.
International Preliminary Report for corresponding PCT Application No. PCT/US2007/061573 dated Aug. 26, 2008.
International search report dated Apr. 5, 2001 for PCT Application No. CA2000/01421.
International search report dated May 15, 2010 for PCT Application No. US2009/06640.
International search report dated Jul. 11, 2008 for PCT Application No. US07/61573.
International search report dated Jul. 30, 2010 for PCT Application No. US2010/36464.
International search report dated Aug. 23, 2006 for PCT Application No. US2005/033347.
International search report dated Aug. 26, 2004 PCT Application No. US2003/41466.
International Search Report for PCT/US2005/033347.
Jacobson, et al. Electrokinetic Focusing in Microfabricated Channel Structures. Anal. Chem., 1997, 69 (16), pp. 3212-3217.
Ju, et al. Fluorescence energy transfer dye-labeled primers for DNA sequencing and analysis. Proc. Natl. Acad. Sci. USA. 1995;92:4347-4351.
Kan, et al. A novel thermogelling matrix for microchannel DNA sequencing based on poly-N-alkoxyalkylaclylamide copolymers. Electrophoresis. 2003;24(24):4161-4169.
Koh, et al. Integrating Polymerase Chain Reaction, Valving, and Electrophoresis in a Plastic Device for Bacterial Detection. Analytical Chemistry. 2003;75(17):4591-4598.
Kopp, et al. Chemical Amplification Continuous-Flow PCR on a Chip. Science. 1998;280:1046-1048.
Lagally, et al. Fully integrated PCR-capillary electrophoresis microsystem for DNA analysis. Lab on a Chip. 2001;1(2):102-107.
Lagally, et al. Integrated Portable Genetic Analysis Microsystem for Pathogen/Infectious Disease Detection. Analytical Chemistry. 2004;76:3162-3170.
Lagally, et al. Monolithic integrated microfluidic DNA amplification and capillary electrophoresis analysis system. Sensors and Actuators. 2000;B63(3):138-146.
Lagally, et al. Single-Molecule DNA Amplification and Analysis in an Integrated Microfluidic Device. Analytical Chemistry. 2001;73(3): 565-570.
Lazar, et al. Subattomole-Sensitivity Microchip Nanoelectrospray Source with Time-of-Flight Mass Spectrometry Detection. Analytical Chemistry. 1999;71(17):3627-3631.
Li, et al. Integration of Microfabricated Devices to Capillary Electrophoresis-Electrospray Mass Spectrometry Using a Low Dead Volume Connection: Application to Rapid Analyses of Proteolytic Digests. Analytical Chemistry. 1999;71(15):3036-3045.
Li, et al. Rapid and sensitive separation of trace level protein digests using microfabricated devices coupled to a quadrupole—time-of-flight mass spectrometer. Electrophoresis. 2000;21:198-210.
Li, et al. Separation and Identification of Peptides from Gel-Isolated Membrane Proteins Using a Microfabricated Device for Combined Capillary Electrophoresis/Nanoelectrospray Mass Spectrometry. Analytical Chemistry. 2000;72(3):599-609.
Licklider, et al. A Micromachined Chip-Based Electrospray Source for Mass Spectrometry. Analytical Chemistry. 2000;72(2):367-375.
Lisec, et al. A bistable pneumatic microswitch for driving fluidic components. Sensors and Actuators. 1996;A54:746-749.
Liu, et al. Automated parallel DNA sequencing on multiple channel microchips. Proc. Natl. Acad. Sci. USA. 2000;97(10):5369-5374.
Liu, et al. Optimization of High-Speed DNA Sequencing on Microfabricated Capillary Electrophoresis Channels. Analytical Chemistry. 1999;71:566-573.
Margulies, et al. Genome sequencing in microfabricated high-density picolitre reactors. Nature. 2005;437(7057):376-80. (Abstact only).
Melin, et al. A Passive 2-Dimensional Liquid Sample Micromixer. 7th International Conference on Miniaturized Chemical and Biochemical Analysis Systems. 2003;167-170.
Mitra, et al. Digital genotyping and haplotyping with polymerase colonies. Proc Natl Acad Sci USA. 2003.100(10):15926-5931.

Norris, et al. Fully-integrated, multiplexed STR-based human identification using a single microfluidic chip and automated instrument. Available at http://www.promega.com/geneticidproc/ussymp20proc/oralpresentations/landersbienvenue.pdf. Accessed Jun. 2, 2010.
Obeid, et al. Microfabricated Device for DNA and RNA Amplification by Continuous-Flow Polymerase Chain Reaction and Reverse Transcription-Polymerase Chain Reaction with Cycle Number Selection. Analytical Chemistry. 2003;75(2): 288-295.
Ocvirk, et al. High Performance Liquid Chromatography Partially Integrated onto a Silicon Chip. Analytical Methods and Instrumentation. 1995;2:74-82.
Ocvirk, et al. Optimization of confocal epifluorescence microscopy for microchip-based miniaturized total analysis systems. The Analyst. 1998;123:1429-1434.
Office Action Final dated Feb. 19, 2008 issued in U.S. Appl. No. 10/540,658.
Office Action Final dated Feb. 6, 2008 issued in U.S. Appl. No. 11/139,018.
Office Action mailed Apr. 27, 2007 in U.S. Appl. No. 11/139,018, filed May 25, 2005.
Office Action mailed Jul. 2, 2007 in U.S. Appl. No. 10/540,658, filed Jun. 23, 2005.
Office Action mailed Jul. 12, 2007 in U.S. Appl. No. 10/750,533, filed Dec. 29, 2003.
Ohori, et al. Partly disposable three-way mirovalve for a medical micro total analysis system (muTAS). Sensors and Actuators. 1998;A64(1): 57-62.
Oleschuk, et al. Trapping of Bead-Based Reagents within Microfluidic Systems: On-Chip Solid-Phase Extraction and Electrochromatography. Analytical Chemistry. 2000;72:585-590.
Olsen, et al. Immobilization of DNA Hydrogel Plugs in Microfluidic Channels. Analytical Chemistry. 2002;74:1436-1441.
Paegel, et al. High-throughput DNA sequencing with a 96-lane capillary array electrophoresis bioprocessor. Proc Natl Acad Sci USA. 2002;99:574-579.
Paegel, et al. Microchip Bioprocessor for Integrated Nanovolume Sample Purification and DNA Sequencing. Analytical Chemistry. 2002;74(19):5092-5098.
Paegel, et al. Microfluidic devices for DNA sequencing: sample preparation and electrophoretic analysis. Current Opinion in Biotechnology. 2003;14(1):42-50.
Paegel, et al. Turn Geometry for Minimizing Band Broadening in Microfabricated Capillary Electrophoresis Channels. Analytical Chemistry. 2000;72:3030-3037.
PCT Notification of Transmittal of the International Search Report and The Written Opinion of the International Searching Authority, or the Declaration, mailed Jun. 17, 2008, Application No. PCT/US2007/082568 (UCALP067WO).
Peterson, et al. Enzymatic Microreactor-on-a-Chip: Protein Mapping Using Trypsin Immobilized on Porous Polymer Monoliths Molded in Channels of Microfluidic Devices. Analytical Chemistry. 2002;74:4081-4088.
Ramsey, et al. Generating Electrospray from Microchip Devices Using Electroosmotic Pumping. Analytical Chemistry. 1997;69(6):1174-1178.
Rohr, et al. Porous polymer monoliths: Simple and efficient mixers prepared by direct polymerization in the channels of microfluidic chips. Electrophoresis. 2001;22:3959-3967.
Rye, et al. High-sensitivity two-color detection of double-stranded DNA with a confocal fluorescence gel scanner using ethidium homodimer and thiazole orange. Nucleic Acids Research. 1991;19(2):327-333.
Scherer, et al. High-Pressure Gel Loader for Capillary Array Electrophoresis Microchannel Plates. Biotechniques. 2001;31(5):1150-1154.
Schomburg, et al. Design Optimization of Bistable Microdiaphragm Valves. Sensors and Actuators. 1998;A64:259-264.
Seifar, et al. Capillary electrochromatography with 1.8-mum ODS-modified porous silica particles. Journal of Chromatography. 1998; A808:71-77.

Simpson, et al. High-throughput genetic analysis using microfabricated 96-sample capillary array electrophoresis microplates. Proc Natl Acad Sci USA. 1998;95:2256-2261.

Simpson, et al. Microfabrication Technology for the Production of Capillary Array Electrophoresis Chips. Biomedical Microdevices. 1998;1:7-26.

Soper, et al. Sanger DNA Sequencing Reactions Performed in a Solid-Phase Nanoreactor Directly Coupled to Capillary Gel Electrophoresis. Analytical Chemistry. 1998;70:4036-4043.

Spiering, et al. Novel microstructures and technologies applied in chemical analysis techniques. 1997 International Conference on Solid-State Sensors and Actuators. 1997;1:511-514.

Takao, et al. A Pneumatically Actuated Full In-Channel Microvalve With MOSFET-Like Function in Fluid Channel Networks. Journal of Microelectromechanical Systems. 2002;11(5):421-426.

Takao, et al. Microfluidic Integrated Circuits for Signal Processing Using Analogous Relationship Betweeen Pneumatic Microvalve and MOSFET. Journal of Microelectromechanical Systems. 2003;12(4):497-505.

Thomas, et al. Application of Genomics to Toxicology Research. Environmental Health Perspectives. 2002;110(6):919-923.

Thorsen, et al. Microfluidic Large-Scale Integration. Science. 2002;298(5593):580-584.

Tice, et al. Formation of Droplets and Mixing in Multiphase Microfluidics at Low Values of the Reynolds and the Capillary Numbers. Langmuir. 2003;19:9127-9133.

Unger, et al. Monolithic Microfabricated Valves and Pumps by Multilayer Soft Lithography. Science. 2000;288:113-116.

Van Der Moolen, et al. A Micromachined Injection Device for CZE: Application to Correlation CZE. Analytical Chemistry. 1997;69(20):4220-4225.

Van Der Moolen, et al. Correlation Capillary Zone Electrophoresis, a Novel Technique to Decrease Detection Limits. Chromatographia. 1995;40(7/8):368-374.

Vazquez, et al. Electrophoretic Injection within Microdevices. Analytical Chemistry. 2002;74:1952-1961.

Veenstra, et al. The design of an in-plane compliance structure for microfluidical systems. Sensors and Actuators. 2002;B81:377-383.

Waller, et al. Quantitative Immunocapture PCR Assay for Detection of *Campylobacter jejuni* in Foods. Applied Environmental Microbiology. 2000; 66(9):4115-4118.

Weimer, et al. Solid-Phase Capture of Proteins, Spores, and Bacteria. Applied Environmental Microbiology. 2001;67(3):1300-1307.

Wen, et al. Microfabricated isoelectric focusing device for direct electrospray ionization-mass spectrometry. Electrophoresis. 2000;21:191-197.

Wikipedia brochure for defining stocahstic process. Sep. 2, 2009.

Williams, et al. Amplification of complex gene libraries by emulsion PCR. Nature Methods. 2006;3(7):545-50.

Woolley, et al. Functional Integration of PCR Amplification and Capillary Electrophoresis in a Microfabricated DNA Analysis Device. Analytical Chemistry. 1996;68(23):4081-4086.

Wright, et al. Behavior and Use of Nonaqueous Media without Supporting Electrolyte in Capillary Electrophoresis and Capillary Electrochromatography. Analytical Chemistry. 1997;69(16):3251-3259.

Xiang, et al. An Integrated Microfabricated Device for Dual Microdialysis and On-Line ESI-Ion Trap Mass Spectrometry for Analysis of Complex Biological Samples. Analytical Chemistry. 1999;71(8):1485-1490.

Xue, et al. Integrated Multichannel Microchip Electrospray Ionization Mass Spectrometry: Analysis of Peptides from On-Chip Tryptic Digestion of Melittin. Rapid Communications in Mass Spectrometry. 1997;11:1253-1256.

Xue, et al. Multichannel Microchip Electrospray Mass Spectrometry. Analytical Chemistry. 1997;69(3):426-430.

Yang, et al. A MEMS thermopneumatic silicone rubber membrane valve. Sensors and Actuators. 1998;A64(1):101-108.

Yu, et al. Preparation of Monolithic Polymers with Controlled Porous Properties for Microfluidic Chip Applications Using Photoinitiated Free Radial Polymerization. Journal of Polymer Science. 2002;40:755-769.

Yu, et al. Towards stationary phases for chromatography on a microchip: Molded porous polymer monoliths prepared in capillaries by photoinitiated in situ polymerization as separation media for electrochromatography. Electrophoresis. 2000;21:120-127.

Zhang, et al. A Microdevice with Integrated Liquid Junction for Facile Peptide and Protein Analysis by Capillary Electrophoresis/Electrospray Mass Spectrometry. Analytical Chemistry. 2000;72(5):1015-1022.

Zhang, et al. Microfabricated Devices for Capillary Electrophoresis-Electrospray Mass Spectrometry. Analytical Chemistry. 1999;71(15):3258-3264.

U.S. Appl. No. 13/349,832, filed Jan. 13, 2012, Eberhart et al.

U.S. Appl. No. 13/367,326, filed Feb. 6, 2012, Jovanovich et al.

U.S. Appl. No. 13/384,753, filed Jan. 18, 2012, Stern et al.

Allowed Claims dated May 6, 2010 for U.S. Appl. No. 11/726,701.

Allowed Claims dated Jul. 1, 2010 for U.S. Appl. No. 11/139,018.

Allowed Claims dated Aug. 13, 2008 for U.S. Appl. No. 10/750,533.

Auroux, et al. Micro Total Analysis Systems 2. Analytical Standard Operations and Applications. Anal. Chem. 2002; 2637-2652.

Belgrader, et al. A Minisonicator to Rapidly Disrupt Bacterial Spores for DNA Analysis. Anal. Che. 1999; 4232-4236.

Belgrader, et al. PCR Detection of Bacteria in Seven Minutes. Science Magazin. 1999; 284(5413):449-450.

Belgrader, et al. Rapid PCR for Identity Testing Using a Battery-Powered Miniature Thermal Cycler. J Forensic Sci. 1998; 315-319.

Birnboim. A Rapid Alkaline Extraction Method for the Isolation of Plasmid DNA. Methods of Enzymology. 1983; 100:243-255.

Blazej, et al. Inline injection microdevice for attomole-scale sanger DNA sequencing. Anal Chem. Jun. 15, 2007;79(12):4499-506. Epub May 12, 2007.

Burns, et al. An Integrated Nanoliter DBA Analysis Device. Science Magazine. 1998; 484-487.

Call, et al. Detecting and genotyping *Escherichia coli* 0157:H7 using multiplexed PCR and nucleic acid microarrays. International Journal of Food Microbiology. 2001; 67:71-80.

Cameron, et al. High Internal Phase Emulsions (HIPEs) Structure, Properties and Use in Polymer Preparation. University of Strathclyde. 1995; 163214.

Canadian Office Action dated Jun. 10, 2011 for CA Application No. 2512071.

Capanu, et al. Design Fabrication and Testing of a Bistable Electromagnetically Actuated Microvalve. Journal of Microelectromechanical System. 2000; 9:181-189.

Chandler, et al. Automated immunomagnetic separation and microarray detection of *E. coli* 0157:H7 from poultry carcass rinse. International Journal of Food Microbiology. 2001; 70:143-154.

Charlieu, et al. 3' Alu PCR: a simple and rapid method to isolate human polymorphic markers. Nucleic Acids Res. Mar. 25, 1992;20(6):1333-7.

Chinese office action dated Jan. 18, 2012 for CN 200980108368.7. (In Chinese with English translation).

Chinese Office Action dated Jan. 25, 2008 for Application No. 2003801100666.

Chinese office action dated Feb. 24, 2010 for CN Application No. 200780018073.1.

Delehanty, et al. A Microarray Immunoassay for Simultaneous Detection of Proteins and Bacteria. Anal. Chem. 2002; 74:5681-5687.

Dodson, et al. Fluidics Cube for Biosensor Miniaturization. Anal. Chem. 2001; 3776-3780.

Duffy, et al. Rapid Prototyping of Microfluidic Systems in Poly(dimethylsiloxane). Anal. Chem. 1998; 4974-4984.

European office action dated Apr. 7, 2011 for EP Application No. 05804847.1.

Gau, et al. A MEMS based amperometric detector for *E. coli* bacteria using self-assembled monolayers. Biosensors & Bioelectronic. 2001; 16:745755.

Hansen, et al. Polymerase chain reaction assay for the detection of *Bacillus cereus* group cells. FEMS Microbiology Letters. 2001; 202:209-213.

Hartmann, et al. Direct immobilization of antibodies on phthalocyaninato-polysiloxane photopolymers. Thin Solid Films. 1994; 245:206-210.

Hartmann, et al. One-step immobilization of immunoglobulin G and potential of the method for application in immunosensors. Sensors and Actuators. 1995; 28 (2):143-149.

He, et al. Fabrication of Nanocolumns for Liquid Chromatography. Anal. Chem. 1998; 3790-3797.

Hjerten. High-performance electrophoresis : Elimination of electroendosmosis and solute adsorption. J. Chromotography. 1985; 347:191-198.

Hosokawa, et al. A Pneumatically-Actuated Three-Way Microvalve Fabricated with Polydimcthylsiloxanc Using the Membrane Transfer Technique. J. Micinicch. Microcng. 2000; 10:415-420.

International search report and written opinion dated Oct. 29, 2007 for PCT/US2005/018678.

International search report and written opinion dated Mar. 16, 2012 for PCT/US2011/048528.

International search report and written opinion dated Apr. 30, 2012 for PCT/US2012/021217.

International search report and written opinion dated Jul. 15, 2008 for PCT/US2007/007381.

Jacobson, et al. High-Speed Separations on a Microchip. Anal. Chem. 1994; 1114-1118.

Jacobson, et al. Integrated Microdevice for DNA Restriction Fragment Analysis Anal. Chem. 1996; 720-723.

Japanese office action dated Jan. 5, 2012 for Application No. 2007-532553 (in Japanese with English translation).

Japanese Office Action dated Jan. 13, 2010 for JP Application No. 2005508628.

Japanese office action dated Mar. 1, 2011 for JP Application. No. 2007-515379.

Japanese office action dated May 11, 2012 for Application No. 2008-553535 (English translation).

Japanese Office Action dated Aug. 10, 2010 for JP Application No. 2005508628.

Kamei, et al. Integrated Amorphous Silicon Photodiode Detector for Microfabricaqted Capillary Electrophoresis Devices. Micro Total Analysis Systems. 2002; 257-259.

Kamei, et al. Integrated hydrogenated amorphous Si photodiode detector for microfluidic bioanalytical devices. Anal Chem. Oct. 15, 2003;75(20):5300-5.

Kimura, et al. Restriction-Site-Specific PCR as a Rapid Test to Detect Enterohemorrhagic *Escherichia coli* 0157:H7 Strains in Environmental Samples. Applied and Environmental Microbiology. Jun. 2000; 25132519.

Koch, et al. Optical flow-cell multichannel immunosensor for the detection of biological warfare agents. Biosens Bioelectron. Jan. 2000;14(10-11):779-84.

Kong, et al. Rapid detection of six types of bacterial pathogens in marine waters by multiplex PCR. Water Research. 2002; 36: 2802-2812.

Korean office action dated Mar. 5, 2012 for KR 10-2007-7008423. (In Korean with English translation).

Kourentzi, et al. Microbial identification by immunohybridization assay of artificial RNA labels. Journal of Microbiological Methods. 2002; 49:301-306.

Kuhnert, et al. Detection System for *Escherichia coli*-Specific Virulence Genes: Absence of Virulence Determinants in B and C Strains. applied and Environmental Microbiology. 1997:703-709.

Ligler, et al. Integrating Waveguide Biosensor. Anal Chem. Feb. 1, 2002;74(3):713-9.

Manz, et al. Miniaturized Total Chemical Analysis Systems: A Novel Concept for Chemical Sensing. Sensors & Actuators. 1990; 244-248.

McLaughlin, et al. Molecular Approaches to the Identification of *Streptococci*. Methods in Molecular Medicine. 1998; 15:117-139.

Medintz, et al. Genotyping Energy-Transfer Cassette Labeled Short Tandem Repeat Amplicons with Capillary Array Electrophoresis Microchannel Plates. Clinical Chemistry. 2001; 1614-1621.

Medintz, et al. High-Performance Genetic Analysis Using Microfabricated Capillary Array Electroporesis Microplates. Electrophoresis. 2001; 38453856.

Medintz, et al. High-Performance Multiplex SNP Analysis of Three Hemochmromatosis-Related Mutations with Capillary Array Electrophoresis Microplates. Genome Research. 2001; 413-421.

Medintz, et al. Novel Energy Transfer Fluorescence Labeling Cassette. BioTechniques. 2002; 32(2):270.

Nataro, et al. Diarrheagenic *Escherichia coli*. Clinical MicroBiology Reviews. Jan. 1998;142-201.

Notice of Allowance dated May 6, 2010 for U.S. Appl. No. 11/726,701.

Notice of Allowance dated Jul. 1, 2010 for U.S. Appl. No. 11/139,018.

Notice of Allowance dated Aug. 13, 2008 for U.S. Appl. No. 10/750,533.

Office action dated Jan. 7, 2011 for U.S. Appl. No. 12/844,544.
Office action dated Jan. 20, 2010 for U.S. Appl. No. 11/978,224.
Office action dated Feb. 22, 2010 for U.S. Appl. No. 11/139,018.
Office action dated Mar. 2, 2008 for U.S. Appl. No. 10/540,658.
Office action dated Mar. 30, 2012 for U.S. Appl. No. 12/795,515.
Office action dated Apr. 11, 2012 for U.S. Appl. No. 11/139,018.
Office action dated Apr. 29, 2009 for U.S. Appl. No. 11/139,018.
Office action dated May 22, 2012 for U.S. Appl. No. 12/526,015.
Office action dated Aug. 27, 2008 for U.S. Appl. No. 11/139,018.
Office action dated Oct. 8, 2008 for U.S. Appl. No. 10/540,658.
Office action dated Oct. 25, 2010 for U.S. Appl. No. 11/978,224.
Office action dated Nov. 6, 2009 for U.S. Appl. No. 11/139,018.
Office action dated Dec. 11, 2009 for U.S. Appl. No. 11/726,701.

O'Mahony, et al. A real time PCR assay for the detection and quantitation of *Mycobacterium avium* subsp. Paratuberculosis using SYBR Green and the Light Cycler. Journal of Microbiological Methods. 2002; 51:283-293.

Papadelli, et al. Rapid detection and identification of *Streptococcus macedonicus* by species-specific PCR and DNA hybridisation. International Journal of Food Microbiology. 2003; 81:231-239.

Peng, et al Immuno-capture PCR for detection of *Aeromonas hydrophila* Journal of Microbiological Methods. 2002; 49:335-338.

Press, et al., An Integrated Microfluidic Processor for Single Nucleotide Polymorphism-based DNA Computing, Lab on a Chip. 2005, 5:10, 8 pages.

Press, et al., The Art of Scientific Computing, Numerical Recipes in C, 2nd Edition, Cambridge University Press, 1992, (table of Contents).

Quake, et al. From Micro-to Nanofabrication with Soft Materials. Science Magazine. 2000; 1536-1540.

Reyes, et al. Micro Total Analysis Systems. 1. Introduction Theory and Technology. Anal Chem. 2002; 2623-2636.

Roth, et al. Fundamentals of Logic Design, $3^{rd}$ Edition, West Publishing Company, 1985 (Table of Content).

Rowe, et al. Array Biosensor for Simultaneous Identification of Bacterial, Viral and Protein Analytes. Anal. Chem. 1999; 71:3846-3852.

Rowe-Taitt, et al., Simultaneous detection of six biohazardous agents using a planar waveguide array biosensor. Biosensors & Bioelectronics. 2000; 15:579-589.

Ruan, et al. Immunobiosensor Chips for Detection of *Escherichia coli* 0157:H7 Using Electrochemical Impedance Spectroscopy. Anal. Chem. 2002; 74:4814-4820.

Sanford, et al. Photoactivatable Cross-Linked Polyacrylamide for the Site-Selective Immobilization of Antigens and Antibodies Chem Mater. 1998; 10(6): 15101520.

Shi, et al. Radial Capillary Array Electrophoresis Microplate and Scanner for High Performance Nucleic Acid Analysis. Anal. Chem. 1999; 5354-5361.

Soper, et al. Polymeric Microelectro-mechanical Systems. Anal. Chem 2000; 643-651.

Stumpfle, et al. Absence of DNA sequence homology with genes of the *Excherichia coli* hemB locus in Shiga-toxin producing *E. coli* (STEC) 0157 Strains. FEMS Microbiology Letters. 1999; 174:97-103.

Sun, et al. A Heater-Integrated Transparent Microchannel Chip for Continuous Flow PCR. Sensors and Actuators B. 2002; 84:283-289.

Tian, et al. Evaluation of Silica Resins for Direct and Efficient Extraction of DNA from Complex Biological Matrices in a Miniaturized Format. Analytical Biochemistry. 2000; 283:175-191.

Verlee, et al. .Fluid Circuit Technology: Integrated Interconnect Technology for Miniature Fluidic Devices. Abbott Laboratories Hospital Division, Abbott Park, IL. 1996; 9-14.

Walt, et al. Biological Warefare Detection. Analytical Chemistry 2000; 739-746.

Waters, et al. Microchip Device for Cell Lysis, Multiplex PCR Amplification, and Electrophoretic Sizing. Anal. Chem. 1999; 158-162.

Webster, et al. Monolithic Capillary Electrophoresis Device with Integrated Fluorescence Detector. Anal. Chem. 2001;1622-1626.

White, et al. Flash detection/identification of pathogens, bacterial spores and bioterrorism agent biomarker from clinical and environmental matrices. Journal of Microbiological Methods. 2002; 48:139-147.

Yacoub-George, et al. Chemiluminescence multichannel immunosensor for biodetection Analytica Chimica Acta. 2002; 457:3-12.

Yang, et al. An Integrated Stacked Microlaboratory for Biological Agent Detection with DNA and Immunoassays. Biosensors & Bioelectronics. 2002; 17:605-618.

Zhu, et al. High-Sensitivity Capillary Electrophoresis of Double-Stranded DNA Fragments Using Monomeric and Dimeric Fluorescent Intercalating Dyes. Anal Chem. 1994; 1941-1948.

Bianco, et al. Teflon-like Coatings for Micro Devices. CPAC Satellite Workshops. Mar. 23, 2009. Rome, Italy.

Blaga, et al. Plastic Chips with Valves and Pumps. Abstract, MSB Conference. Mar. 2008. Berlin, Germany.

Blaga, et al. Microfluidic Device for Automated Sample Preparation. Poster, MSB Conference. Oct. 2009. Dalian, China.

Franklin, et al. Apollo 200: An Integrated Platform for DNA Profiling. Poster, MSB Conference. Mar. 2010. Prague, Czech Republic.

Lee, et al. Polymer Nanoengineering for Biomedical Applications. Annals Biomed. Eng. 2006; 34:75-88.

Lu, et al. New Valve and Bonding Designs for Microfluidic Biochips Containing Proteins. Anal. Chem. 2007; 79:994-1001.

Oh, et al. A Review of Microvalves. J. Micromech. Microeng. 2006; 16:R13-R39.

Samel. Novel Microfluidic Devices Based on a Thermally Responsive PDMS Composite. Thesis for Ph.D. Program. Sep. 7, 2007. Stockholm, Sweden.

Tajima, et al. Physicochemical Properties and Morphology of Fluorocarbon Films Synthesized on Crosslinked Polyethylene by Capacitively Coupled Octafluorocyclobutane Plasma. J. Phys. Chem. C. 2007; 111(11):4358-4367.

Willis, et al. Monolithic Teflon Membrane Valves and Pumps for Harsh Chemical and Low-Temperature Use. Lab Chip. 2007; 7:1469-1474.

Zhang, et al. PMMA/PDMS Valves and Pumps for Disposable Microfluidics. Lab Chip. 2009; 9:3088-3094.

U.S. Appl. No. 61/204,179, filed Dec. 31, 2008, Jovanovich et al.

U.S. Appl. No. 61/205,534, filed Jan. 20, 2009, Jovanovich et al.

U.S. Appl. No. 61/162,080, filed Mar. 20, 2009, Jovanovich et al.

\* cited by examiner

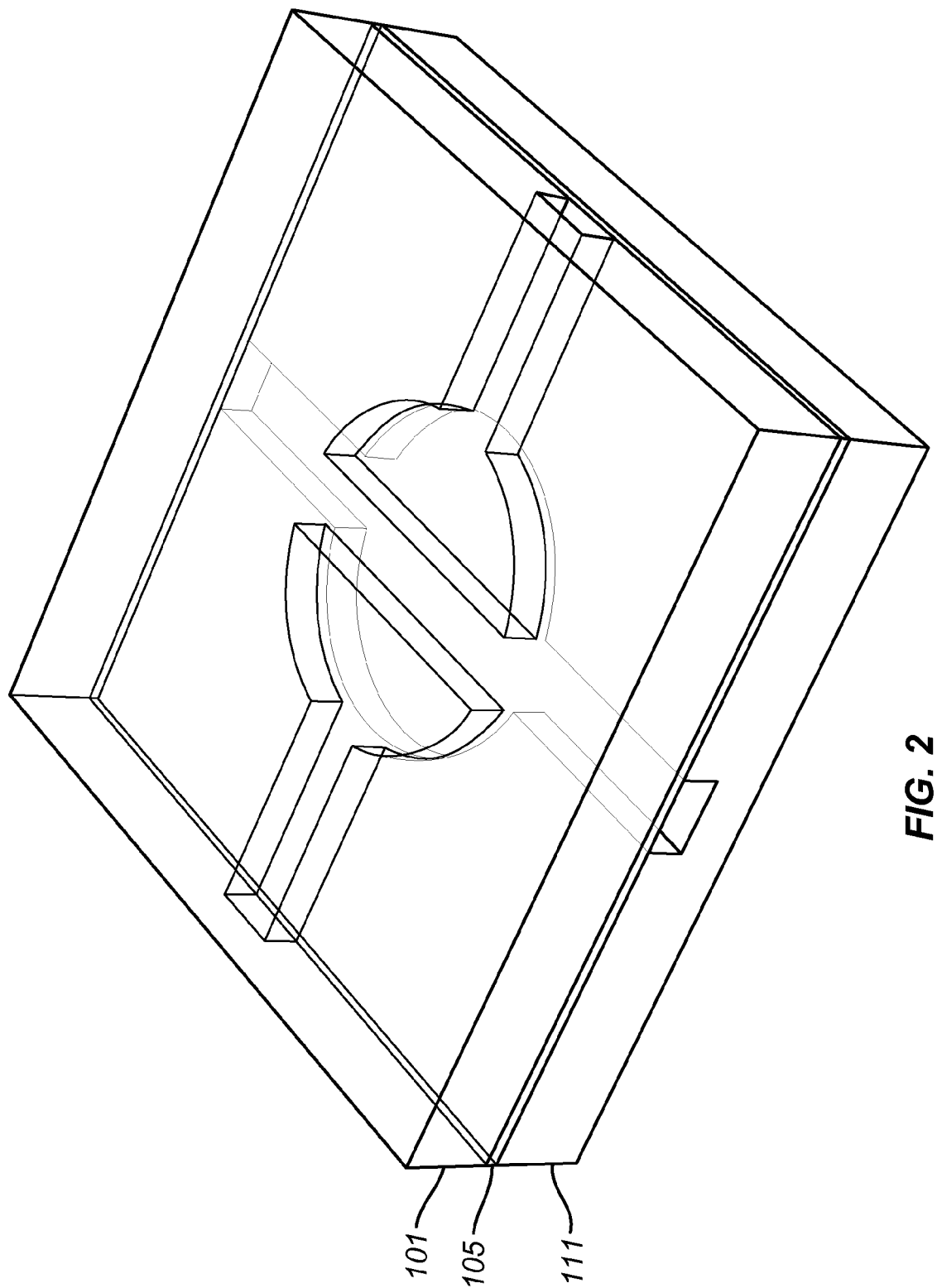

FLUIDIC DEVICES WITH DIAPHRAGM VALVES

CROSS-REFERENCE

This application is related to U.S. Ser. No. 61/183,468, filed Jun. 2, 2009 and U.S. Ser. No. 61/227,186, filed Jul. 21, 2009, which are incorporated herein by reference in their entirety for all purposes.

STATEMENT AS TO FEDERALLY SPONSORED RESEARCH

None.

BACKGROUND OF THE INVENTION

Mathies et al. (U.S. Patent Publication 2004-0209354) describes a microfluidic structure comprising: a first surface including a pneumatic channel; a second surface including a fluidic channel; and an elastomer membrane located between the first and second surfaces such that the application of a pressure or a vacuum to the pneumatic channel causes the membrane to deflect to modulate a flow of a fluid in the fluidic channel.

Fluid flow in a fluidic conduit of such devices can be regulated by a diaphragm valve in the conduit that comprises a valve seat on which the elastomer membrane sits. When in contact with the seat, the elastomer membrane blocks fluid flow across a fluidic conduit. When out of contact with the seat, a passage exists that allows fluid communication across the valve.

Anderson et al. (Nucleic Acids Res. 2000 Jun. 15; 28(12): E60) describes a plastic device held together using ultrasonic welding or adhesives.

In certain embodiments the elastomer membrane comprises a sheet of polydimethylsiloxane (PDMS) sandwiched between two glass layers. The elastomer membrane normally sits on a valve seat and is displaced from the valve seat by the application of negative pressure to the opposing surface of the elastomer. Typically, the elastomer membrane seals the valve through contact or bonding with the surface of the fluidic and pneumatic layers, and the valve functions as long as the elastomer membrane does not become stuck to the valve seat or other exposed surfaces or the device de-laminates as a result of insufficient bonding between the elastomer layer and the contacting surfaces of the fluidic and pneumatic layers.

SUMMARY OF THE INVENTION

In one aspect this invention provides a microfluidic device comprising a fluidics layer, an actuation layer and an elastic layer sandwiched between the fluidics layer and the actuation layer, wherein: (a) the fluidics layer and the actuation layer comprise sealing surfaces that contact the elastic layer; and (b) the fluidics layer comprises a plurality of fluid conduits comprising surfaces, and the actuation layer comprises a plurality of actuation conduits comprising surfaces, wherein at least a portion of the surfaces of the fluid conduits and actuation conduits are exposed to the elastic layer and wherein at least a portion of the exposed surfaces comprise a low surface energy material. In one embodiment the device further comprises a plurality of diaphragm valves that each regulate fluid flow in a fluid conduit, wherein each diaphragm valve comprises (i) a valve body comprising an exposed surface of the actuation layer, (ii) a valve seat comprising an exposed surface of the fluidic layer, (iii) a diaphragm comprised in the elastic layer and configured to sit on or off a surface of the valve seat, and (iv) valve ports configured to allow fluid to enter and exit the valve, wherein at least a portion of the valve seat surface comprises the low surface energy material. In another embodiment the sealing surfaces do not comprise the low energy material. In another embodiment at least one fluidic conduit further comprises a chamber comprising an exposed surface that does not comprise a valve seat, wherein at least a part of the exposed surface of the chamber comprises the low surface energy material. In another embodiment at least a part of the valve body comprises the low surface energy material. In another embodiment all exposed surfaces of the valve comprise the low surface energy material. In another embodiment all exposed surfaces of the fluidic conduits and the actuation conduits comprise the low surface energy material. In another embodiment the exposed surfaces are patterned to have only some of the exposed surfaces comprise the low surface energy material. In another embodiment the low surface energy material is selected from a self-assembled monolayer, parylene, diamond-like carbon and a metal oxide (e.g., from titania and alumina), a metal and a ceramic. In another embodiment, the low surface energy material comprises a noble metal, such as gold. In another embodiment, the noble metal is coated on a layer of a refractory metal, such as chromium. In another embodiment the low surface energy material comprises a perfluorinated polymer. In another embodiment the low surface energy material comprises poly (tetrafluoroethylene) (Teflon®). In another embodiment the surfaces comprising the low surface energy material have a water contact angle at least 20° greater than the contact surfaces. In another embodiment the low surface energy material have a water contact angle at least 100°. In another embodiment the fluidics layer or the actuation layer comprise a material selected from glass (e.g., borosilicate glasses (e.g., borofloat glass, Corning Eagle 2000, pyrex), silicon, quartz, and plastic (e.g., a polycarbonate, an olefin co-polymer (e.g., Zeonor), a cycloolefin co-polymer, a silicon acrylic, a liquid crystal polymer, polymethylmethoxyacrylate (PMMA), a polystyrene, a polypropylene, and a polythiol). In another embodiment the elastic layer comprises a material selected from a thermoplastic or a cross-linked plastic. In another embodiment the elastic layer comprises a material selected from silicones (e.g., polydimethylsiloxane), polyimides (e.g., Kapton™, Ultem), cyclic olefin co-polymers (e.g., Topas™, Zeonor), rubbers (e.g., natural rubber, bursa, EPDM), styrenic block co-polymers (e.g., SEBS), urethanes, perfluoro elastomers (e.g., Teflon, PFPE, Kynar), Mylar, Viton, polycarbonate, polymethylmethacrylate, santoprene, polyethylene, and polypropylene. In another embodiment the elastic layer comprises a silicone. In another embodiment the elastic layer comprises PDMS. In another embodiment the elastic layer comprises PDMS treated by degassing and UV ozone ionization. In another embodiment the sealing surfaces are heat-bonded to the elastic layer. In another embodiment the sealing surfaces held by pressure to the elastic layer. In another embodiment a monolithic elastic layer covers a plurality of the valve seats. In another embodiment the actuation layer is a pneumatic layer. In another embodiment the actuation layer comprises at least one actuation conduit that actuates a plurality of diaphragm valves on different fluidic conduits. In another embodiment the device further comprises external ports communicating with the fluidic channels. In another embodiment the device further comprises fluidic conduits separated by no more than 1 mm. In another embodiment the device further comprises a fluidics layer with at least 5 fluidic circuits per 1000 mm$^2$.

In another aspect this invention provides a microfluidic device comprising a fluidics layer and an elastic layer contacting a face of the fluidics layer, wherein: (a) the fluidics layer comprises a plurality of fluid conduits comprising fluid-contacting surfaces, wherein at least a portion of the fluid-contacting surfaces are exposed to the elastic layer; and (b) the face comprises sealing surfaces bonded to the elastic layer to seal the fluid conduits at exposed fluid-contacting surfaces; wherein at least a portion of the exposed fluid-contacting surfaces comprise a low surface energy material having greater hydrophobicity than a sealing surface.

In another aspect this invention provides a system comprising: (a) a device of claim 2; (b) a fluid delivery system configured to deliver fluid to the fluidic conduits; and (c) a control system configured to control the actuation layer. In one embodiment the actuation layer is a pneumatic layer. In another embodiment the system further comprises a computer programmed and configured to control action of the fluid delivery system and the control system.

In another aspect this invention provides a method of making a microfluidic device comprising: (a) providing a fluidic layer comprising (i) at least one fluidic conduit comprising a surface and (ii) a face comprising at least one sealing surface wherein at least a portion of each fluidic conduit surface is exposed to the face and at least a portion of each exposed fluid conduit surface comprises a material having lower surface energy than a sealing surface; and (b) bonding an elastic layer to a sealing surface but not to an exposed fluid conduit surface. In one aspect the method further comprises (c) removing the low energy material from an exposed surface after bonding. In another aspect the method further comprises (c) providing an actuation layer comprising (i) at least one actuation conduit comprising a surface and (ii) a face comprising at least one sealing surface wherein at least a portion of each actuation conduit surface is exposed to the face; and (d) bonding the elastic layer to the actuation sealing surface but not to and exposed actuation conduit surface. In another embodiment the device comprises a plurality of diaphragm valves that each regulate fluid flow in a fluid conduit, wherein each diaphragm valve comprises (i) a body comprising an exposed surface of the actuation layer, (ii) a valve seat comprising an exposed surface of the fluidic layer, (iii) a diaphragm comprised in the elastic layer and configured to sit on or off a surface of the valve seat, and (iv) valve ports configured to allow fluid to enter and exit the valve, wherein at least a portion of the valve seat surface comprises the low surface energy material. In another embodiment at least a surface of the valve seat comprises the low surface energy material. In another embodiment providing the fluidics layer comprises: (i) providing a fluidics layer comprising a plurality of fluidic conduits comprising surfaces and a face comprising at least one sealing surface, wherein at least a portion of each fluidic conduit surface is exposed to the face; and (ii) coating at least a portion of the exposed surface with a material having lower surface energy than the sealing surface. In another embodiment providing the actuation layer comprises: (i) providing an actuation layer comprising a plurality of actuation conduits comprising surfaces and a face comprising at least one sealing surface wherein at least a portion of each actuation conduit surface is exposed to the face; and (ii) coating at least a portion of the exposed surface with a material having lower surface energy than the sealing surface. In another embodiment coating at least a portion of the exposed surface comprises: (1) covering the face with a shadow mask, wherein the mask has openings that expose portions of the surface to be coated with the low surface energy material; and (2) depositing the low surface energy material on the exposed portions.

In another embodiment depositing is performed by chemical vapor deposition. In another embodiment depositing is performed by physical vapor deposition. In another embodiment coating the exposed surface comprises: (1) depositing the low surface energy material on the face and exposed surfaces; and (2) selectively removing the low surface energy material from the face using a shadow mask and exposure to UV ozone or oxygen plasma. In another embodiment coating the exposed surface comprises: (1) activating or deactivating portions of the face or exposed surface to be coated or left bare; and (2) exposing the surface to the low surface energy material, wherein the material adheres to the exposed surface. In another embodiment coating the exposed surface comprises: (1) depositing the low surface energy material through a photoresist patterned mask; (2) contacting the face of the fluidics layer with the mask; and (3) removing the mask in a lift-off process that leaves the low surface energy material on the exposed surface. In another embodiment the at least one microfluidic channel is a plurality of microfluidic channels. In another embodiment the elastic layer is heat-bonded to the sealing area. In another embodiment the elastomeric material is monolithic.

In another aspect this invention provides a method comprising: (a) treating a layer of silicone (e.g., PDMS) by degassing and UV ozone ionization and (b) bonding the treated silicone to a surface of a layer etched with conduits.

In another aspect this invention provides a method comprising: (a) creating a sandwich comprising a first layer comprising at least one conduit exposed to a surface, a second layer comprising at least one conduit exposed to a surface, and an elastic layer between the two surfaces; (b) bonding the elastic layer to the surfaces; and (c) flushing the conduits with PEG or 1-2 propane diol.

In another aspect this invention provides a method comprising: (a) providing a device of claim 2 having fluid in the microfluidic conduit, wherein the diaphragm valve is closed; (b) opening the diaphragm valve; (c) allowing fluid to pass through the open valve; and (d) closing the valve.

In another aspect this invention provides a microfluidic device comprising a plurality of diaphragm valves, wherein the valves have a failure rate of less than $1/1000$ actuations, $1/10,0000$ actuation or $1/100,000$ actuations. In other embodiments the device comprises at least 10 seated diaphragm valves, at least 50 seated diaphragm valves or at least 100 seated diaphragm valves. In another embodiment the device comprises a density of at least 1 diaphragm valve per 1 $cm^2$.

In another aspect this invention provides a microfluidic device comprising plurality of diaphragm valves wherein the device is a member of a batch of at least 10 microfluidic devices having a plurality of diaphragm valves that has a device failure rate of less than 20%, less than 1% or less than 0.1%.

In another aspect this invention provides a device comprising: (a) a first layer having a first surface wherein the surface comprises a plurality of defined treated areas, and (b) a flexible layer wherein the flexible layer is bonded to a portion of the first surface and is not bonded to the first surface at the defined treated areas.

In another aspect this invention provides a microfluidic device comprising a fluidics layer, an actuation layer and an elastic layer sandwiched between them, wherein: (a) the fluidics layer and the actuation layer comprise sealing surfaces that contact the elastic layer; and (b) the fluidics layer comprises a plurality of fluid conduits comprising surfaces, and the actuation layer comprises a plurality of actuation conduits comprising surfaces, wherein at least a portion of the surfaces of the fluid conduits and actuation conduits are exposed to the elastic layer; wherein the microfluidic device comprises a plurality of diaphragm valves that each regulate fluid flow in a fluid conduit, wherein each diaphragm valve comprises (i) a body comprising an exposed surface of the actuation layer and in the fluidics layer, (ii) a diaphragm comprised in the elastic layer and configured to sit on or off a surface of the valve seat, and (iii) valve ports configured to allow fluid to enter and exit the valve, wherein at least a portion of the exposed surface of the fludic layer in the body is derivatized with a binding functionality. In one embodiment the valve further comprises a valve seat comprising an exposed surface of the fluidic layer, wherein the diaphragm is configured to sit on the valve seat to close the valve and the valve seat is not derivatized with the binding functionality. In another embodiment surfaces of fluidic channels are not derivatized with the binding functionality. In another embodiment the binding functionality comprises a nucleic acid, a protein, a carbohydrate, a metal, or a metal chelate.

In another aspect this invention provides a microfluidic device comprising first and second substrate layers and an elastic layer sandwiched in between and contacting sealing surfaces of the substrate layers, wherein the device comprises at least one diaphragm valve comprised of a body comprised of a cavity in at least one substrate layer, a diaphragm comprised of a portion of the elastic layer and ports to allow entry of fluid into and out of the valve, wherein the fluid contacts a fluid contacting surface in the valve, and the device is configured so that the elastic layer is bonded to the sealing surface but is not bonded to the fluid contacting surfaces. In one embodiment the device further comprises a valve seat having a fluid contacting surface. In another embodiment at least a portion of the fluid contacting surface comprises a low energy material that the sealing surface does not comprise.

In another aspect this invention provides a fluidics layer, an adhesive layer on a surface of the fluidics layer and an elastic layer adhered to the adhesive layer, wherein: (a) the fluidics layer comprises a plurality of fluid conduits comprising fluid-contacting surfaces, wherein at least a portion of the fluid-contacting surfaces are exposed to the elastic layer; and (b) the adhesive layer is separated from at least part of the fluid conduits by a ridge in the fluidic layer. In one embodiment, the adhesive layer comprises a tape, a liquid or a semi-liquid. In another embodiment, the adhesive comprises an acrylic based adhesive or a silicone-based adhesive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 shows an assembled diaphragm valve in three dimensions.

DETAILED DESCRIPTION OF THE INVENTION

1. Introduction

Figure 1:
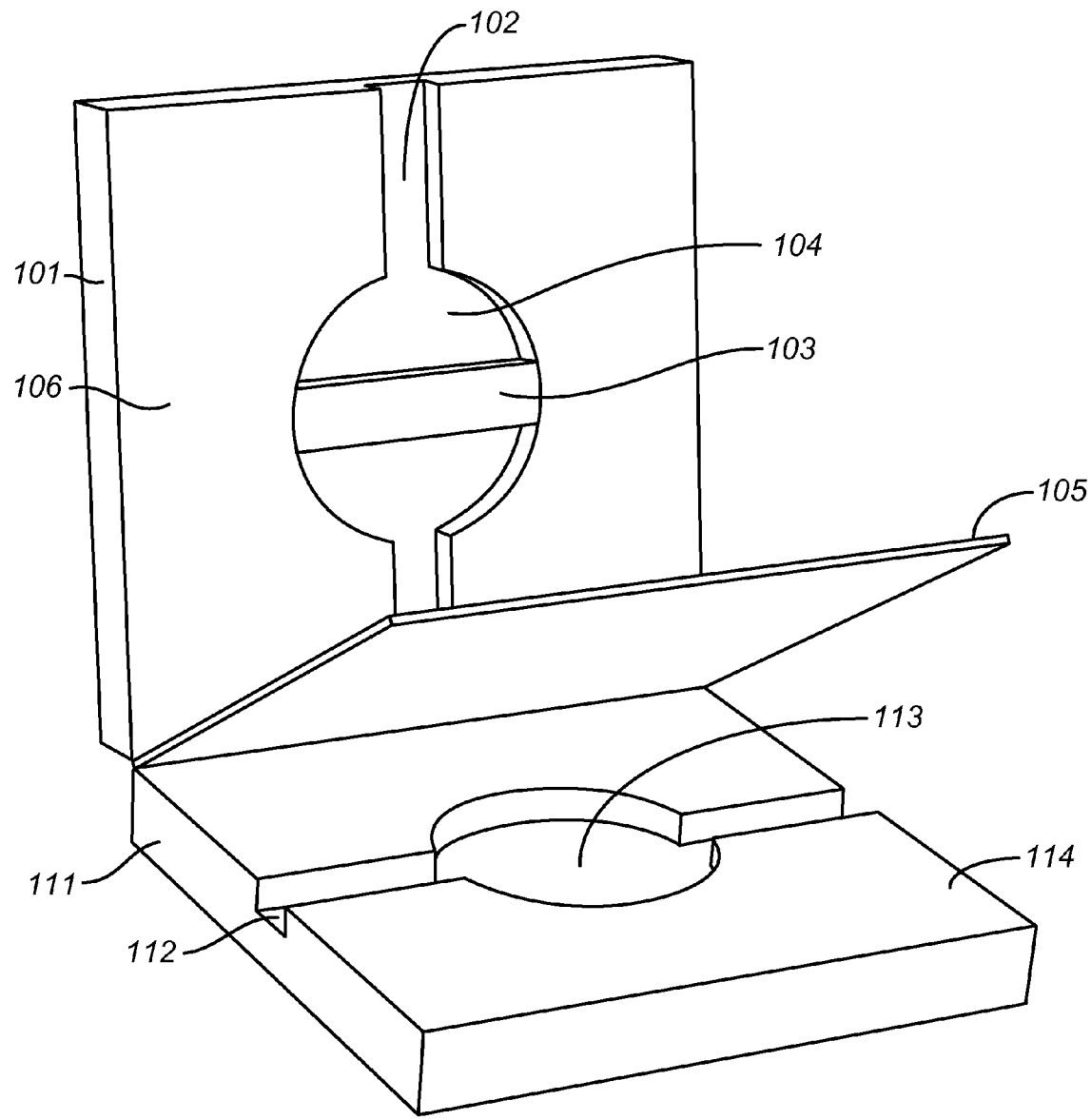
FIG. 1 shows a clamshell view of one embodiment of a diaphragm valve of this invention. A fluidics layer 101 comprises a fluid conduit comprising a fluidic channel 102 interrupted by a valve seat 103 which, in this case, is flush with the surface of the fluidic layer. In this embodiment, fluidic channel opens into a fluidics valve body 104. One face of the fluidics layer contacts the elastic layer 105 in the assembled device. This face comprises sealing surfaces 106, to which the elastic layer can be sealed, and exposed surfaces of the functional components—fluidic conduit including the valve seat. An actuation layer 111, comprises an actuation conduit comprising an actuation channel 112 and an actuation valve body 113 disposed opposite the valve seat. The actuation layer also comprises a face that contacts the elastic layer in the assembled device that has sealing surfaces 114 and exposed surfaces (surfaces of 112 and 113) of functional elements. The stippled area represents a coating of low energy material.

The fluidic devices of this invention comprise at least one or a plurality of fluidic conduits in which fluid flow is controlled by, for example, on-device diaphragm valves and pumps actuatable by, for example, pneumatics or hydraulics. The devices typically comprise a fluidics layer bonded to an elastic layer, wherein the elastic layer functions as a deflectable diaphragm that regulates flow of fluids across interruptions (e.g., valve seats) in the fluidic pathways in the fluidics layer. The elastic layer can comprise a polysiloxane, such as PDMS. In other embodiments, the device comprises three layers: a fluidics layer, an actuation layer and an elastic layer sandwiched there-between. The three layers are bonded together into a unit. Actuation conduits can be disposed as apertures, e.g., bores, through the layer or as channels cut into the surface of the layer and opening at an edge of the piece. In the case of a bore, the actuation layer can be configured so that one conduit controls one valve. Alternatively, when the actuation conduit is configured as a channel across a surface of the actuation layer, one conduit can control the operation of a plurality of valves. In other embodiments, the fluidics layer and the elastic layer can be bonded together to form a single unit that can be mated with and removed from the actuation layer, e.g., by applying and releasing pressure, for example by clamping. The devices are configured to decrease sticking between the elastic layer and functional elements of the device, such as fluidic or actuation conduits, such as valve seats, valve chambers and channels. This is accomplished, for example, by treating functional surfaces with low surface energy materials or by providing materials to bond fluidic or actuation layers to the elastic layer without bonding the elastic layer to the functional parts in the process.

Fluidic conduits and actuation conduits may be formed in the surface of the fluidic or actuation layer as furrows, dimples, cups, open channels, grooves, trenches, indentations, impressions and the like. Conduits or passages can take any shape appropriate to their function. This includes, for example, channels having, hemi-circular, circular rectangular, oblong or polygonal cross sections. Valves, reservoirs and chambers having circular or other shapes and having dimensions that are larger than channels to which they connect can be made. Areas in which a conduit becomes deeper or less deep than a connecting passage can be included. The conduits comprise surfaces or walls that contact fluids flowing through them. The fluid in the fluidic layer can be a liquid or a gas. In the case of an actuation layer, the fluid is referred to as an actuant. It can be a gas or a liquid.

The fluidics layer, itself, can be comprised of one or more sublayers, wherein channels in certain sublayers connect through vias in other sublayers to communicate with other channels or with the elastic layer. In multiple sublayer situations, fluidic paths can cross over one another without being fluidically connected at the point of crossover.

The diaphragm valves and pumps are comprised of functional elements in the three layers. A diaphragm valve comprises a body, a seat (optionally), a diaphragm and ports configured to allow fluid to flow into and out of the valve. The body is comprised of a cavity or chamber in the actuation layer that opens onto the surface facing the elastic layer (e.g., FIG. 1, 113) ("actuation valve body"). Optionally, the valve body also includes a chamber in the fluidics layer that opens onto a surface facing the elastic layer and which is disposed opposite the actuation layer chamber (e.g., FIG. 1, 104) ("fluidics valve body"). The actuation layer chamber communicates with a passage, e.g., a channel, through which positive or negative pressure can be transmitted by the actuant. When the actuant is a gas, e.g., air, the actuation layer functions as a pneumatics layer. In other embodiments, the actuant is a liquid, such as water, oil etc. The fluidics layer can comprise a valve seat that faces the elastic layer. The valve seat interrupts a fluidic channel either directly or by being disposed within a body chamber in the fluidics layer. The diaphragm is included in the elastic layer. The valve may be configured so that the diaphragm naturally sits on the valve seat, thus closing the valve, and is deformed away from the seat to open the valve. The valve also may be configured so that the diaphragm naturally does not sit on the seat and is deformed toward the seat to close the valve. When the diaphragm is off the valve seat, it creates a fluidic chamber or passage through which fluid may flow. The channel is in fluid communication with the valve chamber through the valve ports.

Figure 14:
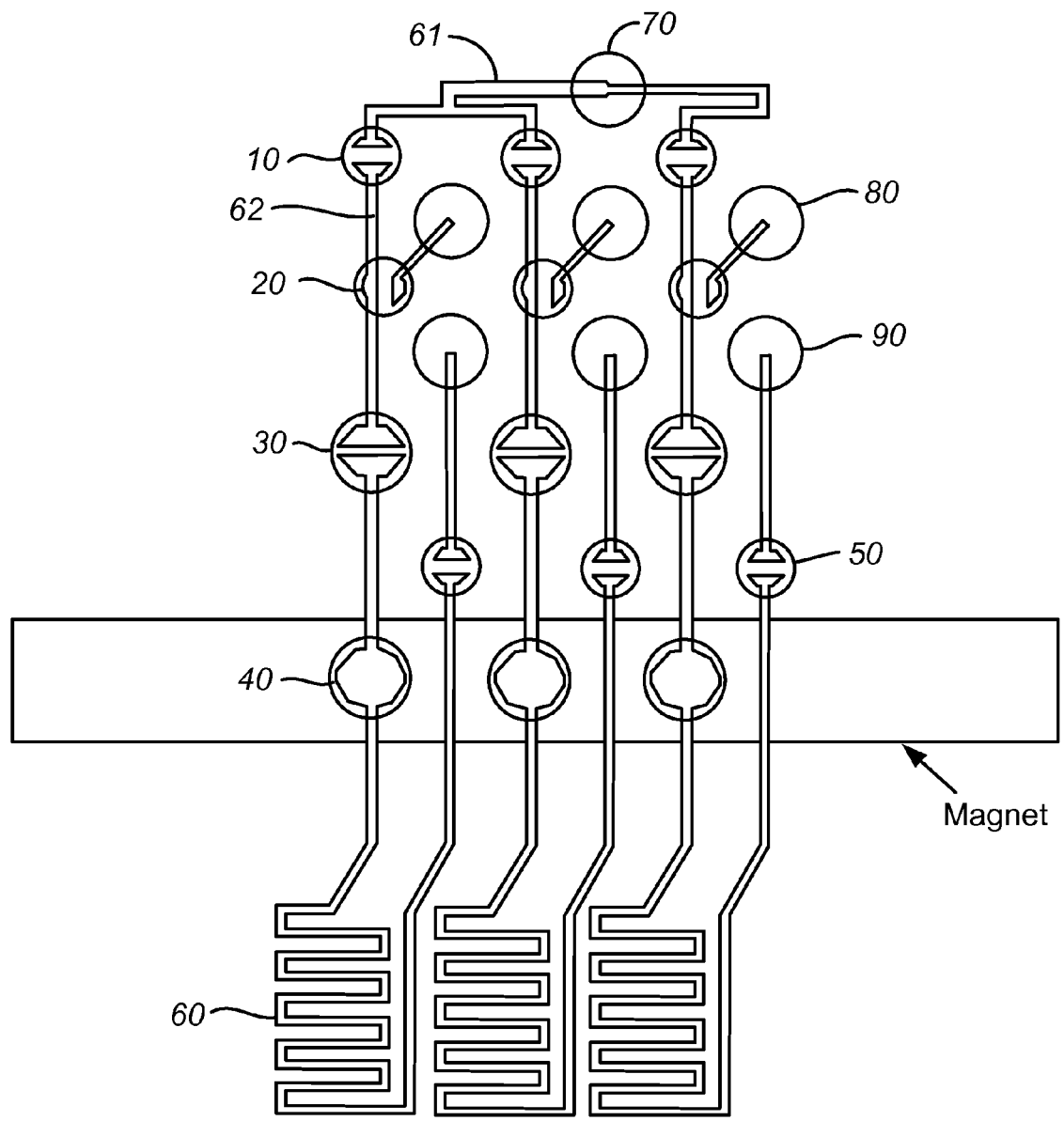
FIG. 14 shows the fluidic architecture for three microfluidic circuits connected by a common port 70.

In another embodiment a diaphragm valve is formed from a body comprising a chamber in the actuation layer and the fluidics layer, but without an interruption or valve seat (e.g., FIG. 14, valve 40). In this embodiment, deforming the diaphragm into the actuation chamber creates a volume to accept fluid, and deforming the diaphragm into the fluidics chamber pumps liquid out of the pump or seals a valve. In this configuration, the position of the diaphragm also can regulate the speed of flow through the pump by changing the volume of the fluidic passage. This type of valve is useful as a fluid reservoir and as a pumping chamber and can be referred to as a pumping valve.

The ports into a valve can take a variety of configurations. In certain embodiments, the fluidic channels are comprised on the surface of the fluidics layer that faces the elastic layer. A valve can be formed where an interruption interrupts the channel. In this case, the port comprises that portion of the channel that meets the interruption and that will open into the valve chamber when the diaphragm is deflected. In another embodiment, a fluidic channel travels within a fluidics layer. In this case, ports are formed where two vias made in the fluidics layer communicate between two channels and the elastic layer across from an actuation valve body. (The two adjacent vias are separated by an interruption that can function as a valve seat.) In another embodiment, a fluidic channel is formed as a bore that traverses from one surface of the fluidic layer to the opposite surface which faces the elastic layer. A pair of such bores separated by an interruption can function as a valve. When the elastic layer is deformed away from the interruption (to which it is not bonded), a passage is created that allows the bores to communicate and for fluid to travel in one bore, through the valve and out the other bore.

In the sandwich configuration just described, the surface or face of the fluidics or actuation layer that faces the elastic layer generally comprises a substantially planar, flat or smooth surface into which indentations, depressions or etchings have been made to form the functional elements of fluidics and actuation layers, e.g., channels, chambers and valves. A portion of this surface (e.g., a planar, smooth or flat surface) that contacts the elastic layer is referred to as a contact surface. Portions of the surfaces that are indented, depressed or etched that face the elastic layer but are not intended to seal with the elastic layer, are referred to as "exposed surfaces". Surfaces over which fluid flows, including conduits, channels, valve or pump bodies, valve seats, reservoirs, and the like are referred to as "functional surfaces".

In the construction of the fluidic device, contact of the elastic layer to all or part of the contact surfaces, e.g., by pressure or bonding, can function to cover exposed conduits and contain liquid within the fluid or actuation conduits. The contact surfaces to which the elastic layer is bonded are referred to as "sealing surfaces". In the functioning of the valves and pumps, a diaphragm can move on or off a valve seat or contact surface and move toward or away from the surface of a body chamber in the fluidics or actuation layer. If the elastic layer sticks to a valve seat, contact surface, or to any exposed functional surface of the device, the device may not function properly.

1.1. Functional Surfaces with Low Energy Materials

This invention provides devices in which part or all of the functional surfaces are configured not to stick to or bond with the elastic layer during manufacture or use of the device. Functional surfaces can be so configured by providing them with materials having a low surface energy. The functional surfaces can be configured to have lower surface energy than the portions of the contact surfaces that seal the functional elements. Low surface energy materials can be formed that are more hydrophobic, less chemically reactive or otherwise less sticky than the sealing surfaces. In certain embodiments, the elastic layer does not comprise a low surface energy material.

For example, the exposed functional surfaces can be treated such that the sealing surfaces will form a chemical bond with the elastic layer, but the functional surfaces will not form a chemical bond. The exposed functional surfaces can be more hydrophobic or less chemically reactive than the sealing surfaces of the fluidic and/or actuation layers. In the assembled device, the elastic layer can be bonded to the sealing surfaces but not to the exposed functional surfaces. This can be accomplished by selectively treating functional surfaces but not sealing or contact surfaces to comprise a low surface energy material.

All or part of an exposed functional surface can be made less sticky in the devices of this invention. In certain embodiments, any functional surface likely to come into contact with the elastic layer during operation of the device is made less sticky. In other embodiments all or part of the surface of the valve seat is made less sticky. In this way, a valve is less likely to become stuck shut during manufacture or use thus producing a more reliable valve and device. In other embodiments, all or part of any other exposed surface in a valve or pump body also can be made less sticky, including the all or part of the chambers in the actuation layer or the fluidics layer. All or part of fluidic or actuation channels that are exposed to the surface also can be configured to be less sticky. Surfaces can be made less sticky by providing them with a low surface energy material, particularly during a bonding process, or by protecting the surface from bonding to the elastic layer during manufacture, optionally followed by removing a protectant.

The portions of the exposed fluidic or actuation surfaces can be configured to be less sticky than the entire contact surfaces of the fluidic and actuation surfaces which enables selective bonding of the elastomer to controlled areas of the valve. Alternatively, only portions of the contact surfaces meant to act as sealing surfaces can be more sticky than the portions of the exposed functional surfaces. These areas generally are adjacent to or border the edges of the exposed surfaces. More sticky areas can include those portions of a contact surface between functional elements less than 1 mm apart on a fluidic or actuation surface.

In another embodiment, a low energy material, e.g., a hydrophobic material, can be applied to selected functional surfaces and the device can be assembled and then treated to bond the elastic layer to the contact surfaces. Then, the low energy material can be removed from the functional surfaces. In this way, the low energy material functions as a sacrificial layer to protect the functional surfaces during the bonding process, and the valves can function after the material is removed without sticking to the elastic layer.

After bonding the layers together, the conduits can be flushed with, for example, PEG (e.g., PEG-200) or 1-2 propane diol (Sigma #398039).

The devices of this invention have very low failure rates. A device is considered to fail when at least one fluidic circuit fails to perform. Failure can result from delamination of the sandwich, for example when bonding between the layers fail, or from sticking of the elastic layer to functional portions of the fluidics or elastic layers, such as sticking to valve seats, valve chambers or channels on the layer surface that are exposed to the elastic layer.

The devices of this invention can perform more reliably than devices in which functional surfaces do not comprise low surface energy materials. A batch of devices according to this invention have failure rates of less than 20%, less than 10%, less than 1% or less than 0.1%. A batch can be at least 10, at least 50 or at least 100 devices.

Valves of this invention can have a failure rate of less than 1% over 1,000 actuations, over 10,000 actuations or over 100,000 actuations. Devices herein can have failure from delamination at a rate of 1% over 1,000 actuations, over 10,000 actuations or over 100,000 actuations.

1.2. Valve and Compartment Surfaces Coated with Binding Functionalities

Certain functional surfaces in the fluidics layer can be functionalized to have chemical or biochemical binding functionalities attached thereto. These surfaces typically will include functional surfaces of seated or unseated valves. In various embodiments, valve seats and/or functional surfaces that not part of a valve, such as a channel or a chamber in the fluidics layer that does not oppose a chamber in the actuation layer. These materials can selectively or specifically bind analytes. For example, the binding functionality could be a nucleic acid, a metal or metal chelate, a carbohydrate or a protein, such as an antibody or antibody-like molecule, enzymes, biotin, avidin/streptavidin, etc.

These materials can be bound to surfaces, e.g., valve chamber surfaces, by any attachment chemistry known in the art. For example, a surface can be derivatized with a functionalized silane, such as an amino silane or an acryl silane, and the functional group reacted with a reactive group on the molecule comprising the binding functionality.

1.2. Valve and Compartment Surfaces Coated with Binding Functionalities

Figure 18:
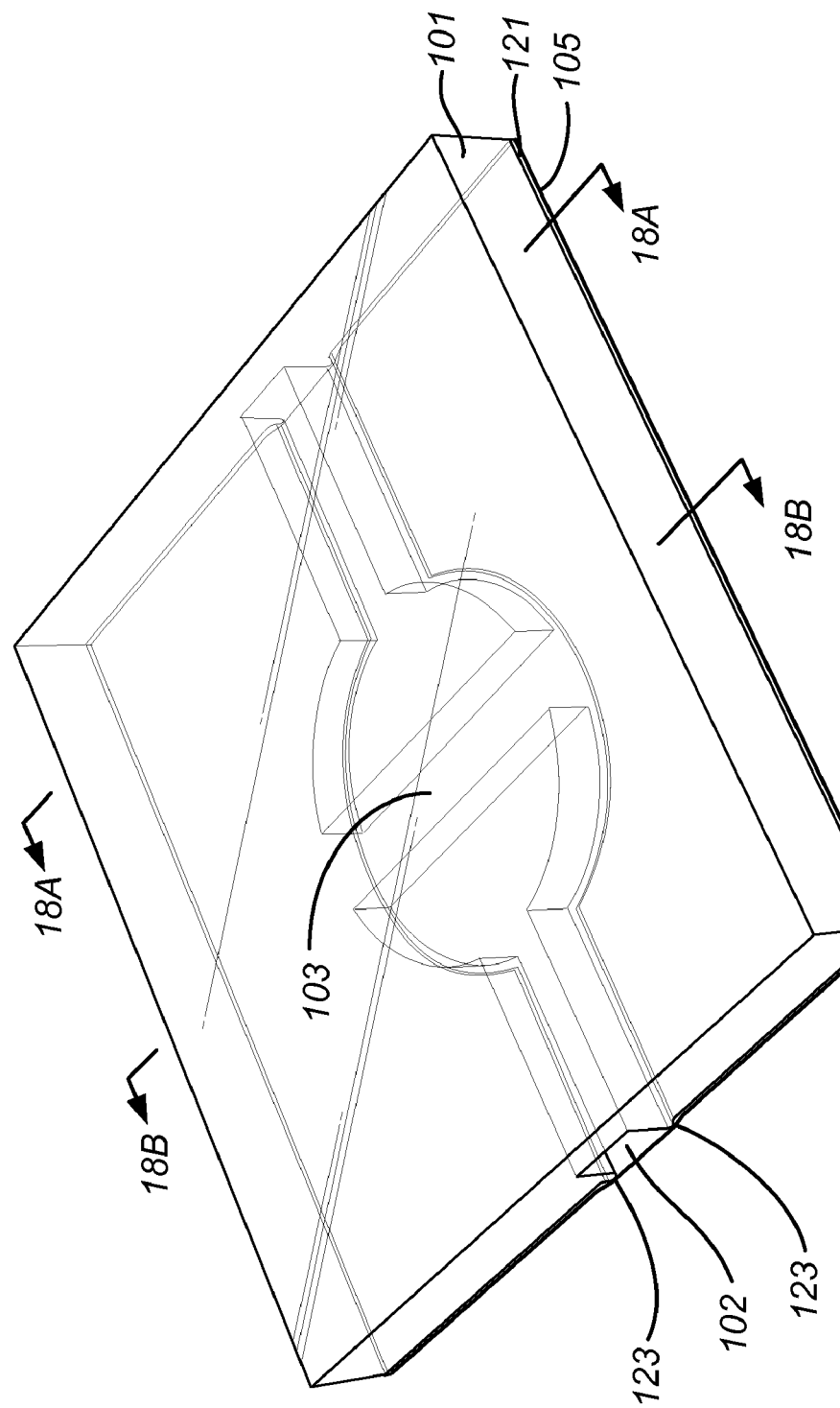
FIG. 18 shows a device comprising a fluidics layer comprising a raised area bordering the channels and valve seat.
Figure 18A:
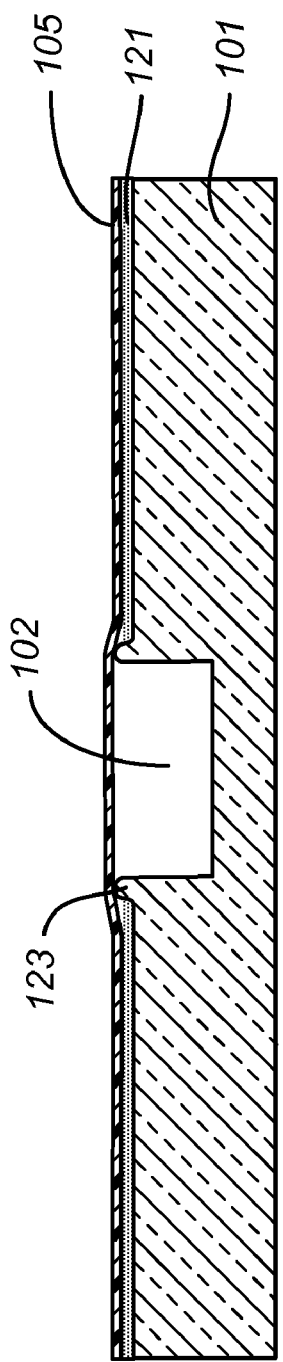
FIGS. 18A and 18B are cross-sections of FIG. 18 that show the raised areas, or ridges, that are elevated above the rest of the surface of the fluidics layer. This contrasts with other embodiments in which the tops of the channels and the valve seats are flush with the contact surfaces of the fluidic layer.
Figure 18B:
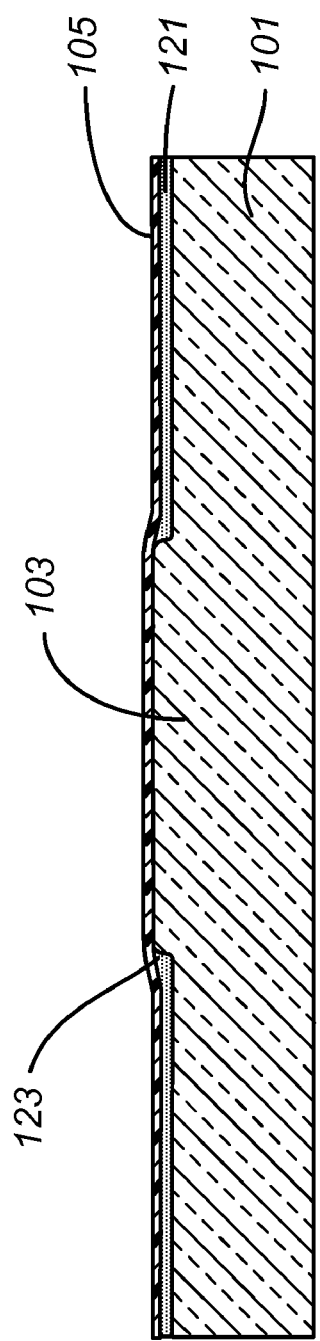
Figure 18C:
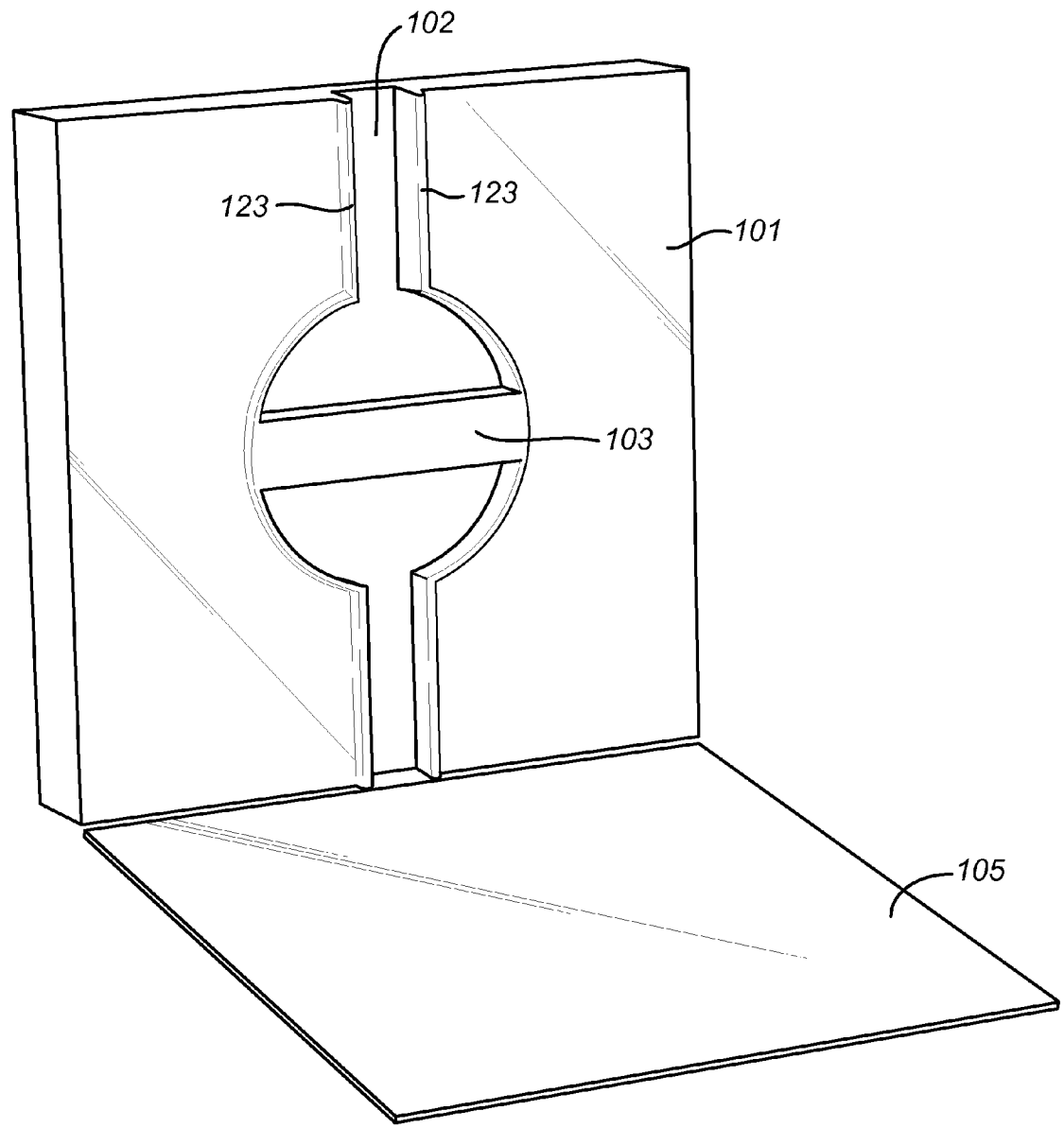
FIG. 18C is a clamshell view showing a face of the fluidics layer 101 that contacts the elastic layer 105.

In another aspect, this invention provides a microfluidic device in which the elastic layer is adhered to the fluidic and/or actuation layers with an adherent. In order to inhibit leakage of adherent into fluidic or actuation channels, a raised area, such as a ridge or elevation is provided along the edges of the conduits. The raised ridge functions as a dam or levee to prevent the adherent from losing into the channel. The adherent is provided on a face or surface of the substrate layers on the other side of the raised area from the conduit. An example of this is depicted in FIG. 18. A fluidic layer 101 is comprises a conduit 102 with a valve seat 103. The edges of the conduit and the valve seat are elevated with respect to the rest of the surface of the fluidic layer so as to form a ridge 123.

Adhesive 121 covers the fluidic layer surface on a side opposite the ridge from the conduit. The valve seat 103 also is not flush with the rest of the surface of the fluidic layer. Elastic layer 105 is attached to the surface of the fluidic layer through the adhesive and stretches over the ridges.

The ridges can be created, for example, by etching the surface of the fluidic layer to remove material to create a relative depression compared with the surface into which the conduits are etched. The adhesive can be comprised in a layer that is thinner than the height of the raised area. This can inhibit leaking of the adhesive into the conduit or on top of the valve seat. The adhesive can be, for example, an acrylic-based or a silicone-based adhesive. The adhesive can be in the form of a tape, a liquid or a semi-liquid. It can be one or several mils in thickness. For example, the adhesive can be a silicone adhesive applied using a silicone transfer adhesive tape. Examples of silicone transfer tapes include Trans-Sil 1005 from Dielectric Polymers (Holyoke, Mass.), which has a 5 mil layer of adhesive, and RD-577 from PPI Adhesive Products Limited (Waterford, Ireland) Alternatively, the adhesive could be a double stick tape. The carrier can be polyethylene (e.g. 2 mils) with 2 mils of acrylic adhesive on both sides. Holes matching locations of the raised areas, can be made by dies or laser. Liquids can be applied by masks or silk screen. The device can be assembled by laying the elastic layer on top of the adhesive and applying pressure to bond the elastic layer to the surface and to seal the conduits. This can be done without heat.

2. Devices

Microfluidic devices with diaphragm valves that control fluid flow have been described in U.S. Pat. No. 7,445,926, U.S. Patent Publication Nos. 2006/0073484, 2006/0073484, 2007/0248958, 2008/0014576 and 2009/0253181, and PCT Publication No. WO 2008/115626.

The fluidic devices of this invention comprise at least one or a plurality of fluidic conduits in which fluid flows. Fluid can be introduced into or removed from the device through ports communicating with fluidic conduits (e.g. entry ports or exit ports). Flow can be controlled by on-device diaphragm valves and/or pumps actuatable by, for example, pressure, pneumatics or hydraulics. The devices typically comprise a fluidics layer bonded to an elastic layer, wherein the elastic layer functions as a deflectable diaphragm that regulates flow of fluids across interruptions (e.g., valve seats) in the fluidic pathways in the fluidics layer. The elastic layer can comprise a polysiloxane, such as PDMS. In other embodiments, the device comprises three layers: A fluidics layer, an actuation layer and an elastic layer sandwiched there-between. The actuation layer can comprise actuation conduits configured to actuate or deflect the elastic layer at selected locations, e.g., at diaphragm valves, thereby controlling the flow of fluid in the fluidic conduits. Actuation conduits can be disposed as apertures, e.g., bores, through the layer, or as channels cut into the surface of the layer and opening at an edge of the piece. The three layers can be bonded together into a unit. Alternatively, the fluidics layer or the actuation layer can be bonded to the elastic layer to form a unit and the unit can be mated with and/or removed from the other layer. Mating can be accomplished, for example, by applying and releasing pressure, e.g., by clamping. The face of the microfluidic device that contacts the elastic layer can have an area from about 1 cm$^2$ to about 400 cm$^2$.

2.1 Elastic Layer

The elastic layer typically is formed of a substance that can deform when vacuum or pressure is exerted on it and can return to its un-deformed state upon removal of the vacuum or pressure, e.g., an elastomeric material. Because the deformation dimension is measure in less than ten mm, less than one mm, less than 500 um, or less than 100 um, the deformation required is lessened and a wide variety of materials may be employed. Generally, the deformable material has a Young's modulus having a range between about 0.001 GPa and 2000 GPa, preferably between about 0.01 GPa and 5 GPa. Examples of deformable materials include, for example but are not limited to thermoplastic or a cross-linked polymers such as: silicones (e.g., polydimethylsiloxane), polyimides (e.g., Kapton™, Ultem), cyclic olefin co-polymers (e.g., Topas™, Zeonor), rubbers (e.g., natural rubber, buna, EPDM), styrenic block co-polymers (e.g., SEBS), urethanes, perfluoro elastomers (e.g., Teflon, PFPE, Kynar), Mylar, Viton, polycarbonate, polymethylmethacrylate, santoprene, polyethylene, or polypropylene. Other classes of material that could function as the elastic layer include, for example, but are not limited to metal films, ceramic films, glass films or single or polycrystalline films. Furthermore an elastic layer could comprise multiple layers of different materials such as combination of a metal film and a PDMS layer.

At points where the fluidic channels or actuation channels open onto or are otherwise in contact with the elastic layer, functional devices such as valves can be formed. Such a valve is depicted in cross section in FIGS. 3A and 3B. Both the fluidics layer and the actuation layer can comprise ports that connect channels to the outside surface. Such ports can be adapted to engage fluidics manifolds, e.g., cartridges, or pneumatics manifolds.

2.2 Fluidics and Actuation Layers

The fluidics and/or actuation layers of the device may be made out of different materials selected from those including, but not limited to, glass (e.g., borosilicate glasses (e.g., borofloat glass, Corning Eagle 2000, pyrex), silicon, quartz, and plastic (e.g., a polycarbonate, an olefin co-polymer (e.g., Zeonor), a cycloolefin co-polymer, a silicon acrylic, a liquid crystal polymer, polymethylmethoxyacrylate (PMMA), a polystyrene, a polypropylene, and a polythiol). Depending on the choice of the material different fabrication techniques may also be used.

In some embodiments microstructures of channels and vias are formed using standard photolithography. For example, photolithography can be used to create a photoresist pattern on a glass wafer, such as an amorphous silicon mask layer. In one embodiment, a glass wafer comprises of a 100 μm thick glass layer atop a 1 μm thick glass layer on a 500 μm thick wafer. To optimize photoresist adhesion, the wafers may be exposed to high-temperature vapors of hexamethyldisilazane prior to photoresist coating. UV-sensitive photoresist is spin coated on the wafer, baked for 30 minutes at 90° C., exposed to UV light for 300 seconds through a chrome contact mask, developed for 5 minutes in developer, and post-baked for 30 minutes at 90° C. The process parameters may be altered depending on the nature and thickness of the photoresist. The pattern of the contact chrome mask is transferred to the photoresist and determines the geometry of the microstructures.

The microfluidic device typically comprises multiple microchannels and vias that can be designed and configured to manipulate samples and reagents for a given process or assay. A microfluidic channel has at least one cross-sectional dimension no greater than 500 microns, no greater than 400 microns, no greater than 300 microns or no greater than 250 microns, e.g., between 1 micron and 500 microns. In some embodiments the microchannels have the same width and depth. In other embodiments the microchannels have different widths and depths. In another embodiment a microchannel has a width equal to or larger than the largest analyte (such as the largest cell) separated from the sample. For example, in some embodiments, a microchannel in a microfluidics chip device can have a width greater than 50, 60, 70, 80, 90, 100, 110, 120, 130, 140, 150, or 300 microns. In some embodiments, a microchannel has a width of up to or less than 100, 90, 80, 70, 60, 50, 40, 30 or 20 microns. In some embodiments a microchannel in a microstructure can have a depth greater than 50, 60, 70, 80, 90, 100, 110, 120, 130, 140 or 150 microns. In some embodiments, a microchannel has a depth of up to or less than 100, 90, 80, 70, 60, 50, 40, 30 or 20 microns. In some embodiments a microchannel has side walls that are parallel to each other. In some other embodiments a microchannel has a top and bottom that are parallel to each other. In some other embodiments a microchannel comprises regions with different cross sections. In some embodiments, a microchannel has a cross section in the shape of a cheese wedge, wherein the pointed end of the wedge is directed downstream.

The device may be made out of plastic, such as polystyrene, using a hot embossing technique. The structures are embossed into the plastic to create the patterned surface. A second layer may then be bonded to the patterned surface of the plastic layer. Injection molding is another approach that can be used to create such a device. Soft lithography may also be utilized to create either a whole chamber out of plastic or only partial microstructures may be created, and then bonded to a glass substrate to create the closed chamber. Yet another approach involves the use of epoxy casting techniques to create the obstacles through the use of UV or temperature curable epoxy on a master that has the negative replica of the intended structure. Laser or other types of micromachining approaches may also be utilized to create the flow chamber. Other suitable polymers that may be used in the fabrication of the device are polycarbonate, polyethylene, and poly(methyl methacrylate). In addition, metals like steel and nickel may also be used to fabricate the master of the device of the invention, e.g., by traditional metal machining Three-dimensional fabrication techniques (e.g., stereolithography) may be employed to fabricate a device in one piece. Other methods for fabrication are known in the art.

2.3. Micro-Robotic on-Chip Valve and Pump ("MOVe") Technology

MOVe elements, such as valves, routers and mixers are formed from sub-elements in the fluidics, elastic and actuation layers of the device. A MOVe valve is a diaphragm valve formed from interacting elements in the fluidics, elastic and actuation layers of a microfluidic chip (FIG. 1). The diaphragm valve is formed where a microfluidic channel and an actuation channel cross over each other and open onto the elastic layer. At this location, deflection of the elastic layer into the space of the fluidics channel or into the space of the pneumatics channel will alter the space of the fluidics channel and regulate the flow of fluid in the fluidics channel. The fluidics channel and actuation channels at the points of intersection can assume different shapes. For example, the fluidics channel can comprise an interruption that functions as a valve seat for the elastic layer. The fluidics channel could open into a chamber like space in the valve. The actuation channel can assume a larger space and/or cross section than the channel in other parts of the actuation layer, for example a circular chamber.

Figure 3A:
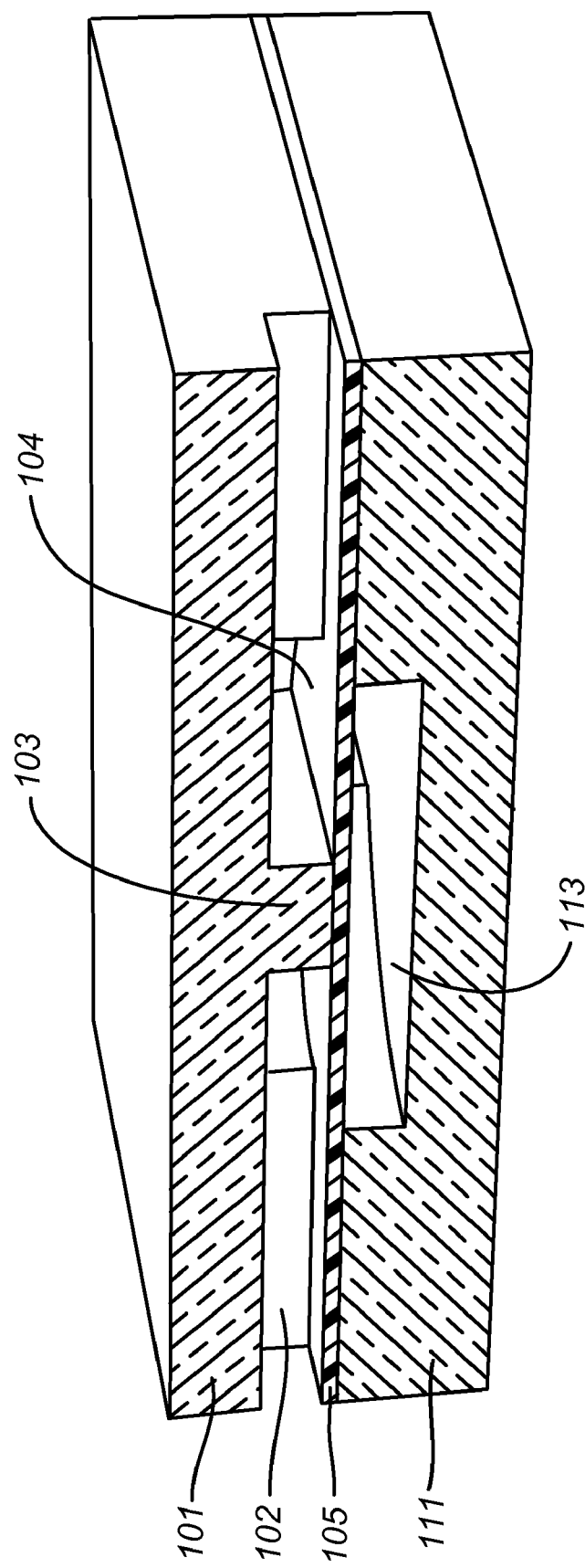
FIGS. 3A and 3B show a cross-section of a "three layer" diaphragm valve in closed (FIG. 3A) and open (FIG. 3B) configurations.
Figure 3B:
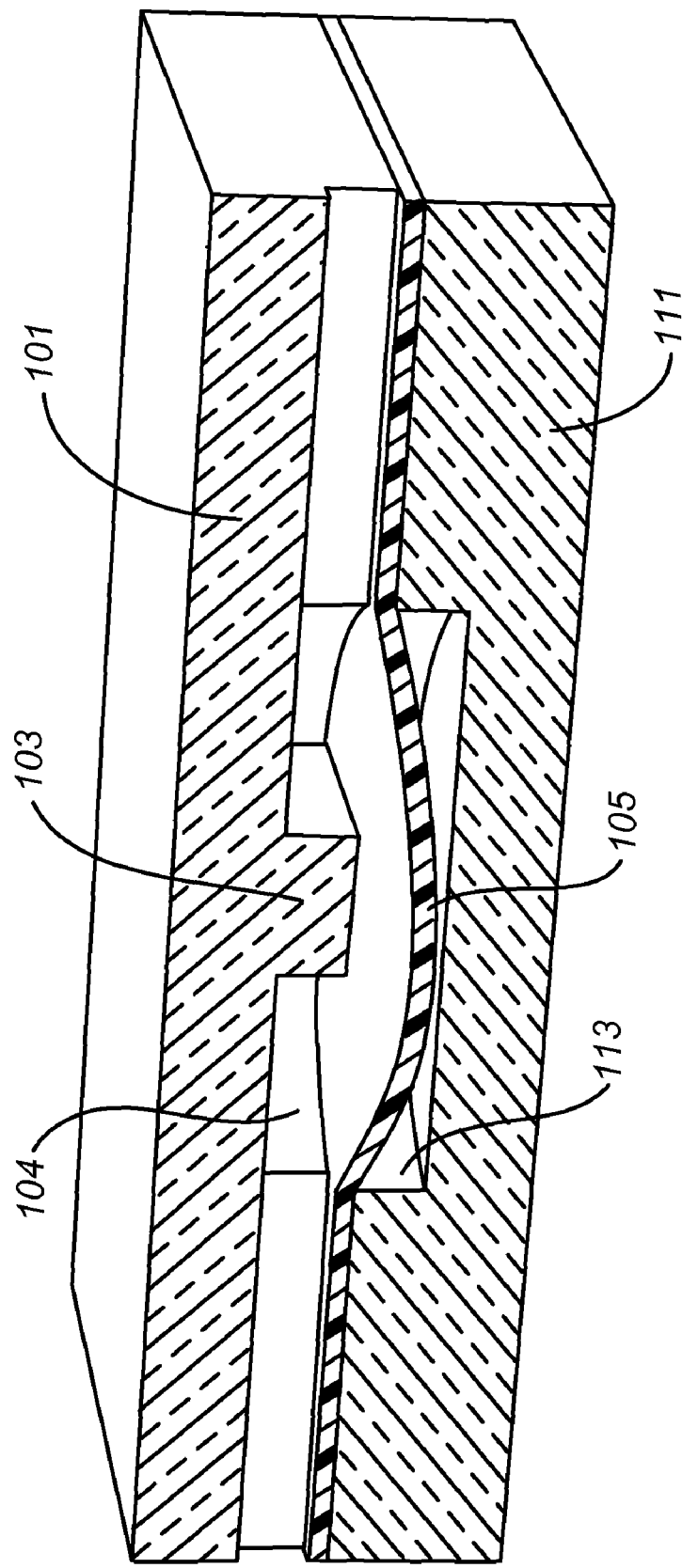
Figure 4A:
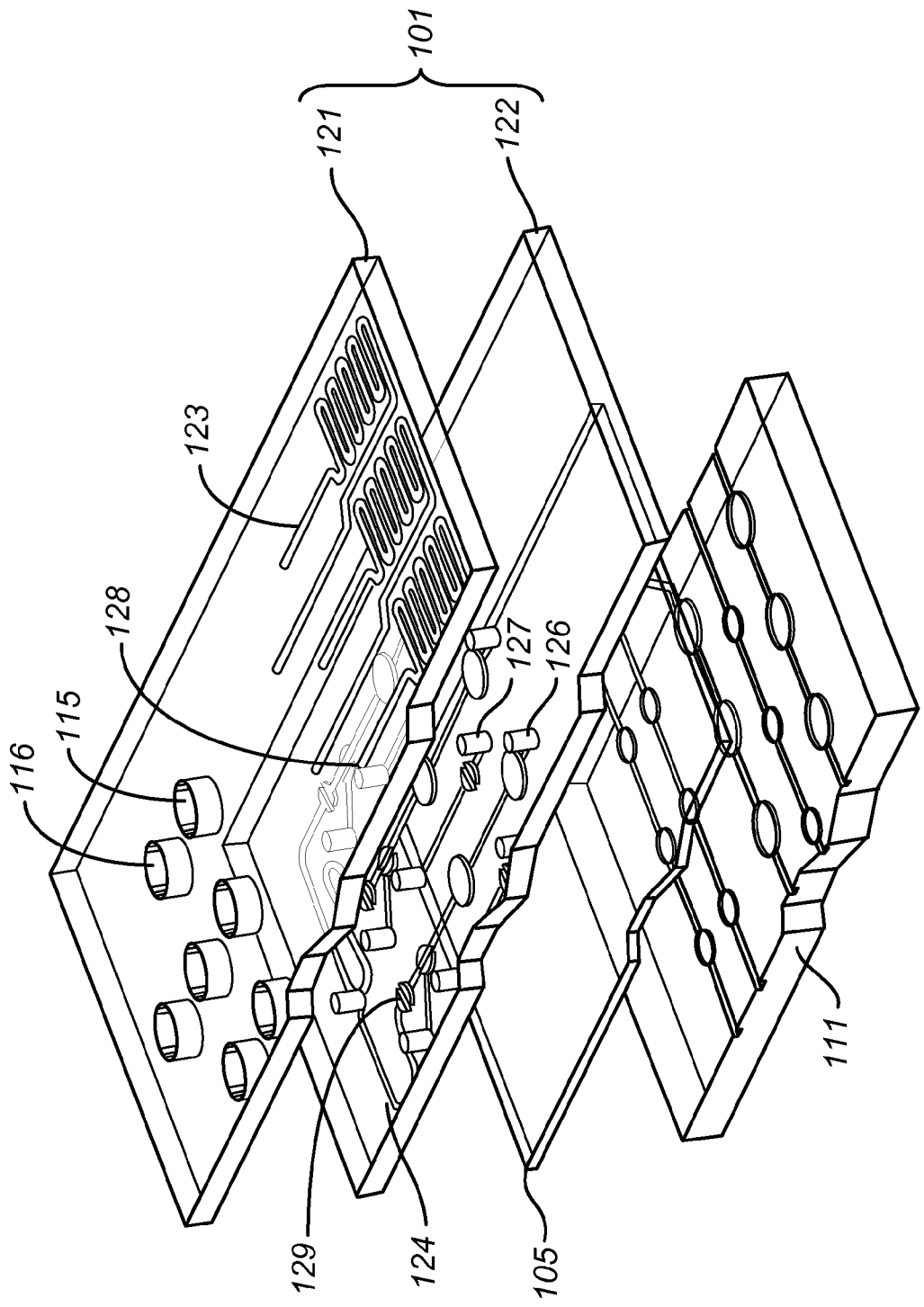
FIGS. 4A and 4B show a portion of a device in which the fluidics layer comprises a plurality of sublayers, in exploded and closed views. The top or external sublayer 121 is referred to as the "etch" layer and bottom or lower sublayer 122 is referred to as the "via" layer. In this example the etch layer comprises grooves (e.g., 123 and 128) on the surface that faces the via layer to form a closed fluidic channel. The via layer comprises grooves (e.g., 124) on the surface that faces the elastic layer 105. When the elastic layer is bonded to or pressed against the via layer, it covers the channels and seals them against leakage. The via layer also includes vias (e.g., holes or bores) (e.g., 126 and 127) that traverse this sublayer and open onto the elastic layer on one side and the etch layer on the other. In this way, fluid traveling in a channel in the etch layer can flow into a conduit in the via layer that faces the elastic layer.
Figure 4B:
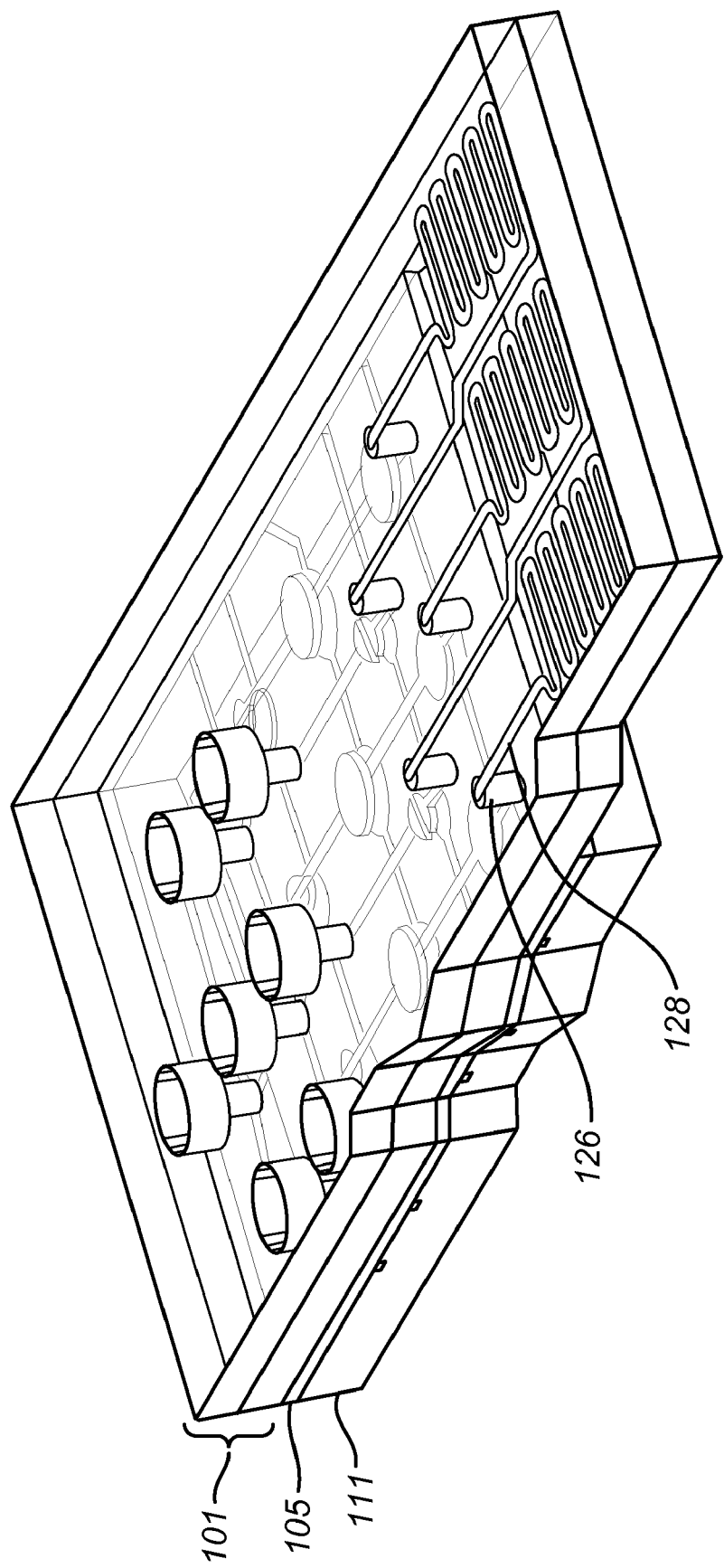
Figure 11:
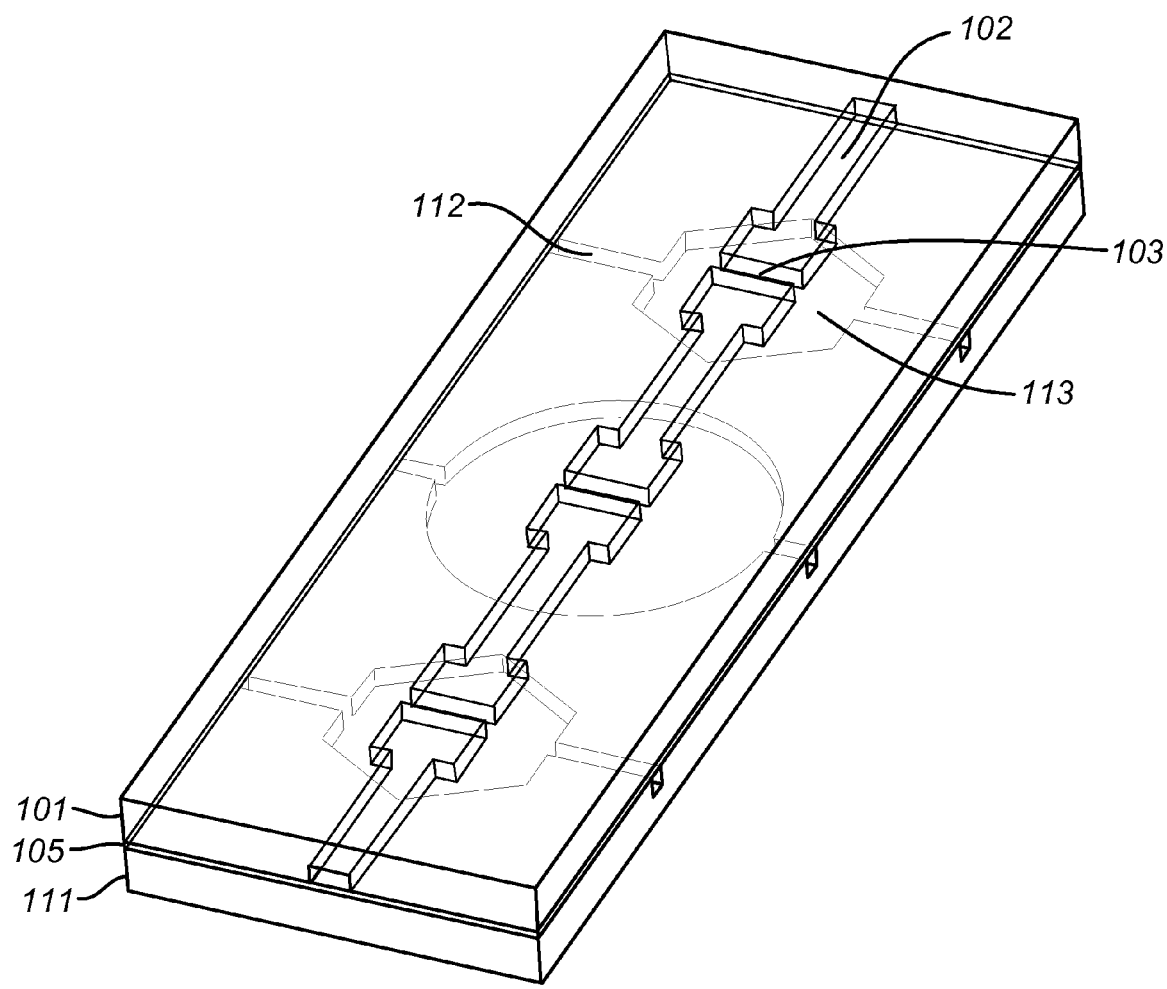
FIG. 11 shows a three-dimensional view of a device comprising three diaphragm valves in series forming a diaphragm pump.
Figure 12:
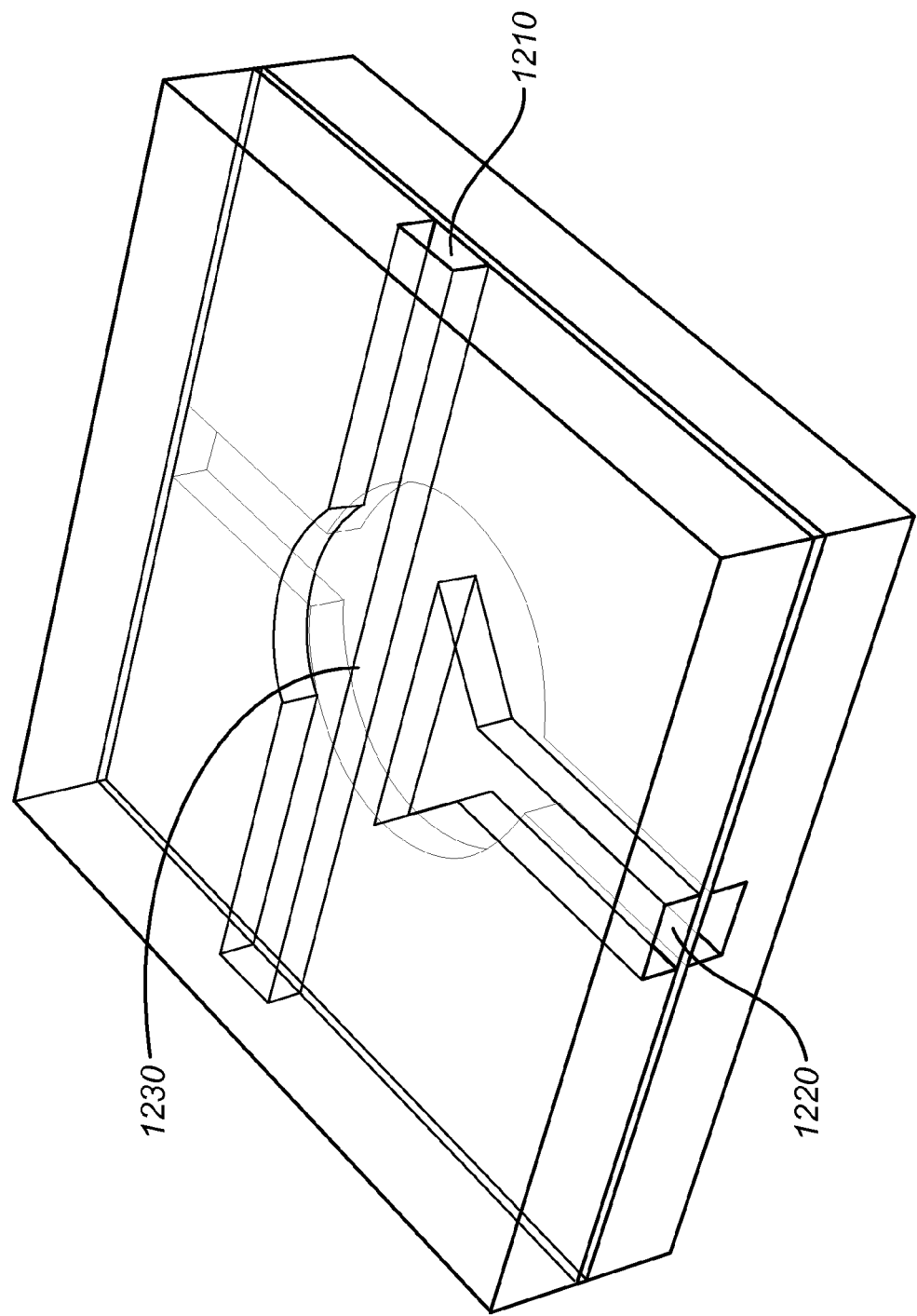
FIG. 12 shows a flow-through valve in which one channel 1210 is always open and communication with another channel 1220 is regulated by a valve 1230. Flow-through channel 1210 intersects with intersecting channel 1220 at a junction where a flow-through valve 1230 is positioned.
Figure 13:
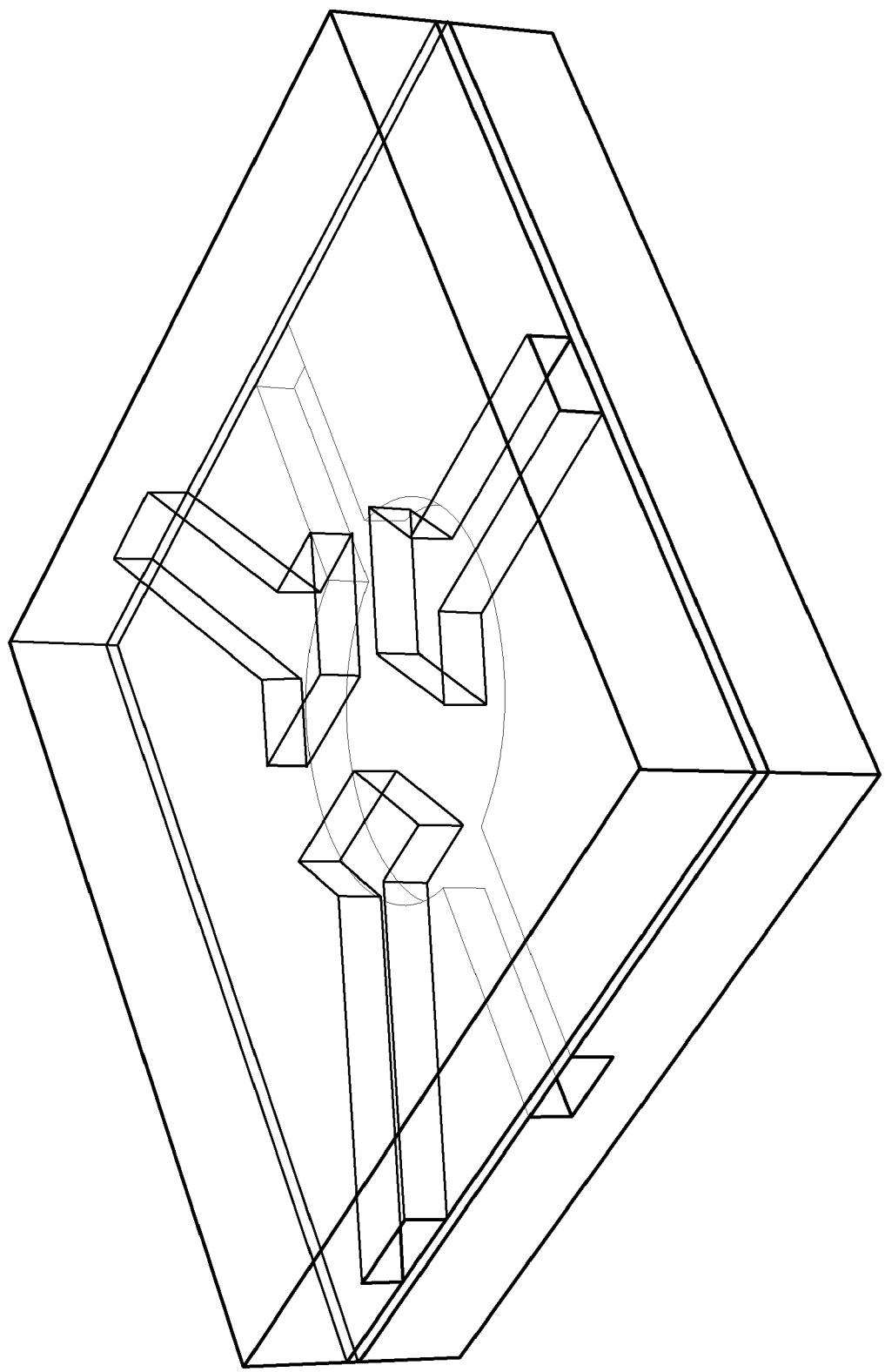
FIG. 13 shows three channels that are connected by a valve that, when closed, prevents or reduces fluid flow between all three channels and that, when open, allows fluid flow among the three channels. This is referred to as a "Y" valve.

FIG. 2 shows a three-dimensional view of a MOVe valve. FIGS. 3A and 3B show a MOVe valve in cross-section. In this case, the fluidics layer comprises channels that are formed in the surface of the fluidics layer and covered over by the elastic layer. FIG. 11 shows a three-dimensional view of a diaphragm pump formed from three MOVe valves in series. FIGS. 4A and 4B depict a fluidics layer with internal channels that open onto the elastic layer through vias. FIG. 12 shows a flow-through valve comprising one channel that is always open and a channel that intersects in which fluid flow into the open channel is regulated by a diaphragm valve. FIG. 13 shows a valve having three inlet ports for three channels. Opening the valve allows fluid to flow from any two channels into the third channel or any one channel into the other two.

Referring to FIGS. 4A and 4B, fluidics layer 101, elastic layer 105 and actuation layer 111 are sandwiched together. Microfluidic channel 128 opens onto the elastic layer through a via 126. Valve seat 129 is in contact with the elastic layer, resulting in a closed valve. When the actuation layer is activated, the elastic layer 105 is deformed into the pneumatic chamber 130. This opens the valve, creating a path through which liquid can flow. The pressure in the pneumatic chamber relative to the microfluidic channel controls the position of the elastic layer. The elastic layer can be deformed toward the pneumatic chamber when the pressure is lower in the pneumatic chamber relative to the microfluidic channel. Alternatively, the elastic layer can be deformed toward the microfluidic channel when the pressure is lower in the microfluidic channel relative to the pneumatic chamber. When pressure is equal or approximately equal in the microfluidic channel and the pneumatic chamber, the valve can be in a closed position. This configuration can allow for complete contact between the seat and the elastic layer when the valve is closed. Alternatively, when pressure is equal or approximately equal in the microfluidic channel and the pneumatic chamber, the valve can be in an open position. The pneumatically actuated valves can be actuated using an inlet line that is under vacuum or under positive pressure. The vacuum can be approximately house vacuum or lower pressure than house vacuum, e.g., at least 15 inches Hg or at least 20 inches Hg. The positive pressure can be about 0, 1, 2, 5, 10, 15, 20, 25, 30, or 35 psi. The fluid for communicating pressure or vacuum from a source can be any fluid, such as a liquid or a gas. The gas can be air, nitrogen, or oxygen. The liquid can be any pneumatic or hydraulic fluid, including organic liquid or aqueous liquid, e.g., water, a perfluorinated liquid (e.g., Fluorinert), dioctyl sebacate (DOS) oil, monoplex DOS oil, silicon oil, hydraulic fluid oil or automobile transmission fluid.

Diaphragm micro-valves, micro-pumps, and micro-routers can combine a fluidic layer with a deformable membrane layer, such as polydimethyl siloxane (PDMS), that opens and closes the valve, and an actuation (e.g., pneumatic or hydraulic) layer to deform the membrane and actuate the valve. The fluidic layer can have multiple configurations. In some embodiments, an open channel, furrow or groove can be etched into the surface of one of the glass layer. In other embodiments, the channel can be internal to the layer, e.g., in the form of a tunnel, tube or via. The fluidic channels etched in a first glass layer can be discontinuous and lead to vias, or ports, in a second glass layer that bridge opposing discontinuous channels at a nexus of the first glass layer, wherein the vias act as valve seats. The elastic layer (e.g., PDMS) sits against the valve seat and normally closes the fluidic path between the two vias. On the opposite side of PDMS membrane, a pneumatic displacement chamber, formed by etching in the layer, is connected to a full-scale or smaller vacuum or pressure source. By controlling a miniaturized off-chip solenoid, vacuum or pressure (approximately one-half atmosphere) can be applied to PDMS membrane to open or close the valve by simple deformation of the flexible membrane, e.g., application of vacuum to the membrane deflects the membrane away from a valve seat, thereby opening the valve.

Diaphragm valves of this invention can displace defined volumes of liquid. A diaphragm valve can displace a defined volume of liquid when the valve is moved into a closed or opened position. For example, a fluid contained within a diaphragm valve when the valve is opened is moved out of the diaphragm valve when the valve is closed. The fluid can be moved into a microchannel, a chamber, or other structure. The diaphragm valve can displace volumes that are about, up to about, less than about, or greater than about 1000, 750, 500, 400, 300, 200, 100, 50, 25, 20, 15, 10, 5, 4, 3, 2, 1, 0.5, 0.25, 0.1, 0.05 or 0.01 μL. For example, the displacement volume (interchangeably referred to herein as 'stroke volume') can be between about 10 nL to 5 μL, e.g., about 100 nL to about 500 nL, or about 25 nL to about 1500 nL.

Variations on flow-through and in-line valves can include valves that are situated at intersections of greater than two, three, four, or more channels. Valve seats or other structures can be designed such that closure of the valve can prevent or reduce flow in one or more of the channels while allowing fluid to flow in one or more of the other channels. For example flow can be blocked along three of five channels, while flow can continue through two of the five channels. A flow-through valve can also be referred to as a T-valve, as described in U.S. application Ser. No. 12/026,510 and WO 2008/115626.

When placed in a series of three, diaphragm valves can function as a diaphragm pump, which functions as a positive displacement pump. (See FIG. 11.) Diaphragm pumps are self-priming and can be made by coordinating the operation of three valves (including but not limited to, 4, 5, 6, 7, 8, 9, 10, 11, 12, 13, 14, 15, 16, 17, 18, 19, or 20 or more valves), and can create flow in either direction. A variety of flow rates can be achieved by the timing of the actuation sequence, diaphragm size, altering channel widths, and other on-chip dimensions. Routers can similarly be formed from these valves and pumps. The routers can be formed using three or more valves each on a separate channel connecting to central diaphragm valve. A router also can be made by configuring three channels, each comprising a diaphragm pump, to meet in a common chamber, e.g. a pumping chamber. Bus structures can also be created that employ a series of at least two flow-through valves in which intersecting channels intersect the same flowthrough channel.

Figure 5:
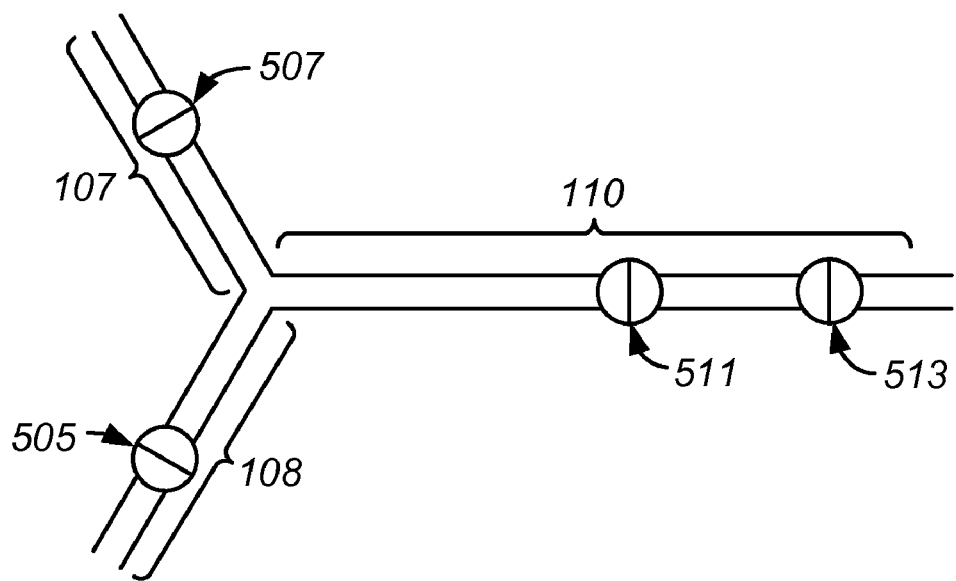
FIG. 5 shows an embodiment of a microfluidic circuit.

Examples of diaphragm valves placed along microfluidic channels are shown in FIG. 5, shows a first channel (107) and a second channel (108) that are fluidically connected to a mixing channel (110). A first in-line diaphragm valve (507) is placed along the first channel. A second in-line diaphragm valve (505) is placed along the second channel. Two in-line valves (511 and 513) are positioned along the mixing channel. A pump can be formed by three diaphragm valves that are positioned linearly along a flow path. For example, valves 507, 511, and 513 can form a first pump and valves 505, 511, and 513 can form a second pump. The centrally located valve, valve 511, can be the pumping valve. The pumping valve can have a desired stroke volume or displacement volume (interchangeably referred to herein) as described herein (e.g., about 10 nanoliters to 5 microliters). The first pump can move liquids from the first channel to the mixing channel or vice-versa. The second pump can move liquids from the second channel to the mixing channel or vice-versa. The first pump can be operated while fluid flow in the second channel is blocked by closure of valve 505 or another valve positioned on the second channel or on other channels that are connected to the second channel.

Figure 6:
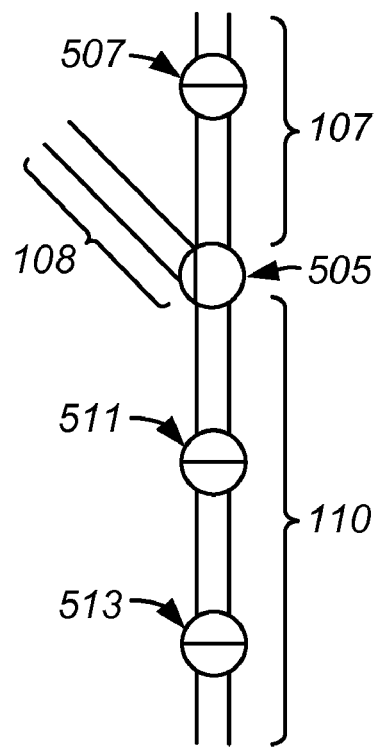
FIG. 6 shows an embodiment of a microfluidic circuit.

FIG. 6 shows a first channel 107 and a second channel 108 that are connected to a mixing channel 110. Flow through the first channel can be controlled by in-line valve 507 and flow through the second channel can be controlled by flow-through valve 505. Similar to as shown in FIG. 5, the mixing channel can have two in-line valves (511 and 513).

Figure 7:
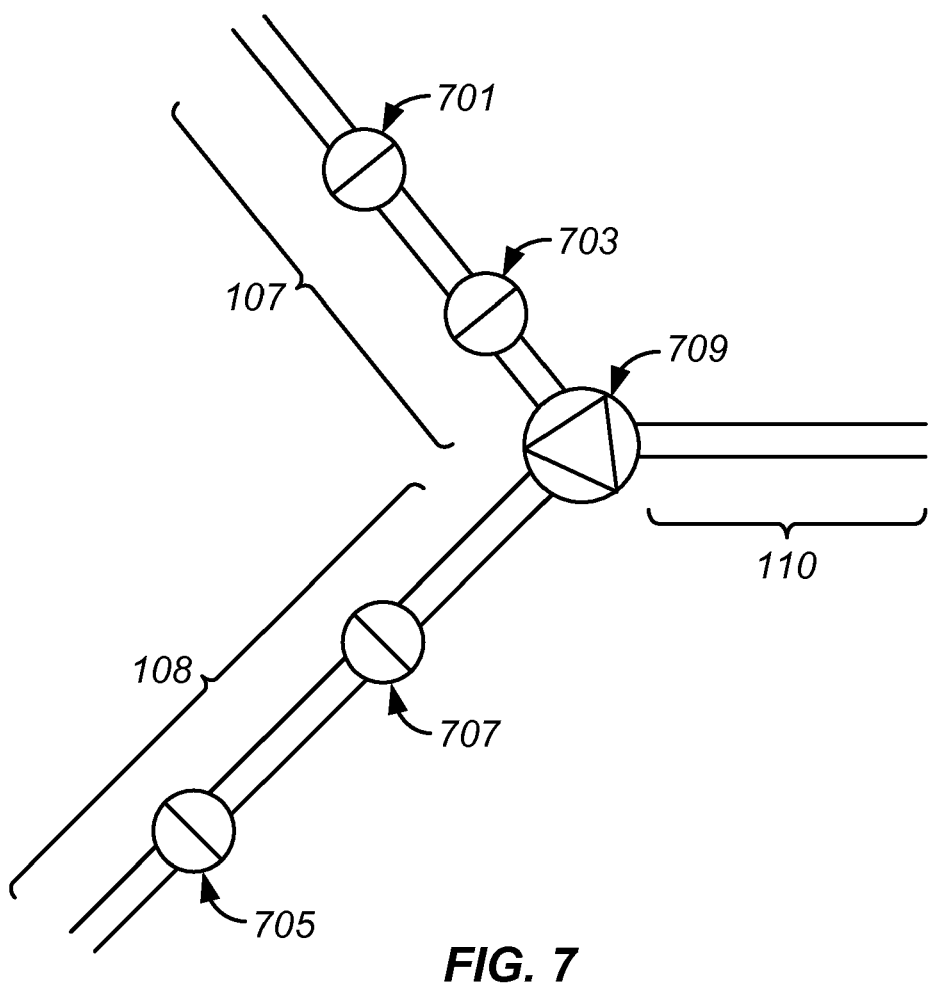
FIG. 7 shows an embodiment of a microfluidic circuit.

FIG. 7 shows an alternative arrangement of microfluidic valves positioned along three channels. The first channel 107 can have two in-line valves 701 and 703, and the second channel 108 can have two in-line valves 705 and 707. The first and second channel can be connected to a mixing channel 110. A junction valve 709 can be positioned at the intersection between the first channel, the second channel, and the mixing channel. Closure of the junction valve can prevent or reduce fluid flow in the first channel, the second channel, and the mixing channel. The junction valve 709 can have a seat that is triangular-shaped or shaped as shown in FIG. 13.

Figure 8:
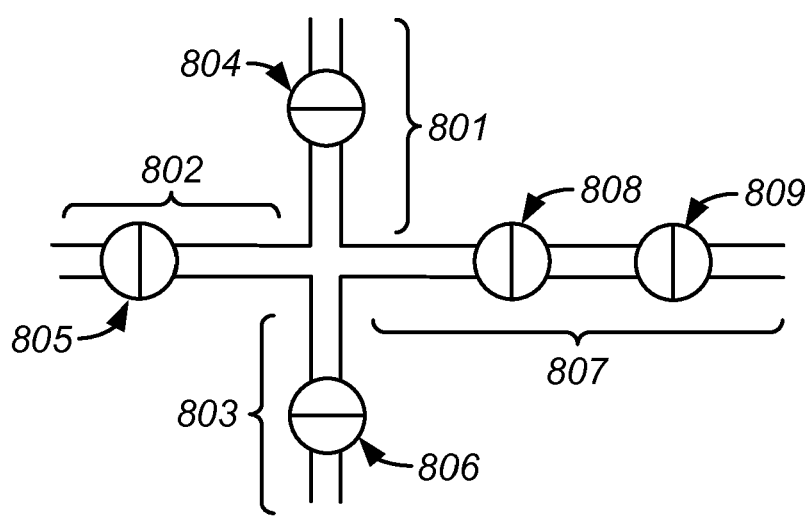
FIG. 8 shows an embodiment of a microfluidic circuit.

FIG. 8 shows a first channel 801, a second channel 805, and a third channel 803 that are connected to a mixing channel 807. The valves and channels can be operated in a similar manner as the valves and channels shown in FIG. 7. Referring to FIG. 8, fluid can be moved from the first channel to the mixing channel while preventing or reducing flow of fluid in the second channel and the third channel by closure of valve 805 and 803.

Figure 9:
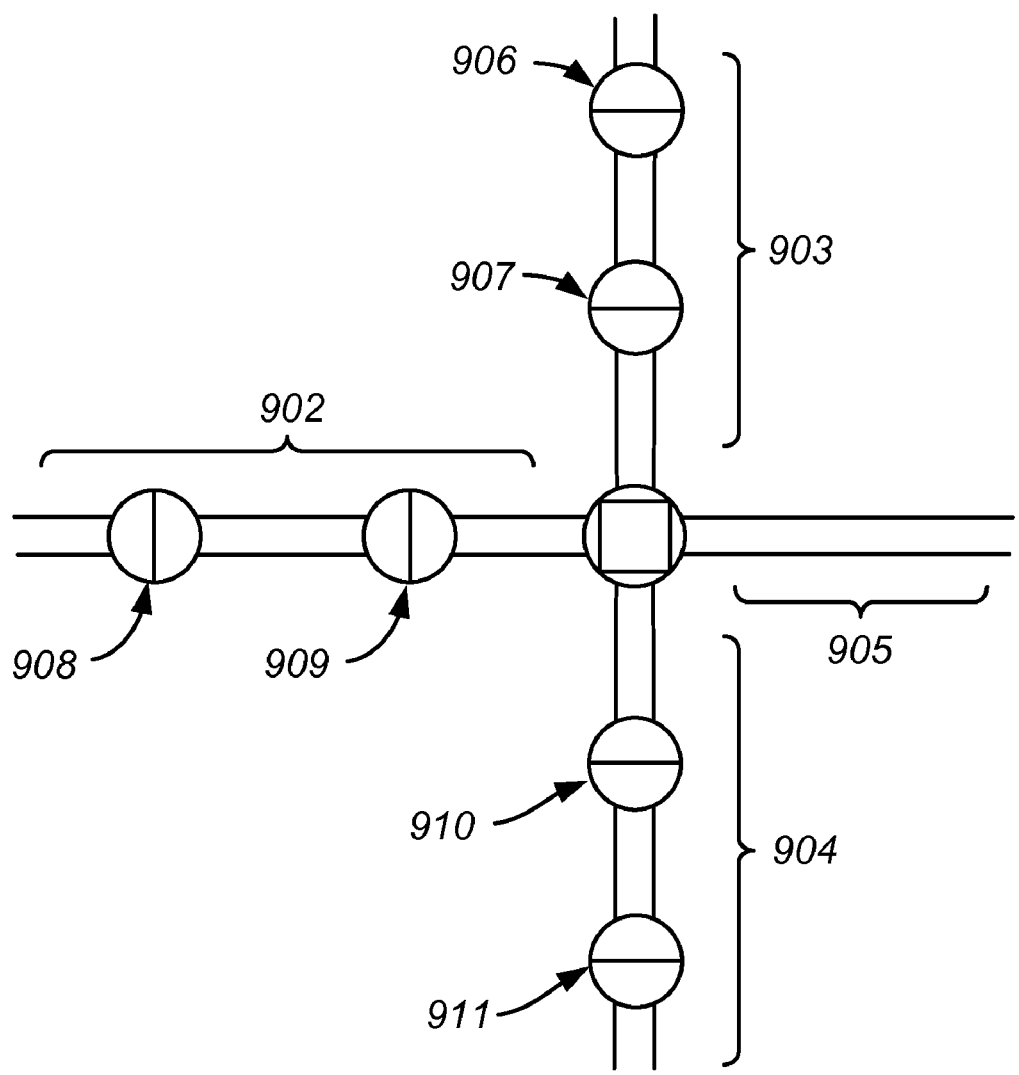
FIG. 9 shows an embodiment of a microfluidic circuit.

FIG. 9 shows a first channel 903, a second channel 902, a third channel, 904 connected to a mixing channel 905. A junction diaphragm valve can be positioned at the intersection between the first channel, the second channel, the third channel, and the mixing channel. The valves and channels can be operated in a similar manner as the valves and channels shown in FIG. 8.

Figure 10:
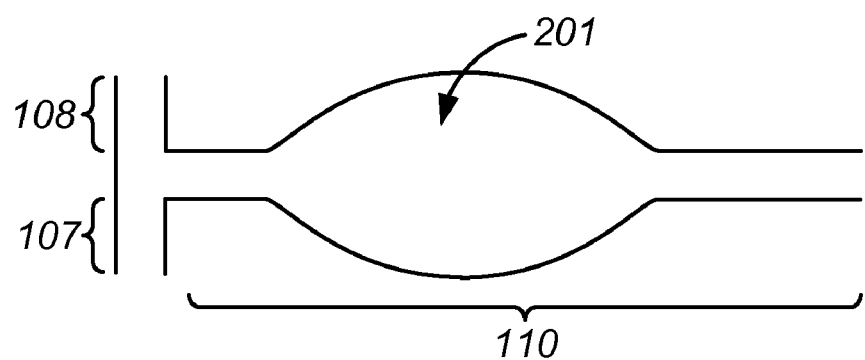
FIG. 10 shows an oval-shaped chamber.

As shown in FIG. 10, the mixing channel can have a chamber of variable cross-sectional area. The shape of the chamber can be oval 201, spherical, or rectangular. In some embodiments of the invention, the chamber can be irregularly shaped to improve mixing of fluids passing through the chamber. An elastic layer can form one wall of the chamber. The elastic layer can be deformed such that the volume of the chamber is variable. The elastic layer can be deformed at a rate such that mixing within the chamber is improved.

Using the diaphragm valves to pump fluids can move a bolus of liquid into a microchannel. In some embodiments of the invention, two different fluids can be pumped into a microchannel such that a bolus of a first fluid is layered against a bolus of a second fluid in the microchannel. The first fluid and the second fluid can be different fluids. The first fluid and the second fluid can comprise different components. The fluids can be a reagent solution and a sample solution. The reagent solution can be a solution containing magnetic beads.

In some embodiments, the microfluidic chip devices herein include one or more reservoirs capable of containing a sample or a reagent (e.g., enzymes, labeled nucleotides, affinity reagents). The reservoir is preferably fluidly coupled to one or more of the microchannels or valves disclosed herein.

The ability to mix fluids on microchips and capillaries is disclosed. By actuating the proper combinations of valves, liquids from one of the channels or reservoirs can be drawn into the central diaphragm valve and expelled into a different channel to rout the liquid in a fluidic circuit. The liquids can comprise, without limitation, analytes, biological samples, chemical and biochemical reagents, buffers, binding moieties, beads, magnetic particles, detection moieties and other materials used in the performance of assays or biochemical or chemical reactions. In other embodiments, the fluid being pumped is a gas, such air.

The diaphragm valves, pumps, and routers are durable, easily fabricated at low cost, can operate in dense arrays, and have low dead volumes. Arrays of diaphragm valves, pumps, and routers are readily fabricated on microchips, such as NanoBioProcessor microchips. In one embodiment, all the diaphragm valves, pumps, and routers on a microchip are created at the same time in a simple manufacturing process using a single or monolithic membrane, such as a sheet of PDMS. It costs the same to make 5 diaphragm pumps on a chip as it does to create 500. This technology provides the ability to create complex micro- and nanofluidic circuits on microchips and integrate chemical and biochemical processes by using the circuits. Thus, the disclosure herein provides methods and the ability to create simple and complex micro-, nano-, and pico-fluidic circuits on chips, and allows the implementation of virtually any reaction or assay onto a chip. In general, this technology can be at least substantially insensitive to variations in solution ionic strength and surface contamination, and does not require applied electric fields.

A device, e.g., a chip, typically will comprise a plurality of fluidics circuits, each circuit comprising a microfluidic conduit in communication with external entry and exit ports. Circuits typically comprise channels and functional elements, such as valves, routers, pumps (e.g., three independently operable valves in series) and chambers. An exemplary schematic of the microfluidic circuits of the microfluidic device is shown in FIG. 14. This shows three circuits that share a common port, 70. The microfluidic circuits can move fluids from sample input areas or reservoirs 80, mix them with reagents or other materials at valve 20 and deliver them to other areas within the microfluidic chip device 30, 40, and 60. Two or three or more fluidic streams can be joined by configuration of the appropriate number of valves, pumps, and channels. The streams can contain samples, reagents, buffers, and other components. The microchannels 60, 61, 62 and ports 70 can be variable in width or height. In one embodiment, the samples and reagents are delivered to the serpentine channel 60 in an extended shelf region of the microchip for incubation and/or processing, and then returned to an output area in the microfluidics device 90 through a gated valve 50. The processed sample can also be moved to a region for removal of an analyte or other component, such as magnetic beads in area 40. The individual fluid streams can be moved by pumps comprising three or more valves including diaphragm valves or other valves such as 10, 20, 30, 40, and 50. The valves can be created actuation of a deformable structure, changes in temperature, pressure. Two or more streams can be combined using diaphragm and other microvalves. In one embodiment the diaphragm valves are self priming and are under computer control; they may be driven in either direction and the same circuit can be used to split a sample into two streams by simply running the two co-joined pumps to move samples to two areas within the microfluidic chip device or to form an archival sample.

Figure 15:
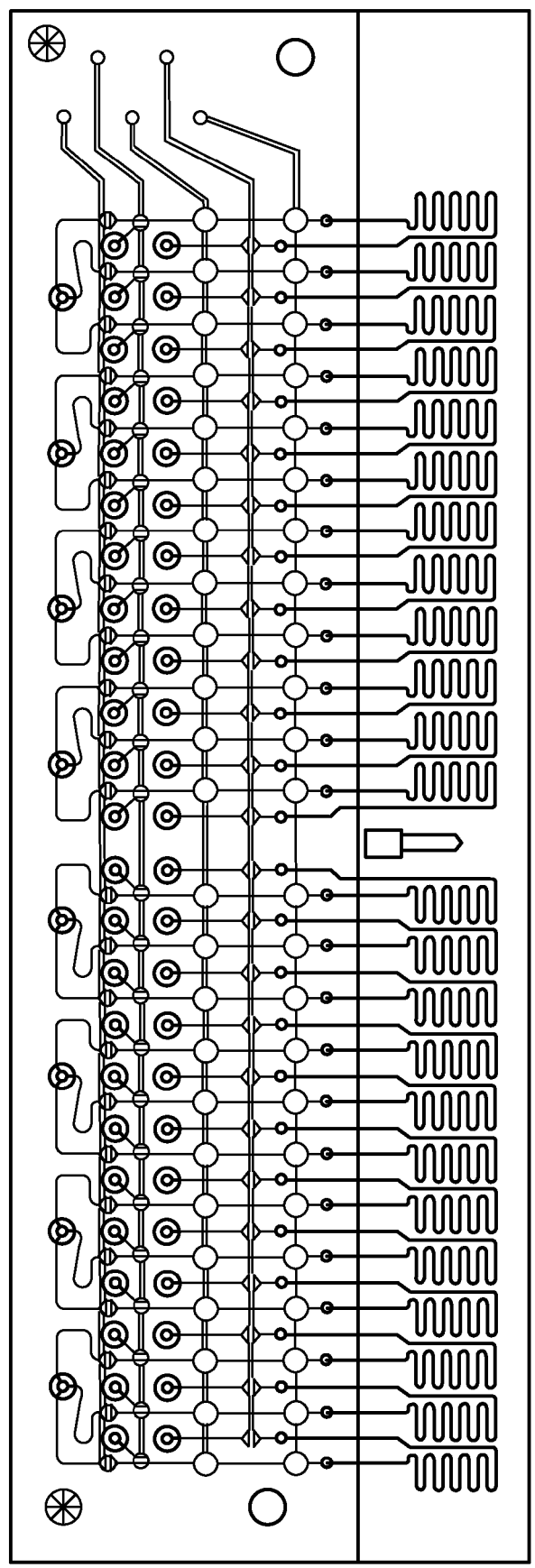
FIG. 15 shows a collection of the circuits of FIG. 14 assembled on a device comprising a total of 24 microfluidic circuits.

In certain embodiments, the chip comprises a plurality of parallel circuits. Such an embodiment is shown in FIG. 15, which illustrates a microfluidics chip configured for 24 samples, and has an array of 24 fluidic circuits arranged in a serpentine pattern on the extended shelf portion of the microfluidic chip device.

In certain embodiments, the microfluidic devices of this invention are monolithic devices. In monolithic devices, a plurality of circuits are provides on a single substrate. In the case of devices comprising diaphragm valves, a monolithic device comprises a single elastic layer functioning as a diaphragm for a plurality of valves. In certain embodiments, one actuation channel can operate a plurality of valves on a monolithic device. This allows parallel activation of many fluidic circuits. Monolithic devices can have dense arrays of microfluidic circuits. These circuits function with high reliability, in part because the channels in each circuit are fabricated simultaneously on a single substrate, rather than being made independently and assembled together. In other embodiments, an actuation conduit can control actuation of a single valve (e.g., each valve can be operated by a separate actuation conduit). For example, the actuation conduit can traverse the actuation layer from the actuation surface to the other side, e.g., as a bore through the substrate.

The fluidic circuits and actuation circuits of these chips are densely packed. A circuit comprises an open or closed conduit. In certain embodiments, the device can comprise at least 1 fluidic circuit per 1000 $mm^2$, at least 2 fluidic circuits per 1000 $mm^2$, at least 5 fluidic circuits per 1000 $mm^2$, at least 10 fluidic circuits per 1000 $mm^2$, at least 20 fluidic circuit per 1000 $mm^2$, at least 50 fluidic circuits per 1000 $mm^2$. Alternatively, the device can comprise at least 1 mm of channel length per 10 $mm^2$ area, at least 5 mm channel length per 10 $mm^2$, at least 10 mm of channel length per 10 $mm^2$ or at least 20 mm channel length per 10 $mm^2$. Alternatively, the device can comprise valves (either seated or unseated) at a density of at least 1 valve per $cm^2$, at least 4 valves per $cm^2$, or at least 10 valves per $cm^2$. Alternatively, the device can comprise features, such as channels, that are no more than 5 mm apart edge-to-edge, no more than 2 mm apart, no more than 1 mm apart, no more than 500 microns apart or no more than 250 microns apart.

In other embodiments, the device can comprise at most 1 fluidic circuit per 1000 $mm^2$, at most 2 fluidic circuits per 1000 $mm^2$, at most 5 fluidic circuits per 1000 $mm^2$, at most 10 fluidic circuits per 1000 $mm^2$, at most 20 fluidic circuits per 1000 $mm^2$, at most 50 fluidic circuits per 1000 $mm^2$. Alternatively, the device can comprise at most 1 mm of conduit length per 10 $mm^2$ area, at most 5 mm conduit length per 10 $mm^2$, at most 10 mm of conduit length per 10 $mm^2$ or at most 20 mm conduit length per 10 $mm^2$. Alternatively, the device can comprise valves (either seated or unseated) at a density of at most 1 valves per $cm^2$, at most 4 valves per $cm^2$, or at most 10 valves per $cm^2$. Alternatively, the device can comprise features, such as channels, that are no less than 5 mm apart edge-to-edge, no less than 2 mm apart, no less than 1 mm apart, no less than 500 microns apart or no less than 100 microns apart.

3. Methods of Making the Device

3.1. Functional, Exposed Surfaces Comprising Low Surface Energy Materials

In the devices of this invention, the functional surfaces have a material with sufficiently low surface energy that they will not stick to the elastic layer, particularly during bonding of the layers together. Also, the sealing surfaces generally will have a material with high enough surface energy to seal the functional surfaces during bonding and resist delamination. When the elastic layer is a silicone, such as poly(dimethylsiloxane) (PDMS), the water contact angle of the treated surface should be at least 90°, at least 100° degrees, at least 115°, at least 120° degrees or at least 140° degrees.

3.1.1. Materials

Many materials are useful to create low surface energies on exposed surfaces. In one embodiment, the material is a low energy polymer such as a perfluorinated polymer or a poly(p-xylylene) (e.g., parylene). Teflon is a known low surface energy material, which is also inert and biocompatible. The material can be a self-assembled monolayer. Self-assembled monolayers can be made from silanes, including for example, chlorosilanes or from thiol alkanes. They typically have a thickness between about 5 Angstroms and about 200 Angstroms. The low energy material can be a metal (e.g., a noble metal such as gold, silver or platinum). Other materials that can be used to provide low surface energy surfaces include hard diamond, diamond-like carbon (DLC) or a metal oxide (e.g., titania, alumina or a ceramic).

Perfluorinated polymers include, for example, Teflon-like materials deposited from fluorinated gases, PTFE (polytetrafluoroethylene, Teflon®), PFA (perfluoroalkoxy polymer resin), FEP (fluorinated ethylene-propylene), ETFE (polyethylenetetrafluoroethylene), PVF (polyvinylfluoride), ECTFE (polyethylene chlorotrifluoroethylene), PVDF (polyvinylidene fluoride) and PCTFE (polychlorotrifluoroethylene). The material can have a thickness of about 100 Angstroms to about 2000 Angstroms.

In one embodiment, the material comprises a noble metal, such as gold. The noble metal can be applied directly to the surface to be coated. Also, the noble metal can be applied to a surface already coated with another material, such as a refractory metal that facilitates adhesion of the noble metal to the surface. Refractory metals include, for example, chromium, titanium, tungsten, molybdenum, niobium, tantalum and rhenium. For example, a 1000 Angstrom layer of chromium can be applied to selective surfaces, followed by a 2000 Angstrom layer of gold. The chromium layer need only be thick enough to allow the gold to adhere, for example, at least 30 Angstroms, at least 50 Angstroms, at least 100 Angstroms, at least 500 Angstroms or at least 1000 Angstroms. The noble metal, also, need only be thick enough to inhibit binding of the elastic layer. For example the noble metal can have a thickness of at least 50 Angstroms, at least 100 Angstroms, at least 500 Angstroms, at least 1000 Angstroms or at least 2000 Angstroms. The metal can be applied by sputtering, evaporation, or atomic layer deposition using a shadow mask that exposes the surfaces to be coated, or by other techniques. Sputtering can use, for example, Rf or DC energy.

Another method improves bonding between plastic pieces and an elastic layer, particularly made of a siloxane. This method involves coating the plastic piece with a material that can produce hydroxyl groups that can react with activated siloxane. For example, the material can be a polysiloxane or a metal oxide. When subjected to UV ozone or oxygen plasma, these materials easily form bonds with activated polysiloxanes. Such methods are described in more detail in U.S. provisional patent application 61/265,579, filed Dec. 1, 2009.

The fluidic piece can comprise microfluidic elements with non-microfluidic elements in an article fabricated in a single piece. For example, the piece can have an aperture that traverses the piece connecting microfluidic channels on one side with chambers having a non-microfluidic volume on another site. Such an article is described in US patent application Ser. No. 61/330,154, filed Apr. 30, 2010. The term "non-microfluidic volume" as used herein refers to a volume of at least 5 microliters, at least 10 microliters, at least 100 microliters and least 250 microliters, at least 500 microliters, at least 1 milliliter or at least 10 milliliters.

3.1.2. Methods

Materials can be deposited by a number of different methods including chemical vapor deposition processes, physical deposition processes, flowing liquids over surfaces, photoresist or printing. Surfaces may be cleaned with piranha solution a mixture of sulfuric acid ($H_2SO_4$) and hydrogen peroxide ($H_2O_2$).

3.1.2.1. Chemical Vapor Deposition

Figure 16A:
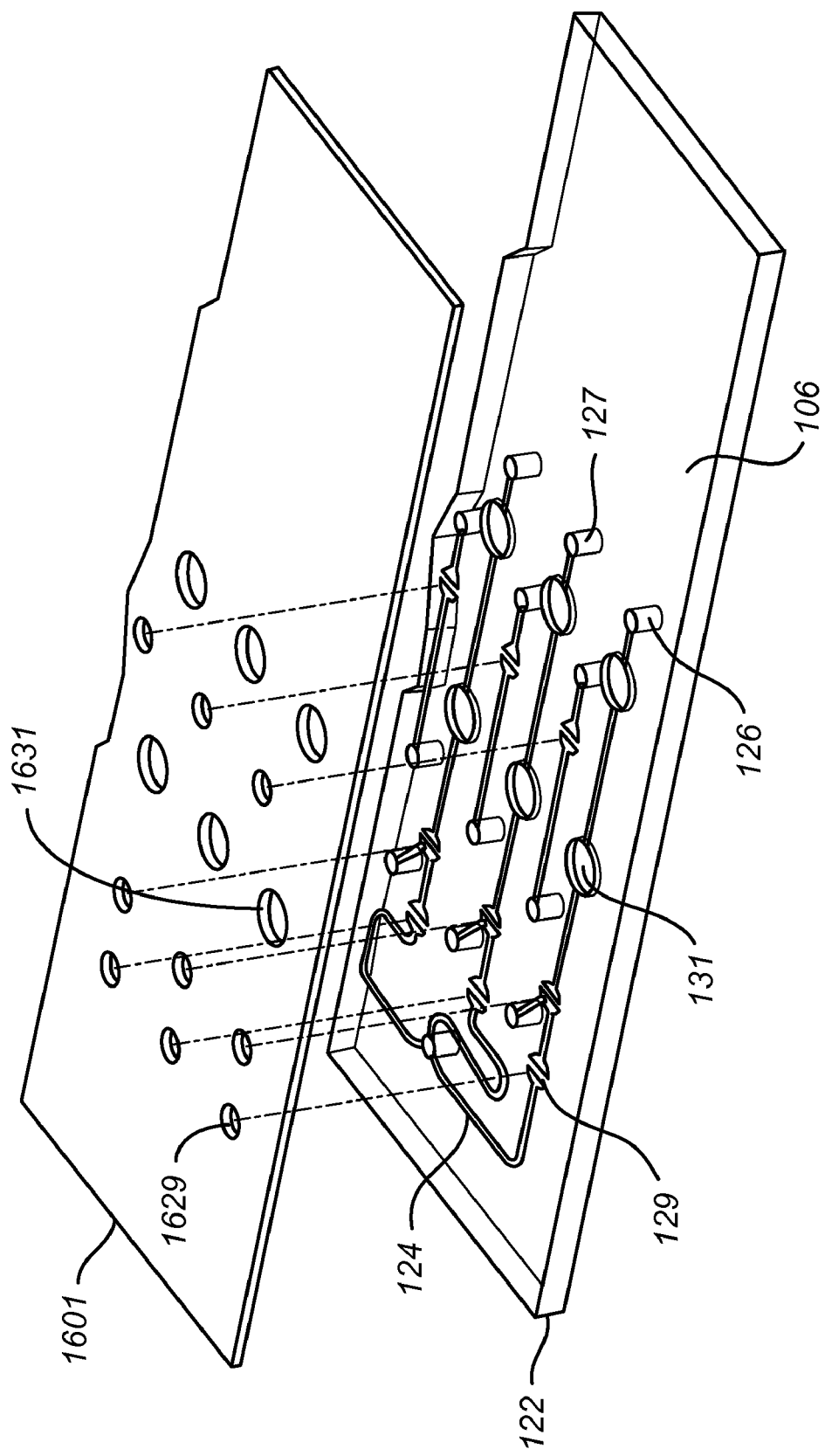
FIGS. 16A and 16B shows a fluidics layer comprising a plurality of fluidic circuits and valve seats that interrupt the circuits, and a shadow mask 1601 comprising openings over valve seats to allow deposition of a low energy material, in exploded and closed configurations. For example, hole 1629 is aligned with valve 129 and hole 1631 is aligned with valve 131.
Figure 16B:
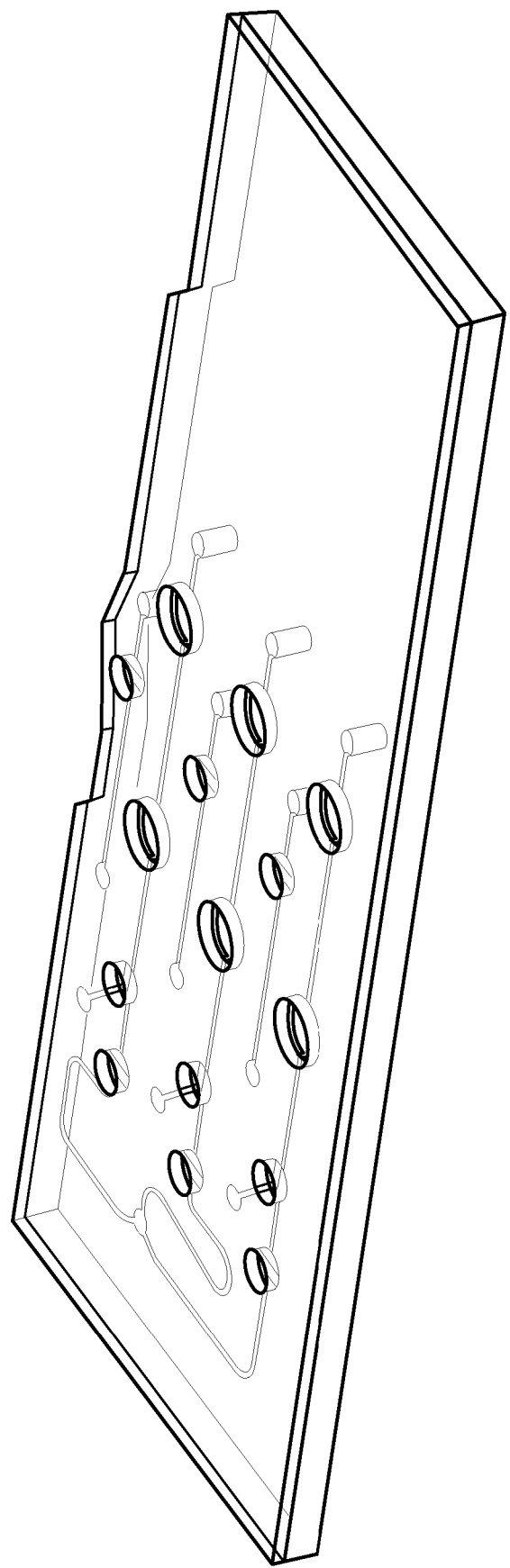
Figure 17A:
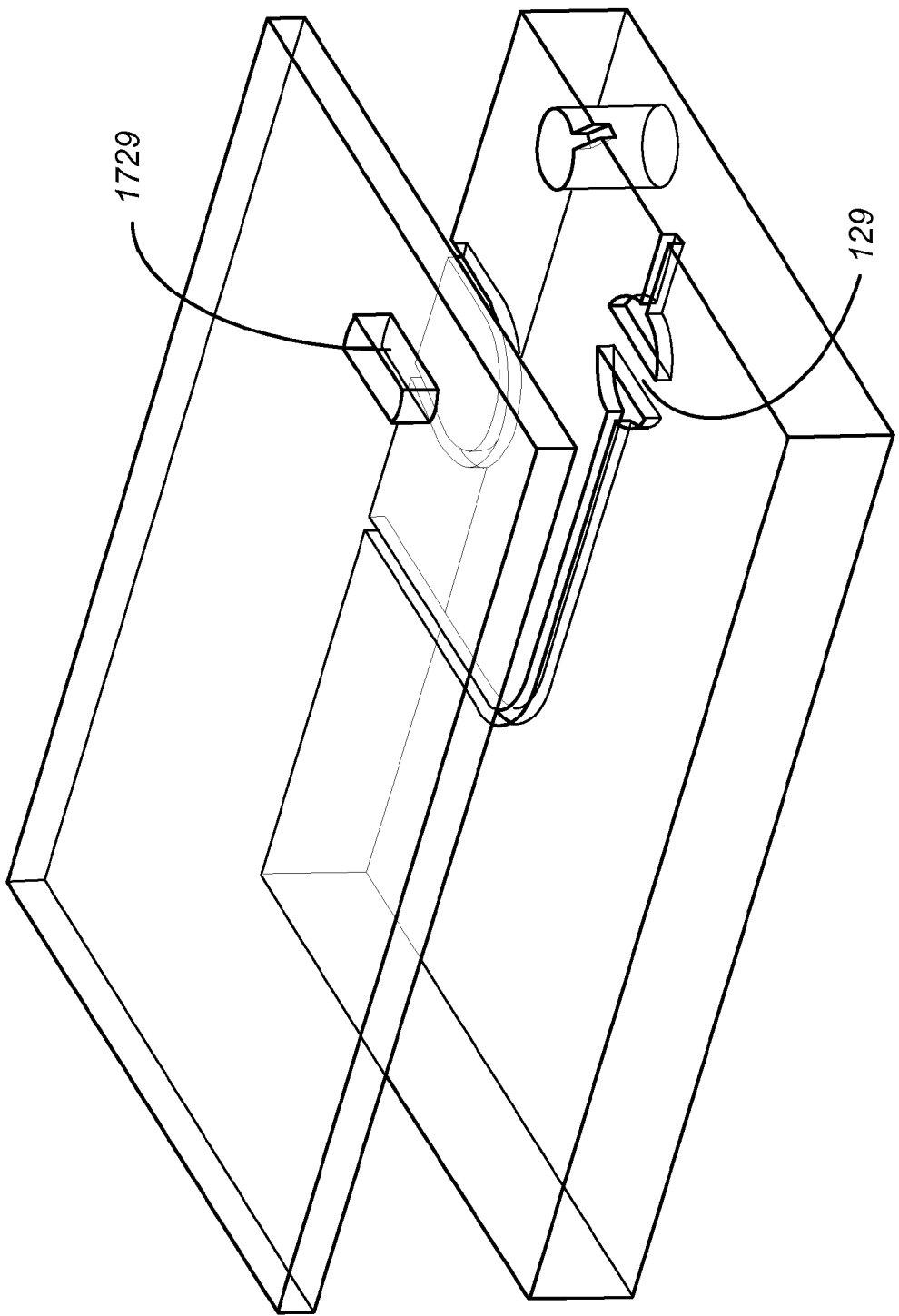
FIGS. 17A and 17B show a shadow mask comprising a hole 1729 that matches the valve seat only of valve 129.
Figure 17B:
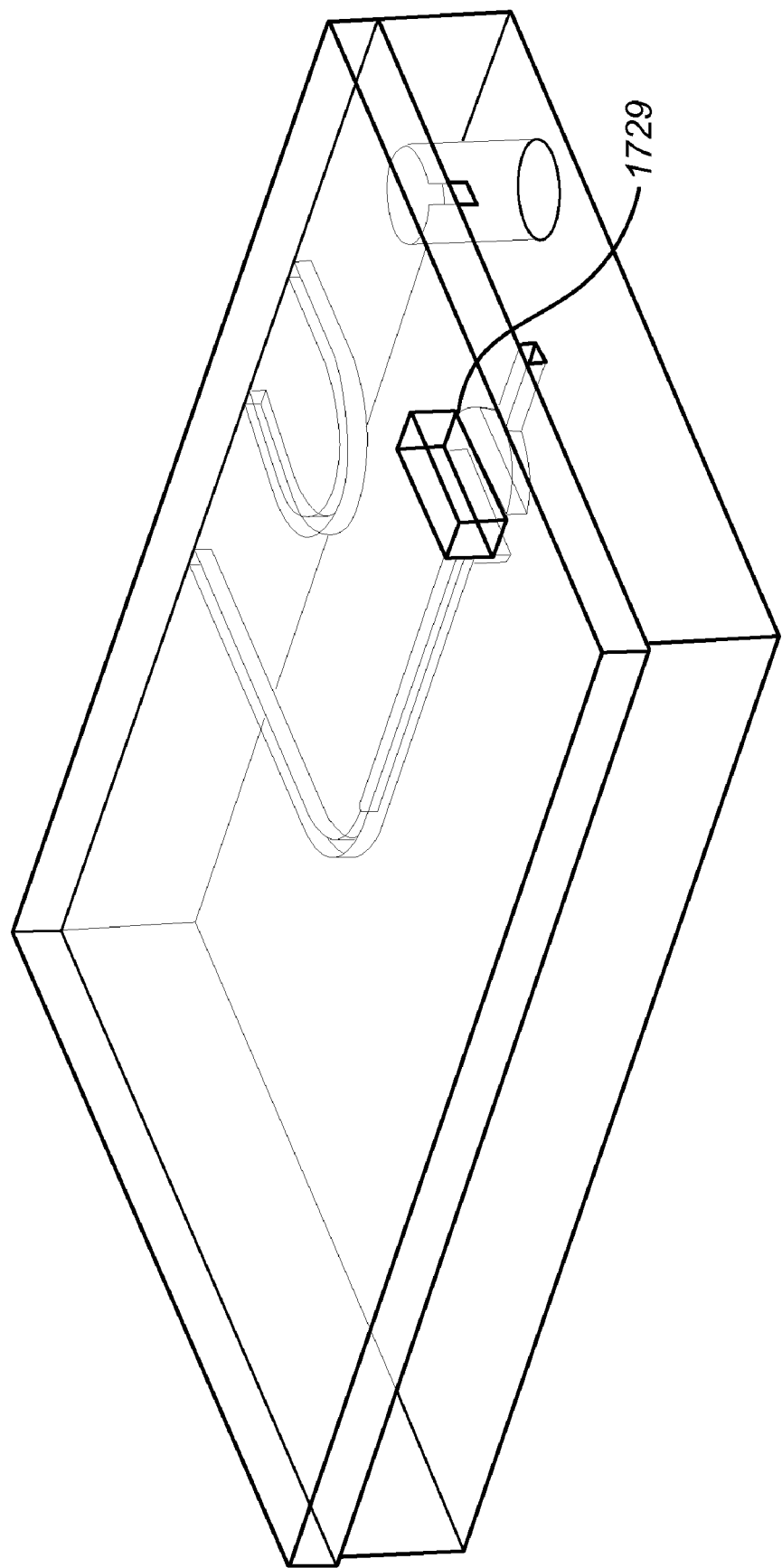

One way to achieve such selective hydrophobicity is to deposit low surface energy coatings onto functional surfaces with a chemical vapor deposition system using a shadow mask or by diffusion of the vapor into exposed compartments. A shadow mask is made of an appropriate material, such as glass, that contains openings in appropriate locations. When the layer is overlaid with the mask and properly aligned, surfaces to be coated are exposed. Examples of masks include glass, metal sheet, foil or semiconductor wafer. An example of a portion of a mask useful for this process is shown in FIGS. 16A and 16B. In this case, via layer 122 has contact surface 106 comprising etched channels, e.g., 124, valve seat 129, fluidic valve body 131 that does not comprise a valve seat and vias, e.g., 126 and 127. Mask 1601 has holes, e.g., 1629, that mate with valve bodies/seats and holes, e.g., 1631, that mate with seatless valve bodies. When mated, as in FIG. 16B, the holes expose functional surfaces that are to be coated with the low surface energy material. FIGS. 17A and 17B show a shadow mask comprising a hole that mates with a valve seat, but not a fluidic valve body.

3.1.2.1.1 Chemical Deposition with Pyrolytic Reaction

In a pyrolytic chemical deposition process, the coating material and the parts to be coated are placed in a chamber. The chamber is heated under low pressure so as to vaporize the coating material. The coating material is deposited on the exposed surfaces. This method is particularly useful for depositing poly(p-xylylene) polymers (parylene).

3.1.2.1.2 Plasma Enhanced Chemical Vapor Deposition

A low energy coating can be deposited by plasma-enhanced chemical vapor deposition processes (PECVD). In this method, the layers are covered by a mask that exposes the functional surfaces. The chamber is evacuated to a few millitor. A gas of the coating material is introduced into the reactor. The gas is exposed to an electrical discharge, such as DC, AC or radio frequency. This ionizes the gas into a plasma and reforms on the exposed surface.

This method is particularly useful for depositing perfluorinated materials on the surface. For example, the gas can be $CF_4$ or $C_4F_8$. This can produce a polymer on the surface having the general formula $C_xF_y$.

3.1.2.1.3. Self-Assembled Monolayers

Self-assembled monolayer coatings can be deposited from a vapor phase using vacuum oven or other vacuum-based system. Such coatings can be based on silane or thiols, or use other surface attachment groups. Noble metals also provide sits on which SAMs can be assembled. In certain embodiments, the device is assembled or mated from the fluidics, elastic and actuation layers. Then, the assembled device is placed in an oven comprising a container of the material to form the self-assembled monolayer. For example, the material can be silane-based, such as chlorotrimethylsilane. The chamber is subjected to low pressure to vaporize the material. The material enters open channels and coats surfaces with the monolayer.

Alternatively, depending on the SAM molecule head group it may attach preferentially to different materials. For example, silanes would attach to oxides and not noble metals, but thiols would attach to noble metals, but not oxides. One can use materials combination to selectively deposit SAMs on the surface. For example, it is known that SAM deposition/attachment efficiency depends strongly on sample temperature and surface charge. One can create areas of different charge accumulation (using different materials) and use it to selectively deposit SAM on the valve seats or in functional areas.

Then, the device is removed from the chamber and the layers bonded with each other, for example by using heat and pressure as described herein. The channels are cleared with a liquid, such as water, to ensure the valves are open.

3.1.2.2 Physical Vapor Deposition (Sputtering)

In another method, the coating material and the surfaces to be coated can be placed in a chamber. The coating material is bombarded with an inert gas, such as argon. The released material coats the surface. This method is useful for solid materials, such as perfluorinated polymers.

3.1.2.3. Application of Liquid

Another method to coat surfaces involves flowing a liquid comprising the coating material over the surface. For example, liquid forms of perfluorinated polymers (DuPont Teflon-AF material) can be deposited this way. Self-assembled monolayer coatings can be deposited from a liquid phase by flowing precursors through the channels.

3.1.2.4. Photoresist Patterned Masks

Another way to achieve selective hydrophobicity is to deposit low surface energy coatings on photoresist patterned mask, followed by lift-off process (dissolution of photoresist in solvent). The entire surface is covered with a positive photoresist, e.g., DNQ. Then the surface is covered with a mask that is transparent at the locations of surfaces to be treated. The combination is exposed to light. The mask is removed and exposed portions are removed using photoresist developer. The surface is now exposed to any method to apply a low energy material (e.g., a hydrophobic material) to the surface. The remaining photoresist is then removed with a resist stripper, e.g., UV ozone or oxygen plasma.

3.1.2.5. Activation-Deactivation Methods

Another way to achieve selective hydrophobicity is to deposit low surface energy coatings on the surface using activation or de-activation by light, temperature, pressure, electrical charge, other physical or chemical activation, or choice of materials.

3.1.2.6. Printing

Another way to achieve selective hydrophobicity is to deposit low surface energy film by a printing method. For example, industrial inkjet printers can deposit variety of materials (in liquid form) with resolution down to 100 um. Subsequently such materials can be cured/polymerized/solidified by UV light or thermal treatment. Another example is screen printing method of selective deposition of low surface energy materials. The material may also form electrical circuits.

3.2. Preparation of the Elastic Layer

To improve the seal between the elastic layer, such as PDMS, and the fluidics and actuation layers, the elastic layer can be subjected to treatments to activate reactive groups on the surface that will bond with reactive groups on the surface of the fluidics and elastic layers. In another embodiment, selective regions of the elastic layer can be activated or deactivated.

Useful reactive groups on the surface of substrates include those such as a hydroxyl groups, an amine group, a methacrylate group, a disulfide group, a disilazane group, a sulfhydryl group, an acrylate group, a carboxylate group, an activated ester group, an active leaving group, an isonitrile group, an isocyanate group, a phosphoramidite group, a nitrene group, an epoxide group, a hydrosilyl group, an ester group, an arene group, an azido group, a nitrile group, a vinyl group and an alkylphosphonate group.

For example, in one embodiment, the elastic layer comprises a silicone polymer, (polysiloxane) such as poly(dimethylsiloxane) (PDMS). Silicones typically are water repellant due, in part, to an abundance of methyl groups on their surfaces. In order to increase the strength of bonding between polysiloxanes and substrates comprising reactive groups, such as hydroxyls (e.g., glass), the siloxanes can be made more hydrophilic by UV ozone, plasma oxidation, or other methods that places silanol groups (Si—OH) on the surface. When activated PDMS is contacted with glass or other materials comprising active hydroxyl groups and preferably subjected to heat and pressure, a condensation reaction will produce water and covalently bond the two layers through, e.g., siloxane bonds. This produces a strong bond between the surfaces. However, in order for the valves to be functional, the elastic layer cannot bind to the valve seats, and, preferably, does not bind to any surface of the valve or to any channel in the surface of the fluidic or elastic layer that faces the elastic layer. The low energy coating is one embodiment to prevent binding.

In another embodiment, a liquid material can be deposited onto the functional area before the elastic layer is bonded to the fluidics layer. The liquid may be applied by many methods without limitation by silk screening, jet printing, stamping, through a mask, and many other methods.

3.3. Assembling the Device

The devices of this invention are assembled so that the functional portions, such as valves, pumps, reservoirs and channels, are sealed to prevent leakage of fluids, and the elastic layer does not stick to functional exposed surfaces.

In one method, the layers are sealed by bonded together with covalent or non-covalent bonds (e.g., hydrogen bonds). This can be achieved by mating the fluidics, elastic and actuation layers together as a sandwich and applying pressure and heat. For example, when the elastic layer comprises a silicone, such as PDMS treated as above to render the surface more hydrophilic, and the fluidics and actuation layers are glass treated to render the exposed surfaces more hydrophobic, the pieces can be pressed together at a pressure of 100 kg to 500 kg, e.g., about 300 kg. They can be baked between 25° C. and 100° C., e.g., about 90° C. for about 5 minutes to about 30 minutes, e.g., about 10 minutes, depending on the combination of temperature and pressure used. This will cure the bonding between the elastic layer and the sealing surfaces.

In another method, the device can be assembled by holding the pieces together under pressure during functioning of the chip, thereby sealing the functional areas of the fluidics layer from leakage. This can be done mechanically, e.g., by clipping or clamping the layers together.

4. System

A fluidic system can comprise a fluidic assembly and an actuation assembly. The fluidic assembly can comprise (1) elements to engage and hold the fluidic portion of a microfluidic device that comprises microfluidic elements, e.g., fluidic conduits, and (2) a fluid delivery assembly, such as a robot, configured to deliver fluids to the fluidic manifold or to the microfluidic conduits directly. The actuation assembly can comprise (1) elements to engage and hold the actuation portion of a microfluidic device that comprises actuation conduits, (2) an actuation manifold configured to mate or align with ports on the microfluidic device and to deliver actuant into the actuation conduits microfluidic device; and (3) an actuant delivery assembly, configured to deliver actuant to the actuation manifold or to the actuation conduits directly. The actuant delivery assembly can comprise a source of positive or negative pressure and can be connected to the actuation conduits through transmission lines.

In operation, a pump can be provided by placing an inlet valve, a pumping valve and an outlet valve in series. The pump can function by actuating an inlet valve to open it, actuating an outlet valve to close it, actuating a pump valve to draw liquid through the inlet valve into the pump valve, actuating the inlet valve to close it actuating the outlet valve to open it and actuating the pump valve to pump liquid out through the outlet valve. Accordingly, the actuation mechanisms can coordinate the operation of valve and chambers to route liquid along any desired path.

The instrument can also comprise accessory assemblies. One such assembly is a temperature controller configured to control temperature of a fluid in a fluidic conduit. Another is a source of magnetic force, such as a permanent or electromagnet, configured to apply magnetic force to containers on the instrument that can comprise, for example, particles responsive to magnetic force. Another is an analytic assembly, for example an assembly configured to receive a sample from the fluidic assembly and perform a procedure such as capillary electrophoresis that aids detection of separate species in a sample. Another is a detector, e.g., an optical assembly, to detect analytes in the instrument, for example fluorescent or luminescent species. The instrument also can comprise a control unit configured to automatically operate various assemblies. The control unit can comprise a computer comprising code or logic that operates assemblies by, for example, executing sequences of steps used in procedure for which the instrument is adapted.

5. Methods of Using The Device

A device of this invention can be used to perform reactions on fluidic samples. A fluidics robot, such as a Tecan robot, can robotically add fluid to ports in the fluidics layer. The actuation layer can be engaged with a manifold, such as a pneumatic manifold, that mates ports in the pneumatic layer with a source of positive or negative pressure. In certain embodiments, a single pneumatic channel operates valves in a plurality of different fluidic conduits in parallel. Then, by pneumatically actuating the valves in various sequences, liquids can be pumped between chambers. The chambers can be provided with reagents to allow reactions.

In one embodiment, the microfluidics device can be programmed to introduce the samples and reagents into the isolated region and then move them into a recovery region after the reaction is complete to permit withdrawal of the sample for subsequent analysis. In another embodiment, the microfluidics device can be programmed to move the reacted sample into a reservoir or a fluid zone and add additional reaction reagents and reintroduce the sample into the isolated region for additional reaction. In other embodiments, the microfluidics device can be programmed to move the reacted sample into a reservoir or a fluid zone and add capture reagents and then move the sample into a capture region for the physical separation of analytes of interest; e.g., through the use of a magnetic field to capture magnetic beads coated with binding moieties. In other embodiments, the microfluidics device can be programmed to move the reacted sample into a reservoir or a fluid stream and add detection reagents or moieties and then move the sample into a recovery region to permit withdrawal of the sample for subsequent analysis. A detection device, such as laser induced fluorescence Raman, Plasmon resonance, immunocapture and DNA analysis devices known in the art, can be used to interrogate the sample in a diaphragm valve or within the channel of the shelf region or other part of the microfluidic device. See, e.g., WO 2008/115626 (Jovanovich). A microfluidic device having a monolithic membrane is one example of a particularly suitable device for implementing a detection system on a chip. According to various embodiments, the detection system can also include immunocapture and DNA analysis mechanisms such as polymerase chain reaction (PCR), and capillary electrophoresis (CE) mechanisms.

FIG. 14 shows an example of microfluidic device that can be used to perform thermal cycling on a sample and output a purified product. For example, the device can prepare samples for cycle sequencing nucleic acid analysis. In this design, nucleic acid samples introduced into wells 80 can be moved and mixed at diaphragm valve 20 with cycle sequencing reagents and enzymes introduced into well 70 and pumped by actuation of valves 10, 20, 30, and 40 into the serpentine channel 60 of the isolated region. Alternatively, valves 10, 20, 30, and 50 may be used for pumping. The mixing of the reagents and samples can be performed as described herein. Plurality of boluses of reagents and sample can be sequentially and/or alternately moved into a microfluidic channel of the microchip by alternatively using sets of pumping valves to move the reagent (valves 10, 30, and 40) and sets of pumping valves to move the sample (valves 20, 30, and 40). The reagents and samples can be combined in valve 20 and become mixed before reaching valve 40. The mixed reagents and samples can then be pumped into the serpentine channel 60 which is located on an isolated region of the microfluidic device. Because the isolated region is in thermal contact with the thermal regulator, the samples introduced into the reaction region of the shelf can be heated or cooled under controlled conditions selected by the operator. The reagents and sample can undergo thermal conditions for cycle sequencing. In one embodiment, the sample can be introduced through valves into the shelf region and the valves surrounding the chamber, e.g., 40 and 50, can be closed for thermal cycling or other thermally-controlled reaction conditions of the samples by the thermal regulator. The excellent volume-to-surface ratio and approximately 100-fold longer pathlength benefits the sample preparation biochemistry and temperature regulation by the higher volume-to-surface ratio. After cycle sequencing, the samples and/or reaction mixture can be moved to wells 80. Magnetic beads that may have binding moieties can be introduced to well 80 such that the sample and/or reaction mixture are mixed with the magnetic beads. In some embodiments of the invention, the magnetic beads are coated with carboxyl groups and can adsorb nucleic acids. The magnetic beads with adsorbed nucleic acid can then be further moved to a capture region 40, and be captured by application of a magnetic field. The capture of the beads by the magnetic field can be accompanied by a deformation of the capture valve. The magnetic field can be applied by actuation of the magnetic assembly described herein. The capture valve can be deformed such that the chamber size is increased. The increased size of the capture valve can reduce the flow velocity through the chamber. The magnetic beads can be washed while the beads are captured by the magnetic field. The on-chip diaphragm pumps, e.g., 10, 20, 30, and 40 can move the beads, which may be washed with a buffer, with bound purified nucleic acids. The beads can be moved to one of the removal ports 90 or nucleic acids which may have been released by the local application of heat or eluted with water or a buffer can be moved to one of the removal ports 90.

In another embodiment, the device is programmed to integrate multiple steps of reactions for DNA sequencing applications. Common reagent reservoir 70 is loaded with cycle sequencing reagents which are mixed with DNA containing samples loaded into sample reservoirs 80 with the samples being in one embodiment PCR, plasmid, or other nucleic acid amplification products that are to be sequenced. The mixture containing the sample and cycle sequencing reagents can be moved by the programmable fluidics using microvalves to a reaction chamber 60 located on the extended shelf region of the device where cycle sequencing reactions are performed using thermal cycling. The cycle sequencing products can then be moved to Product reservoirs 90 for movement off the device for further processing or in a preferred embodiment the cycle sequencing products are moved to a reservoir and beads such as Agencourt SPRI beads are added to the cycle sequencing products with appropriate chemistry to have the desired cycle sequencing products bound to the beads to separate the products from the salts and unincorporated dye labeled terminators or primers. It is obvious to one skilled in the art that rather than binding the cycle sequencing products to the beads the reverse can be performed where the cycle sequencing products are left in solution and the salts and unincorporated dyes are bound to the beads. The term bead is used without restriction to include particles, paramagnetic particles, nanoparticles, monoliths, gels, gels with affinity capture property or non-specific properties.

If the bead and cycle sequencing products were contained in reservoir 80 the combined mixture is pumped through microvalves 20 and 30 to microvalve 40 which may be opened and have a fixed or movable magnet in proximity. The beads such as SPRI beads which are paramagnetic are captured as the flow slows down in the opened microvalve and the beads are captured in the magnetic field. For example, the valve can be opened and a magnet, such as comprised in magnet assembly of this invention can be moved into a functional position close to the valve so that beads passing into the chamber are captured by the magnetic force exerted by the magnet.

Fluids such as ethanol may be added to reservoirs to then process the beads and remove the undesired impurities such as salts and unincorporated dye labeled reactants. The magnet can then be removed to release the force on the beads. The beads may be then pumped to product reservoirs 90 or the cycle sequencing products can be eluted into water which is then pumped to product reservoirs 90. For cycle sequencing the eluted products are ready to be analyzed on a separate device such as a CAE or microchip with separation. It is obvious to one skilled in the art that the different reservoirs may have other configurations and a single sample can be added to reservoirs 70 and multiple reagents may be added to reservoirs 80 to perform three different reactions on a single sample.

EXAMPLES

Example 1

PECVD of Teflon-Like Material through Shadow Mask

A shadow mask is made by drilling holes in glass wafers (1.1 mm thick). The holes are slightly smaller than the valve diameter for compensating the aligning tolerances, e.g., a hole of about 900 microns for a 1 mm valve.

A Teflon-like coating is deposited through the shadow mask in a plasma process machine from PlasmaTherm (St. Petersburg, Fla.) with the following protocol:

1. Clean the glass parts to be coated in piranha for 4 layer chips (e.g., fluidics layer comprises an etch sublayer and a via sublayer) and in KOH for 3 layer chips.
2. Align the clean chips to the shadow mask and secure them with Kapton tape.
3. Vent the parallel plate Plasmaetch machine.
4. Open the chamber and load the parts to be coated.
5. Close the chamber and pump down to about 30 millitorr.
6. Open $O_2$ valve on the gas panel.
7. Select channel 1 on gas flow controller.
8. Select 100% flow and start.
9. Turn on the power generator and apply 300 W for 2 min.
10. Turn of the plasma and the gas flow.
11. Evacuate to 30 millitorr.
12. Turn on the $C_4F_8$ valve.
13. Select channel 3 on gas flow controller.
14. Select 100% flow and start.
15. Apply 75 W for 2 min.
16. Turn of the plasma and the gas flow.
17. Evacuate to about 10 millitorr.
18. Vent to about 50 torr.
19. Evacuate to 10 millitorr.
20. Vent the chamber.
21. Open the chamber and remove the coated parts.
22. Close the chamber and pump down.

The chips with Teflon-like coating on valves are assembled, placed in the curing oven for at a pressure of 300 kg at 90° C. for 10 minutes. This produces a strong PDMS/glass bond. The valves are operational immediately.

Example 2

Chemical Vapor Deposition of SAM Followed by Removal from Contact Surfaces

SAM coating is deposited in commercial vapor deposition system MVD-100 (Applied Microstructures); Perfluorinated silane (tridecafluoro-1,1,2,2-tetrahydro octyl trichlorosilane (FOTS)) from Gelest Corp. is used as precursor with deionized water, as a catalyst. The deposition is done in a vacuum (base pressure 25 mTorr), precursors are injected into the chamber in sequential mode (0.7 Torr×4 injections of FOTS; and 12 Ton×1 injection of deionized water vapor), then reaction is held at 35° C. for 15 min. The contact angle of SAM—deposited on the surface is measured 110-115 deg. The chip then is exposed to UV Ozone through a shadow mask designed to have an opaque areas in place of valves and channels. The shadow mask is fabricated from a silicon wafer by lithography and wafer-through etch. One can use dry Si etch (deep Si "Bosch" process) or wet Si anisotropic etch (KOH etch). Exposure takes place in UVOX UV ozone cleaning system having a lamp operating at 248 nm wavelength activated for 5 min, with the samples at a distance of 2 mm from the lamp. The contact angle at the exposed part is measured to be 10-15 degrees. The chip is assembled after UV exposure with polymer membrane into a functional chip with no valves sticking.

Example 3

Dry Photoresist Deposition

A blanket 0.125 mm thick film negative resist is laminated at 80° C. on the glass chip with etched channels and valves. The film is exposed through a mask and developed in a 3% baking soda solution. The Teflon-like coating is done with the same protocol described in Example 1, then the resist is dissolved in 3% KOH solution. The device is assembled and bonded as described above.

Example 4

Liquid Photoresist Deposition

Spin photoresist on the surface or laminate dry photoresist. Expose the photoresist through a photomask having non-transparent features in place where coating should reside. Develop the photoresist. Use vacuum oven or vapor deposition system to deposit SAM hydrophobic coatings, or use plasma system to deposit Teflon-like coating, or use PVD system to deposit Teflon coating, etc. Then immerse sample in acetone to lift photoresist with coating from the same, which will leave islands of coating on the places of valve seats. The contact angle of this coating is about 110 degrees, which demonstrates the hydrophobic properties of the surface. The contact angle of the surface cleared from resist is measured 10-15 deg. The chip is assembled after UV exposure with polymer membrane into the functional chip.

Example 5

Printing Using Inkjet

Teflon material (Teflon-AF) is printed using inkjet printer system programmed with the layout according to the positions of the valve seats. The dispensed material is then cured using thermal treatment in an oven. The chip is assembled after UV exposure with polymer membrane into the functional chip.

Example 6

Self-Assembled Monolayer of Silane on Functional Surfaces by Chemical Deposition 1. 10 mLs of chlorotrimethyl silane is placed in a small beaker
2. Microfluidic chip is assembled from glass and polymer materials—fluidics layer, elastic layer, pneumatic layer.
3. Chips are placed in an enclosed plastic box with the beaker of silane. Optionally, the enclosure can be depressurized.
4. After 30 minutes at room temperature, the chips are removed from the box.
5. The chip is thermally cured at 100° C. for 10 minutes.
6. All ports and valves are rinsed with water.
7. All parts and valves are dried by pushing air through them.

Example 7

PEG Protocol

1. Microfluidic chip is assembled from glass and polymer materials.
2. PEG 200 (e.g., Sigma #81150) is pushed through all the ports on the fluid layer using a syringe outfitted with a pipette tip. Care is taken to ensure all channels and valves are filled
3. Chip is thermally cured at 100° C. for 10 minutes to complete bonding of polymer membrane with glass material.
4. All ports and valves are rinsed with water
5. All parts and valves are dried by pushing air through them Example 8

Evaporated Gold

Another embodiment of the current invention employs noble metals as an anti-stick layer to prevent PDMS bonding to the valve seats. In this case, first a refractory metal, such as Cr or Ti, is deposited on glass or plastic for adhesion purposes. Then Au is deposited.
Thickness of Cr=300 Angstroms-500 Angstroms
Process for Cr deposition:
1. Vacuum=2-3 µTorr
2. Evaporation from tungsten (W) filament coated with Cr at 75-80 Amps
3. Deposition rate=5 Å/s Thickness of Au=2000 Angstoms-4000 Angstroms
Process for Au deposition:
1. purity of Au wire=99.99%
2. evaporation from W boat at 150 Amps
3. deposition rate=10 Å/s Example 9

Sputtered Gold

1. Vent the chamber
2. Open the chamber and load the parts to be coated and the Cr and Au targets (99.99% purity)
3. Pump down to 2-3 µTorr
4. Turn on the Ar gas and adjust the throttle valve for a deposition pressure of 5-7 mTorr
5. Turn on the substrate rotation and do 5 min sputter clean at 200 watts DC.
6. Perform 500 Å chromium deposition at 150 Watts RF, 50 Å/min
7. Perform 2000 Å gold deposition at 250 Watts DC, 250 Å/min
8. Turn off the Ar gas, wait 15 min for cooling, vent the chamber and remove the coated parts Another embodiment of the proposed shadow mask for Cr/Au sputtering is fabricated from a metal (for example, Ni plated aluminum). Via-holes are drilled in the metal plate in accordance with a layout of valve seats to be protected with Cr/Au. Pockets are machined in the metal plate to accommodate individual glass parts, so that simple mechanical alignment can be done between the valves on the glass and via-holes in the plate. Glass parts are slid against a corner of the pocket and this position is fixed with two small magnets from two sides, and by a spring from the top. The plate then is turned upside down and loaded into the platen of sputtering system.

REFERENCES

U.S. Pat. No. 7,063,304; LEYS, Jun. 20, 2006
U.S. Pat. No. 7,377,483; IWABUCHII et al.; May 27, 2008
U.S. Pat. No. 7,416,165; OHMI et al.; Aug. 26, 2008
U.S. Pat. No. 7,445,926; MATHIES et al., Nov. 4, 2008
U.S. Patent Publication 2004/0209354; MATHIES et al., Oct. 21, 2004
U.S. Patent Publication 2005/0161669, JOVANOVICH et al., Jul. 28, 2005
U.S. Patent Publication 2006/0073484; MATHIES et al., Apr. 6, 2006
U.S. Patent Publication 2007/0113908; LEE et al.; May 24, 2007
U.S. Patent Publication 2007/0248958; JOVANOVICH et al., Oct. 25, 2007
U.S. Patent Publication 2007/0289941; DAVIES; Dec. 20, 2007
U.S. Patent Publication 2008/0014576; JOVANOVICH et al., Jan. 17, 2008
PCT Publication WO 2008/115626; JOVANOVICH et al., Sep. 25, 2008
PCT Publication WO 2009/108260; VANGBO et al., Sep. 3, 2009
Anderson R C, Su X, Bogdan G J, and J. Fenton. "A miniature integrated device for automated multistep genetic assays." Nucleic Acids Res. 2000 Jun. 15; 28(12):E60
Bianco et al. "Teflon-like Coatings for Microdevices" CPAC Satellite Workshops, Rome, Italy, Mar. 23-25, 2009

Blaga et al., "Plastic chips with valves and pumps", MSB Conference, March 2008, Berlin, Germany.

Grover, W. H. A. M. Skelley, C. N. Liu, E. T. Lagally, and R. M. Mathies. 2003. "Monolithic membrane valves and diaphragm pumps for practical large-scale integration into glass microfluidic devices." Sensors and Actuators B89: 315-323

Lee et al., "Polymer Nanoengineering for Biomedical Applications," Annals Biomed. Engineer., 2006, 34:75-88

Lu et al., Anal. Chem., 2007, 79, 994-1001

Oh et al., "A review of microvalves", J. Micromech. Microeng., 16 (2006) R13-R39

Samel, "Novel Microfluidic Devices Based On A Thermally Responsive PDMS Composite," School of Electrical Engineering, Royal Institute of Technology, Stockholm. Sweden, Sep. 7, 2007

Tajima et al., J. Phys. Chem. C, 2007, 111 (11) 4358-4367

Willis et al., Lab on a Chip, 2007, 7, 1469-1474

Zhang et al., "PMMA/PDMS valves and pumps for disposable microfluidics," Lab Chip 2009 9:3088 (Aug. 20, 2009)

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A microfluidic device comprising a fluidics layer, an actuation layer and an elastic layer sandwiched between the fluidics layer and the actuation layer, wherein:
    (a) the fluidics layer and the actuation layer comprise sealing surfaces that contact the elastic layer; and
    (b) the fluidics layer comprises a plurality of fluid conduits comprising surfaces, and the actuation layer comprises a plurality of actuation conduits comprising surfaces, wherein at least a portion of the surfaces of the fluid conduits and actuation conduits are exposed to the elastic layer
    and further comprising a plurality of diaphragm valves that each regulate fluid flow in a fluid conduit, wherein each diaphragm valve comprises:
    (i) a valve body comprising a surface of the actuation layer exposed to the elastic layer,
    (ii) a valve seat comprising a surface of the fluidic layer exposed to the elastic layer,
    (iii) a diaphragm comprised in the elastic layer and configured to sit on or off a surface of the valve seat, and
    (iv) valve ports configured to allow fluid to enter and exit the valve,
    wherein at least a portion of the valve seat surface is coated with a low surface energy material having a water contact angle of at least 100° and the elastic layer is not bonded to the valve seat.

2. The microfluidic device of claim 1 wherein the sealing surfaces do not comprise the low energy material.

3. The microfluidic device of claim 1 wherein at least one fluidic conduit further comprises a chamber comprising an exposed surface that does not comprise a valve seat, wherein at least a part of the exposed surface of the chamber comprises the low surface energy material.

4. The microfluidic device of claim 1 wherein at least a part of the valve body comprises the low surface energy material.

5. The microfluidic device of claim 1 wherein all exposed surfaces of the valve comprise the low surface energy material.

6. The microfluidic device of claim 1 wherein all exposed surfaces of the fluidic conduits and the actuation conduits comprise the low surface energy material.

7. The microfluidic device of claim 1 wherein the exposed surfaces are patterned to have only some of the exposed surfaces comprise the low surface energy material.

8. The microfluidic device of claim 1 wherein the low surface energy material is selected from a self-assembled monolayer, parylene, diamond-like carbon, a metal oxide, a metal and a ceramic.

9. The microfluidic device of claim 1 wherein the low surface energy material comprises a noble metal.

10. The microfluidic device of claim 1 wherein the low surface energy material comprises gold.

11. The microfluidic device of claim 1 wherein the low surface energy material comprises a noble metal coated on a refractory metal.

12. The microfluidic device of claim 1 wherein the low surface energy material comprises gold coated on chromium.

13. The microfluidic device of claim 1 wherein the low surface energy material comprises a perfluorinated polymer.

14. The microfluidic device of claim 1 wherein the low surface energy material comprises poly(tetrafluoroethylene) (Teflon®).

15. The microfluidic device of claim 1 wherein the surfaces comprising the low surface energy material have a water contact angle at least 20° greater than the contact surfaces.

16. The microfluidic device of claim 1 wherein the fluidics layer or the actuation layer comprise a material selected from glass, silicon, quartz, and plastic.

17. The microfluidic device of claim 1 wherein the elastic layer comprises a material selected from a thermoplastic or a cross-linked plastic.

18. The microfluidic device of claim 1 wherein the elastic layer comprises a material selected from silicones, polyimides, cyclic olefin co-polymers, rubbers, styrenic block co-polymers, urethanes, perfluoro elastomers, Mylar, Viton, polycarbonate, polymethylmethacrylate, santoprene, polyethylene, and polypropylene.

19. The microfluidic device of claim 1 wherein the elastic layer comprises a silicone.

20. The microfluidic device of claim 1 wherein the elastic layer comprises PDMS.

21. The microfluidic device of claim 1 wherein the elastic layer comprises PDMS treated by degassing and UV ozone ionization.

22. The microfluidic device of claim 1 wherein the sealing surfaces are heat-bonded to the elastic layer.

23. The microfluidic device of claim 1 wherein the sealing surfaces are held by pressure to the elastic layer.

24. The microfluidic device of claim 1 wherein a monolithic elastic layer covers a plurality of the valve seats.

25. The microfluidic device of claim 1 wherein the actuation layer is a pneumatic layer.

26. The microfluidic device of claim 1 wherein the actuation layer comprises at least one actuation conduit that actuates a plurality of diaphragm valves on different fluidic conduits.

27. The microfluidic device of claim 1 further comprising external ports communicating with the fluidic channels.

28. The microfluidic device of claim 1 comprising fluidic conduits separated by no more than 1 mm.

29. The microfluidic device of claim 1 comprising a fluidics layer with at least 5 fluidic circuits per 1000 mm$^2$.

30. The microfluidic device of claim 1 wherein the sealing surfaces are bonded to the elastic layer to seal the fluid conduits at exposed surfaces that contact fluids; and wherein at least a portion of the exposed surfaces that contact fluids comprise a low surface energy material having greater hydrophobicity than a sealing surface.

31. The microfluidic device of claim 1 wherein the low surface energy material is a metal oxide selected from titania and alumina.

32. The microfluidic device of claim 1 wherein the fluidics layer or the actuation layer comprise a borosilicate.

33. The microfluidic device of claim 1 wherein the fluidics layer or the actuation layer comprise a plastic selected from a polycarbonate, an olefin co-polymer, a cycloolefin co-polymer, a silicon acrylic, a liquid crystal polymer, polymethylmethoxyacrylate (PMMA), a polystyrene, a polypropylene, and a polythiol.

34. The microfluidic device of claim 1 wherein the fluidics layer comprises glass, and wherein the low surface energy material comprises gold or gold coated on chromium.

* * * * *